(12) United States Patent
Grube

(10) Patent No.: US 12,229,507 B2
(45) Date of Patent: *Feb. 18, 2025

(54) IDENTIFYING UTILIZATION OF INTELLECTUAL PROPERTY

(71) Applicant: entigenlogic LLC, Schaumburg, IL (US)

(72) Inventor: Gary W. Grube, Barrington Hills, IL (US)

(73) Assignee: entigenlogic LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,090

(22) Filed: Jul. 12, 2023

(65) Prior Publication Data

US 2023/0359817 A1   Nov. 9, 2023

Related U.S. Application Data

(63) Continuation of application No. 17/555,661, filed on Dec. 20, 2021, now Pat. No. 11,748,563, which is a continuation-in-part of application No. 17/521,559, filed on Nov. 8, 2021, now Pat. No. 11,720,558, which is a continuation-in-part of application No. 16/521,868, filed on Jul. 25, 2019, now Pat. No. 11,176,126.

(60) Provisional application No. 62/711,665, filed on Jul. 30, 2018.

(51) Int. Cl.
*G06F 17/00* (2019.01)
*G06F 16/35* (2019.01)
*G06F 40/237* (2020.01)
*G06F 40/30* (2020.01)
*G06N 5/022* (2023.01)

(52) U.S. Cl.
CPC .......... *G06F 40/237* (2020.01); *G06F 16/334* (2019.01); *G06F 16/35* (2019.01); *G06F 40/30* (2020.01); *G06N 5/022* (2013.01); *G06F 2216/11* (2013.01)

(58) Field of Classification Search
CPC ...... G06F 40/237; G06F 40/30; G06F 16/334; G06F 16/35; G06F 16/3329; G06F 16/3344; G06F 2216/11; G06N 5/022; G06N 5/04
See application file for complete search history.

(56) References Cited

U.S. PATENT DOCUMENTS

| 6,175,834 B1 | 1/2001 | Cai |
| 9,858,330 B2 | 1/2018 | Henry |
| 11,263,403 B2 | 3/2022 | Williams |

(Continued)

*Primary Examiner* — Greta L Robinson
(74) *Attorney, Agent, or Firm* — Gary W. Grube

(57) ABSTRACT

A computer-implemented method includes determining a set of identigens for each word of patent claim elements to produce sets of identigens and interpreting pairs of adjacent identigens of adjacent sets of identigens to determine a most likely meaning of the claim elements and produce a claim entigen group. The method further includes determining a level of match between the claim entigen group and a comparison matter entigen group. When the level of match between the claim entigen group and the comparison matter entigen group is greater than a threshold level, the method further includes indicating potential utilization of the claim by the comparison matter or potential prior art status of the comparison matter.

18 Claims, 52 Drawing Sheets

(56) References Cited

U.S. PATENT DOCUMENTS

| | | | |
|---|---|---|---|
| 11,748,563 B2* | 9/2023 | Grube | G06N 5/04 |
| | | | 707/758 |
| 2003/0097251 A1 | 5/2003 | Yamada | |
| 2003/0101153 A1 | 5/2003 | Francis | |
| 2003/0171914 A1 | 9/2003 | Jung | |
| 2008/0208569 A1 | 8/2008 | Simpson | |
| 2009/0182755 A1 | 7/2009 | Adair | |
| 2013/0290338 A1 | 10/2013 | Lee | |
| 2016/0147979 A1 | 5/2016 | Kato | |
| 2017/0249382 A1 | 8/2017 | Venkataraman | |
| 2018/0081871 A1 | 3/2018 | Williams | |
| 2018/0107940 A1 | 4/2018 | Lieberman | |
| 2020/0050636 A1 | 2/2020 | Datla | |

* cited by examiner synonym words table 570

| textual words 572 | identigen 538 | | entigens 520 |
|---|---|---|---|
| | meaning ID 538 | instance ID 540 | |
| car | 50 | 001 | e1000 |
| automobile | 50 | 002 | e1000 |
| auto | 50 | 003 | e1000 |
| bil (Swedish) | 50 | 004 | e1000 |
| carro (Spanish) | 50 | 005 | e1000 |
| bil (Danish) | 50 | 006 | e1000 |

FIG. 7C polysemous words table 576

| textual words 572 | identigen 518 | | entigens 520 |
|---|---|---|---|
| | meaning ID 538 | instance ID 540 | |
| duck (bird) | 116937 | 001 | e2000 |
| duck (fabric) | 116938 | 001 | e2001 |
| duck (to submerge) | 112195 | 056 | e2002 |
| duck (to elude) | 010654 | 051 | e2003 |

FIG. 7D words table 580

| textual words 572 | identigen (IDN) 518 | | | entigens (ENI) 520 |
|---|---|---|---|---|
| | meaning ID 538 | instance ID 540 | type ID 542 | |
| pilot (flyer) | 150 | 001 | itenym (item) | e717 |
| pilot (to fly) | 291 | 001 | actenym (action) | e4320 |
| Tom (person) | 457 | 001 | itenym (item) | e61 |
| Tom (male animal) | 648 | 001 | itenym (item) | e930 |
| tall (attribute - height) | 823 | 001 | attrenym (attribute) | e90 |
| tall (attribute - unlikely) | 399 | 001 | attrenym (attribute) | e729 |

⇒ apply rules to identigens of word strings to validate

| pilot (to fly) | Tom (male an) | IDN 291.001 | IDN 648.001 | ✗ |
| pilot (flyer) | Tom (male an) | IDN 150.001 | IDN 648.001 | ✗ |
| pilot (to fly) | Tom (person) | IDN 291.001 | IDN 457.001 | ✗ |
| pilot (flyer) | Tom (person) | IDN 150.001 | IDN 457.001 | ✓ |

| tall (attribute - height) | Tom (male an) | IDN 823.001 | IDN 648.001 | ✓ |
| tall (attribute - unlikely) | Tom (male an) | IDN 399.001 | IDN 648.001 | ✗ |
| tall (attribute - height) | Tom (person) | IDN 823.001 | IDN 457.001 | ✓ |
| tall (attribute - unlikely) | Tom (person) | IDN 399.001 | IDN 457.001 | ✗ |

⇒ list valid groupings groupings table 584

| grouping ID 586 | word strings 588 | identigens (IDN) 518 | | | entigens (ENI) 520 | | |
|---|---|---|---|---|---|---|---|
| 3001 | pilot Tom | IDN 150.001 | IDN 457.001 | | e717 | e61 | |
| 3040 | tall Tom | IDN 823.001 | IDN 648.001 | | e90 | e930 | |
| 3041 | tall Tom | IDN 823.001 | IDN 457.001 | | e90 | e61 | |
| 3070 | tall pilot Tom | IDN 823.001 | IDN 150.001 | IDN 457.001 | e90 | e717 | e61 |

FIG. 7E groupings table 620

| grouping (GRP) ID 586 | word strings 588 | IF string 622 | | THEN string 624 | |
|---|---|---|---|---|---|
| | | IDN string 626 | ENI 628 | IDN string 626 | ENI 628 |
| 5493 | If someone has a tumor, then someone is sick. | someone has | 12aa | someone sick | 12js |
| | | tumor has | 06aa | | |
| 5494 | If someone is sick, then someone is possibly sad. | someone sick | 12js | someone sad | 12ja |
| 5495 | If someone has a tumor, then someone is possibly sad. | someone has | 12aa | someone sad | 12ja |
| | | tumor has | 06aa | possibly sad | 05b | new knowledge inference 630

FIG. 8B

IDENTIFYING UTILIZATION OF INTELLECTUAL PROPERTY

CROSS REFERENCE TO RELATED PATENTS

The present U.S. Utility patent application claims priority pursuant to 35 U.S.C. § 120 as a continuation of U.S. Utility application Ser. No. 17/555,661, entitled "IDENTIFYING UTILIZATION OF INTELLECTUAL PROPERTY," filed Dec. 20, 2021, allowed, which claims priority pursuant to 35 U.S.C. § 120 as a continuation-in-part of U.S. Utility application Ser. No. 17/521,559, entitled "GENERATING A TIMELY RESPONSE TO A QUERY," filed Nov. 8, 2021, allowed, which claims priority pursuant to 35 U.S.C. § 120 as a continuation-in-part of U.S. Utility application Ser. No. 16/521,868, entitled "GENERATING A RELIABLE RESPONSE TO A QUERY," filed Jul. 25, 2019, issued on Nov. 16, 2021 as U.S. Pat. No. 11,176,126, which claims priority pursuant to 35 U.S.C. § 119(e) to U.S. Provisional Application No. 62/711,665, entitled "EXTRACTING KNOWLEDGE FROM CONTENT," filed Jul. 30, 2018, all of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates to computing systems and more particularly to generating data representations of data and analyzing the data utilizing the data representations.

Description of Related Art

It is known that data is stored in information systems, such as files containing text. It is often difficult to produce useful information from this stored data due to many factors. The factors include the volume of available data, accuracy of the data, and variances in how text is interpreted to express knowledge. For example, many languages and regional dialects utilize the same or similar words to represent different concepts.

Computers are known to utilize pattern recognition techniques and apply statistical reasoning to process text to express an interpretation in an attempt to overcome ambiguities inherent in words. One pattern recognition technique includes matching a word pattern of a query to a word pattern of the stored data to find an explicit textual answer. Another pattern recognition technique classifies words into major grammatical types such as functional words, nouns, adjectives, verbs and adverbs. Grammar based techniques then utilize these grammatical types to study how words should be distributed within a string of words to form a properly constructed grammatical sentence where each word is forced to support a grammatical operation without necessarily identifying what the word is actually trying to describe.

BRIEF DESCRIPTION OF THE SEVERAL VIEWS OF THE DRAWING(S)

FIG. 7C is a diagram of an embodiment of a synonym words table within a computing system in accordance with the present invention;

FIG. 7D is a diagram of an embodiment of a polysemous words table within a computing system in accordance with the present invention;

FIG. 7E is a diagram of an embodiment of transforming words into groupings within a computing system in accordance with the present invention;

FIG. 8B is a diagram of an embodiment of a groupings table within a computing system in accordance with the present invention;

DETAILED DESCRIPTION OF THE INVENTION

Figure 1:
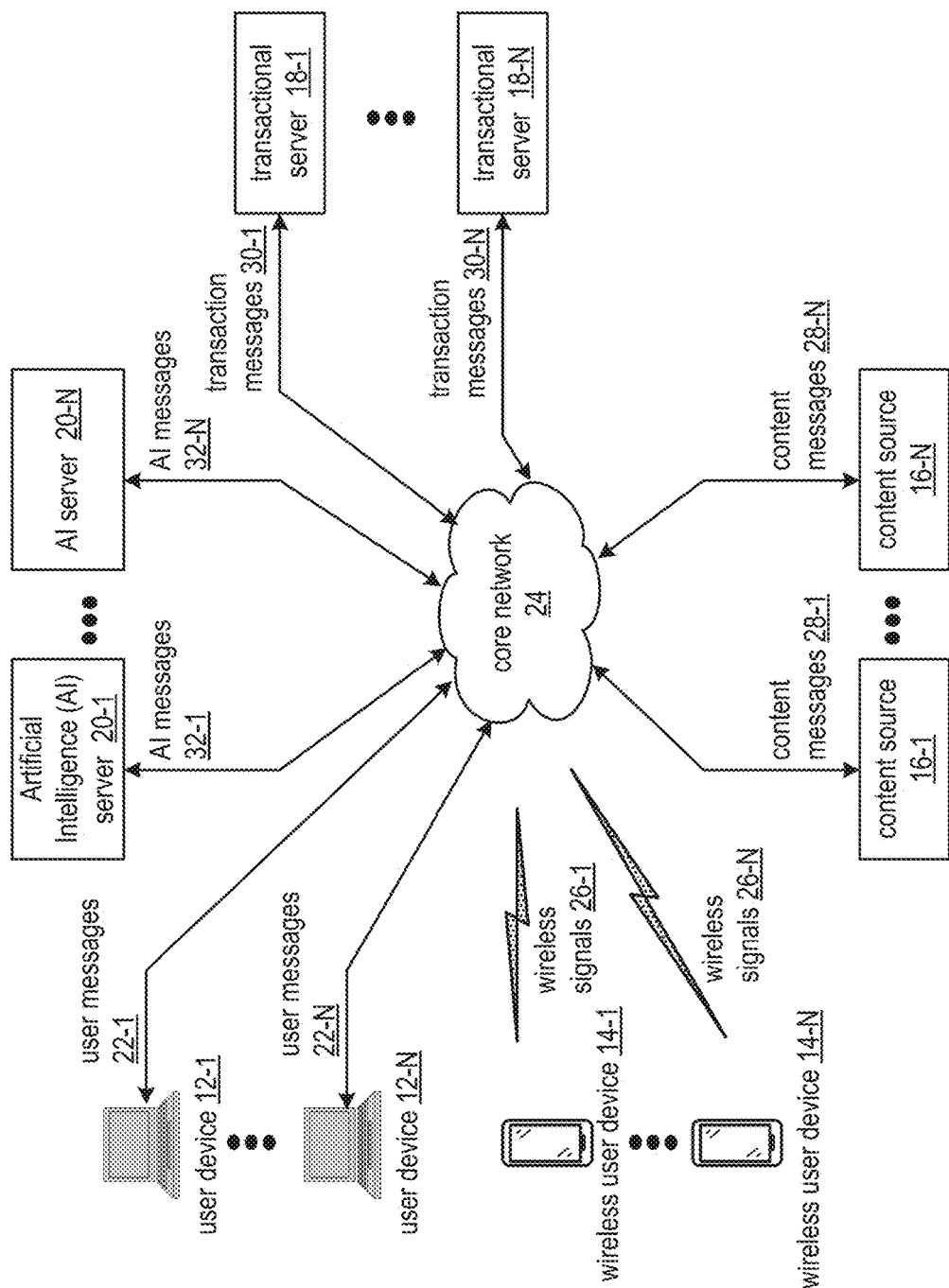
FIG. 1 is a schematic block diagram of an embodiment of a computing system in accordance with the present invention.

FIG. 1 is a schematic block diagram of an embodiment of a computing system 10 that includes a plurality of user devices 12-1 through 12-N, a plurality of wireless user devices 14-1 through 14-N, a plurality of content sources 16-1 through 16-N, a plurality of transactional servers 18-1 through 18-N, a plurality of artificial intelligence (AI) servers 20-1 through 20-N, and a core network 24. The core network 24 includes at least one of the Internet, a public radio access network (RAN), and any private network. Hereafter, the computing system 10 may be interchangeably referred to as a data network, a data communication network, a system, a communication system, and a data communication system. Hereafter, the user device and the wireless user device may be interchangeably referred to as user devices, and each of the transactional servers and the AI servers may be interchangeably referred to as servers.

Each user device, wireless user device, transactional server, and AI server includes a computing device that includes a computing core. In general, a computing device is any electronic device that can communicate data, process data, and/or store data. A further generality of a computing device is that it includes one or more of a central processing unit (CPU), a memory system, a sensor (e.g., internal or external), user input/output interfaces, peripheral device interfaces, communication elements, and an interconnecting bus structure.

As further specific examples, each of the computing devices may be a portable computing device and/or a fixed computing device. A portable computing device may be an embedded controller, a smart sensor, a smart pill, a social networking device, a gaming device, a cell phone, a smart phone, a robot, a personal digital assistant, a digital music player, a digital video player, a laptop computer, a handheld computer, a tablet, a video game controller, an engine controller, a vehicular controller, an aircraft controller, a maritime vessel controller, and/or any other portable device that includes a computing core. A fixed computing device may be security camera, a sensor device, a household appliance, a machine, a robot, an embedded controller, a personal computer (PC), a computer server, a cable set-top box, a satellite receiver, a television set, a printer, a fax machine, home entertainment equipment, a camera controller, a video game console, a critical infrastructure controller, and/or any type of home or office computing equipment that includes a computing core. An embodiment of the various servers is discussed in greater detail with reference to FIG. 2. An embodiment of the various devices is discussed in greater detail with reference to FIG. 3.

Each of the content sources 16-1 through 16-N includes any source of content, where the content includes one or more of data files, a data stream, a tech stream, a text file, an audio stream, an audio file, a video stream, a video file, etc. Examples of the content sources include a weather service, a multi-language online dictionary, a fact server, a big data storage system, the Internet, social media systems, an email server, a news server, a schedule server, a traffic monitor, a security camera system, audio monitoring equipment, an information server, a service provider, a data aggregator, and airline traffic server, a shipping and logistics server, a banking server, a financial transaction server, etc. Alternatively, or in addition to, one or more of the various user devices may provide content. For example, a wireless user device may provide content (e.g., issued as a content message) when the wireless user device is able to capture data (e.g., text input, sensor input, etc.).

Generally, an embodiment of this invention presents solutions where the computing system 10 supports the generation and utilization of knowledge extracted from content. For example, the AI servers 20-1 through 20-N ingest content from the content sources 16-1 through 16-N by receiving, via the core network 24 content messages 28-1 through 28-N as AI messages 32-1 through 32-N, extract the knowledge from the ingested content, and interact with the various user devices to utilize the extracted knowledge by facilitating the issuing, via the core network 24, user messages 22-1 through 22-N to the user devices 12-1 through 12-N and wireless signals 26-1 through 26-N to the wireless user devices 14-1 through 14-N.

Each content message 28-1 through 28-N includes a content request (e.g., requesting content related to a topic, content type, content timing, one or more domains, etc.) or a content response, where the content response includes real-time or static content such as one or more of dictionary information, facts, non-facts, weather information, sensor data, news information, blog information, social media content, user daily activity schedules, traffic conditions, community event schedules, school schedules, user schedules airline records, shipping records, logistics records, banking records, census information, global financial history information, etc. Each AI message 32-1 through 32-N includes one or more of content messages, user messages (e.g., a query request, a query response that includes an answer to a query request), and transaction messages (e.g., transaction information, requests and responses related to transactions). Each user message 22-1 through 22-N includes one or more of a query request, a query response, a trigger request, a trigger response, a content collection, control information, software information, configuration information, security information, routing information, addressing information, presence information, analytics information, protocol information, all types of media, sensor data, statistical data, user data, error messages, etc.

When utilizing a wireless signal capability of the core network 24, each of the wireless user devices 14-1 through 14-N encodes/decodes data and/or information messages (e.g., user messages such as user messages 22-1 through 22-N) in accordance with one or more wireless standards for local wireless data signals (e.g., Wi-Fi, Bluetooth, ZigBee) and/or for wide area wireless data signals (e.g., 2G, 3G, 4G, 5G, satellite, point-to-point, etc.) to produce wireless signals 26-1 through 26-N. Having encoded/decoded the data and/or information messages, the wireless user devices 14-1 through 14-N and/receive the wireless signals to/from the wireless capability of the core network 24.

As another example of the generation and utilization of knowledge, the transactional servers 18-1 through 18-N communicate, via the core network 24, transaction messages 30-1 through 30-N as further AI messages 32-1 through 32-N to facilitate ingesting of transactional type content (e.g., real-time crypto currency transaction information) and to facilitate handling of utilization of the knowledge by one or more of the transactional servers (e.g., for a transactional function) in addition to the utilization of the knowledge by the various user devices. Each transaction message 30-1 through 30-N includes one or more of a query request, a query response, a trigger request, a trigger response, a content message, and transactional information, where the transactional information may include one or more of consumer purchasing history, crypto currency ledgers, stock market trade information, other investment transaction information, etc.

In another specific example of operation of the generation and utilization of knowledge extracted from the content, the user device 12-1 issues a user message 22-1 to the AI server 20-1, where the user message 22-1 includes a query request and where the query request includes a question related to a first domain of knowledge. The issuing includes generating the user message 22-1 based on the query request (e.g., the question), selecting the AI server 20-1 based on the first domain of knowledge, and sending, via the core network 24, the user message 22-1 as a further AI message 32-1 to the AI server 20-1. Having received the AI message 32-1, the AI server 20-1 analyzes the question within the first domain, generates further knowledge, generates a preliminary answer, generates a quality level indicator of the preliminary answer, and determines to gather further content when the quality level indicator is below a minimum quality threshold level.

When gathering the further content, the AI server 20-1 issues, via the core network 24, a still further AI message 32-1 as a further content message 28-1 to the content source 16-1, where the content message 28-1 includes a content request for more content associated with the first domain of knowledge and in particular the question. Alternatively, or in addition to, the AI server 20-1 issues the content request to another AI server to facilitate a response within a domain associated with the other AI server. Further alternatively, or in addition to, the AI server 20-1 issues the content request to one or more of the various user devices to facilitate a response from a subject matter expert.

Having received the content message 28-1, the contents or 16-1 issues, via the core network 24, a still further content message 28-1 to the AI server 20-1 as a yet further AI message 32-1, where the still further content message 28-1 includes requested content. The AI server 20-1 processes the received content to generate further knowledge. Having generated the further knowledge, the AI server 20-1 re-analyzes the question, generates still further knowledge, generates another preliminary answer, generates another quality level indicator of the other preliminary answer, and determines to issue a query response to the user device 12-1 when the quality level indicator is above the minimum quality threshold level. When issuing the query response, the AI server 20-1 generates an AI message 32-1 that includes another user message 22-1, where the other user message 22-1 includes the other preliminary answer as a query response including the answer to the question. Having generated the AI message 32-1, the AI server 20-1 sends, via the core network 24, the AI message 32-1 as the user message 22-1 to the user device 12-1 thus providing the answer to the original question of the query request.

Figure 2:
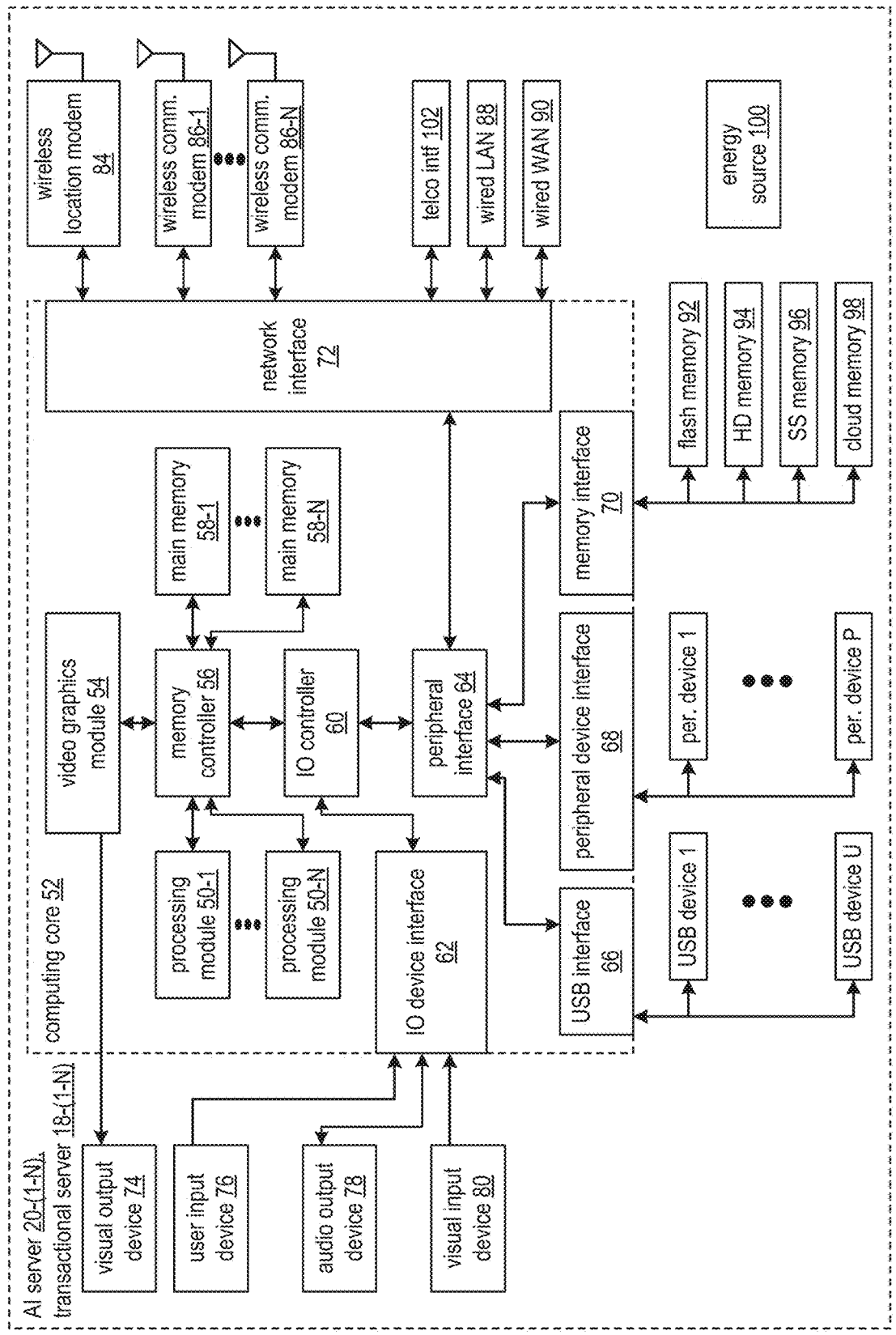
FIG. 2 is a schematic block diagram of an embodiment of various servers of a computing system in accordance with the present invention.

FIG. 2 is a schematic block diagram of an embodiment of the AI servers 20-1 through 20-N and the transactional servers 18-1 through 18-N of the computing system 10 of FIG. 1. The servers include a computing core 52, one or more visual output devices 74 (e.g., video graphics display, touchscreen, LED, etc.), one or more user input devices 76 (e.g., keypad, keyboard, touchscreen, voice to text, a push button, a microphone, a card reader, a door position switch, a biometric input device, etc.), one or more audio output devices 78 (e.g., speaker(s), headphone jack, a motor, etc.), and one or more visual input devices 80 (e.g., a still image camera, a video camera, photocell, etc.).

The servers further include one or more universal serial bus (USB) devices (USB devices 1-U), one or more peripheral devices (e.g., peripheral devices 1-P), one or more memory devices (e.g., one or more flash memory devices 92, one or more hard drive (HD) memories 94, and one or more solid state (SS) memory devices 96, and/or cloud memory 98). The servers further include one or more wireless location modems 84 (e.g., global positioning satellite (GPS), Wi-Fi, angle of arrival, time difference of arrival, signal strength, dedicated wireless location, etc.), one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.), a telco interface 102 (e.g., to interface to a public switched telephone network), and a wired local area network (LAN) 88 (e.g., optical, electrical), and a wired wide area network (WAN) 90 (e.g., optical, electrical).

The computing core 52 includes a video graphics module 54, one or more processing modules 50-1 through 50-N (e.g., which may include one or more secure co-processors), a memory controller 56 and one or more main memories 58-1 through 58-N (e.g., RAM serving as local memory). The computing core 52 further includes one or more input/output (I/O) device interfaces 62, an input/output (I/O) controller 60, a peripheral interface 64, one or more USB interfaces 66, one or more network interfaces 72, one or more memory interfaces 70, and/or one or more peripheral device interfaces 68.

The processing modules may be a single processing device or a plurality of processing devices where the processing device may further be referred to as one or more of a "processing circuit", a "processor", and/or a "processing unit". Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network).

Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Each of the interfaces 62, 66, 68, 70, and 72 includes a combination of hardware (e.g., connectors, wiring, etc.) and may further include operational instructions stored on memory (e.g., driver software) that are executed by one or more of the processing modules 50-1 through 50-N and/or a processing circuit within the interface. Each of the interfaces couples to one or more components of the servers. For example, one of the JO device interfaces 62 couples to an audio output device 78. As another example, one of the memory interfaces 70 couples to flash memory 92 and another one of the memory interfaces 70 couples to cloud memory 98 (e.g., an on-line storage system and/or on-line backup system). In other embodiments, the servers may include more or less devices and modules than shown in this example embodiment of the servers.

Figure 3:
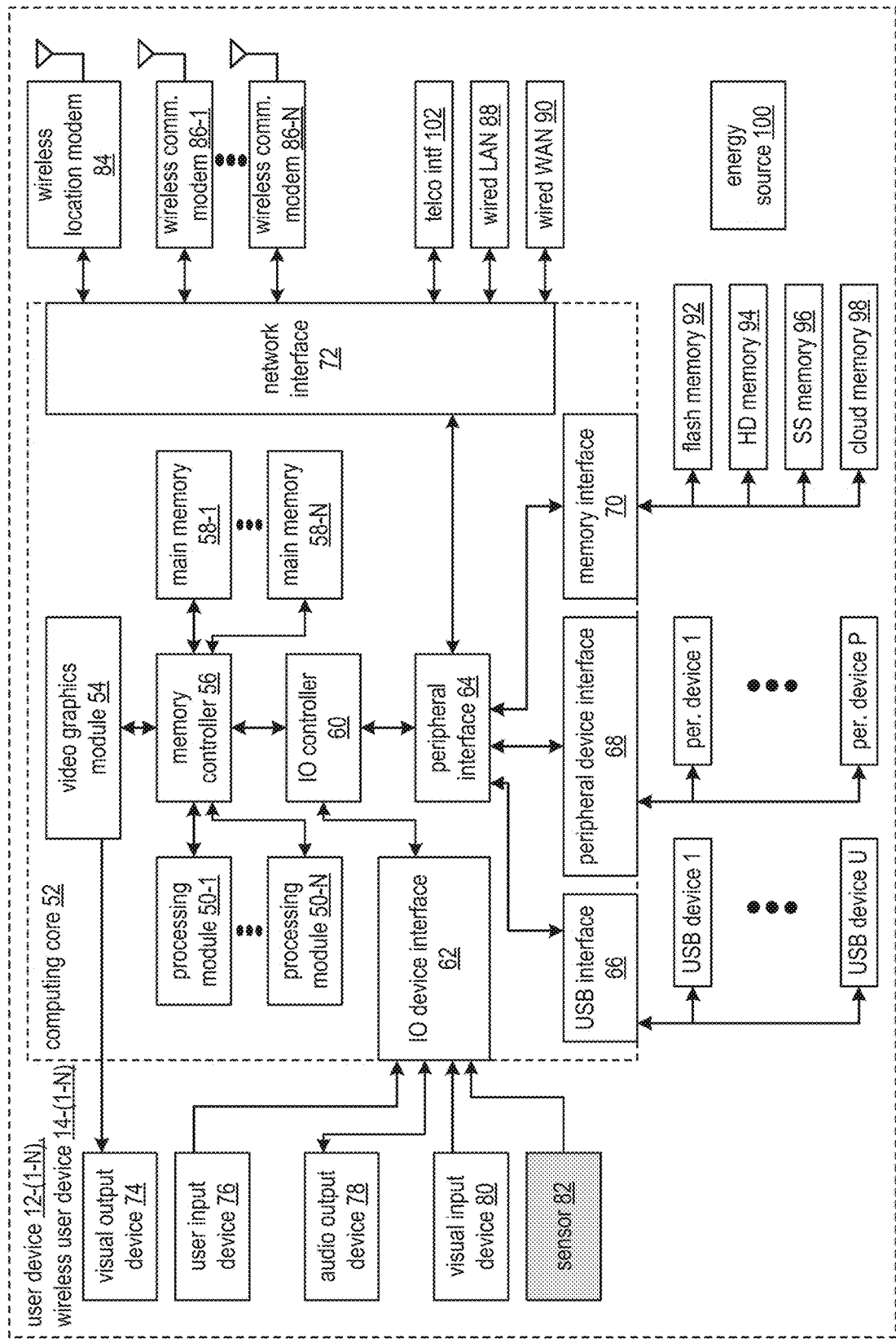
FIG. 3 is a schematic block diagram of an embodiment of various devices of a computing system in accordance with the present invention.

FIG. 3 is a schematic block diagram of an embodiment of the various devices of the computing system of FIG. 1, including the user devices 12-1 through 12-N and the wireless user devices 14-1 through 14-N. The various devices include the visual output device 74 of FIG. 2, the user input device 76 of FIG. 2, the audio output device 78 of FIG. 2, the visual input device 80 of FIG. 2, and one or more sensors 82.

The sensor may be implemented internally and/or externally to the device. Example sensors includes a still camera, a video camera, servo motors associated with a camera, a position detector, a smoke detector, a gas detector, a motion sensor, an accelerometer, velocity detector, a compass, a gyro, a temperature sensor, a pressure sensor, an altitude sensor, a humidity detector, a moisture detector, an imaging sensor, and a biometric sensor. Further examples of the sensor include an infrared sensor, an audio sensor, an ultrasonic sensor, a proximity detector, a magnetic field detector, a biomaterial detector, a radiation detector, a weight detector, a density detector, a chemical analysis detector, a fluid flow volume sensor, a DNA reader, a wind speed sensor, a wind direction sensor, and an object detection sensor.

Further examples of the sensor include an object identifier sensor, a motion recognition detector, a battery level detector, a room temperature sensor, a sound detector, a smoke detector, an intrusion detector, a motion detector, a door position sensor, a window position sensor, and a sunlight detector. Still further sensor examples include medical category sensors including: a pulse rate monitor, a heart rhythm monitor, a breathing detector, a blood pressure monitor, a blood glucose level detector, blood type, an electrocardiogram sensor, a body mass detector, an imaging sensor, a microphone, body temperature, etc.

The various devices further include the computing core 52 of FIG. 2, the one or more universal serial bus (USB) devices (USB devices 1-U) of FIG. 2, the one or more peripheral devices (e.g., peripheral devices 1-P) of FIG. 2, and the one or more memories of FIG. 2 (e.g., flash memories 92, HD memories 94, SS memories 96, and/or cloud memories 98). The various devices further include the one or more wireless location modems 84 of FIG. 2, the one or more wireless communication modems 86-1 through 86-N of FIG. 2, the telco interface 102 of FIG. 2, the wired local area network (LAN) 88 of FIG. 2, and the wired wide area network (WAN) 90 of FIG. 2. In other embodiments, the various devices may include more or less internal devices and modules than shown in this example embodiment of the various devices.

Figure 4A:
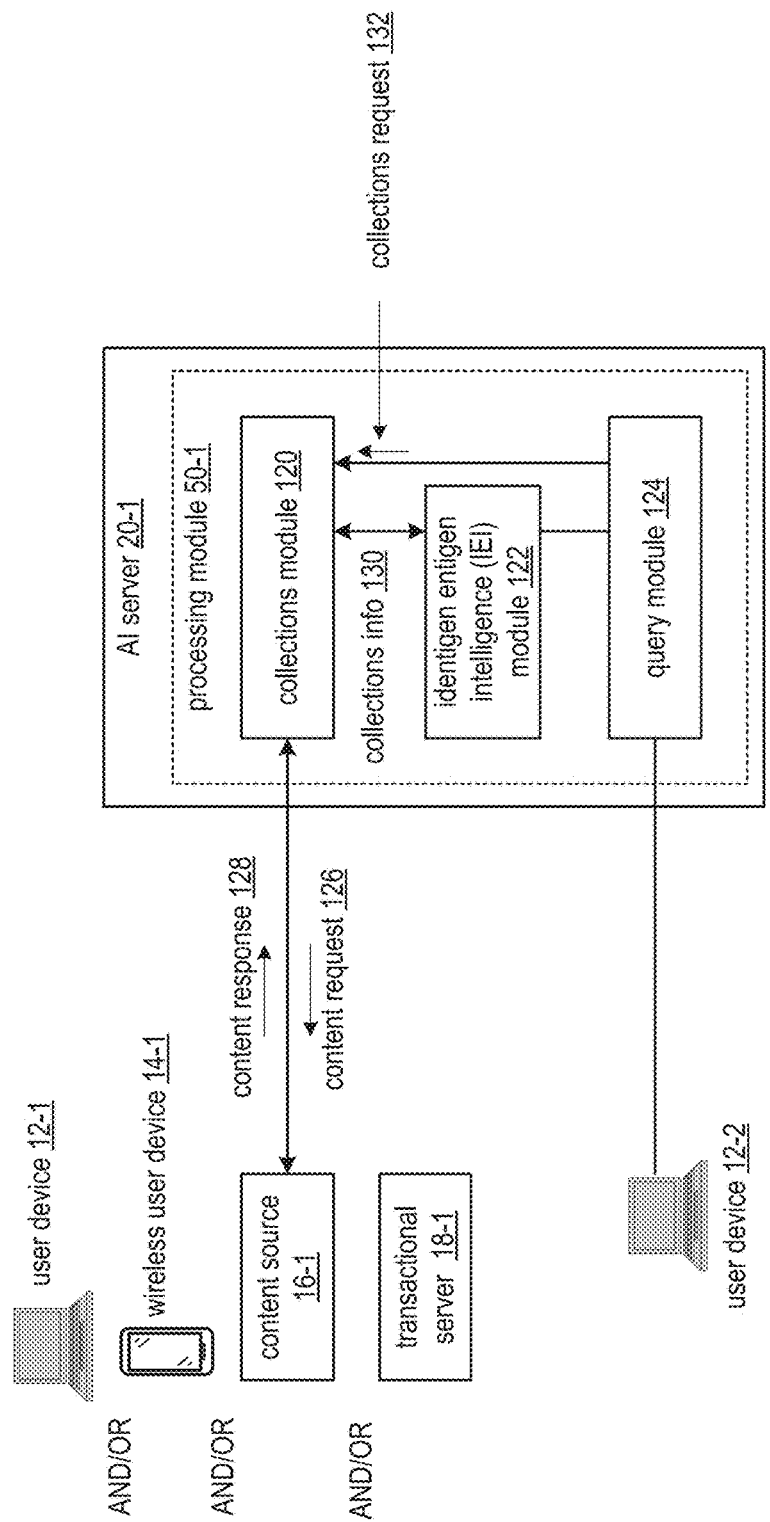
FIGS. 4A and 4B are schematic block diagrams of another embodiment of a computing system in accordance with the present invention.
Figure 4B:
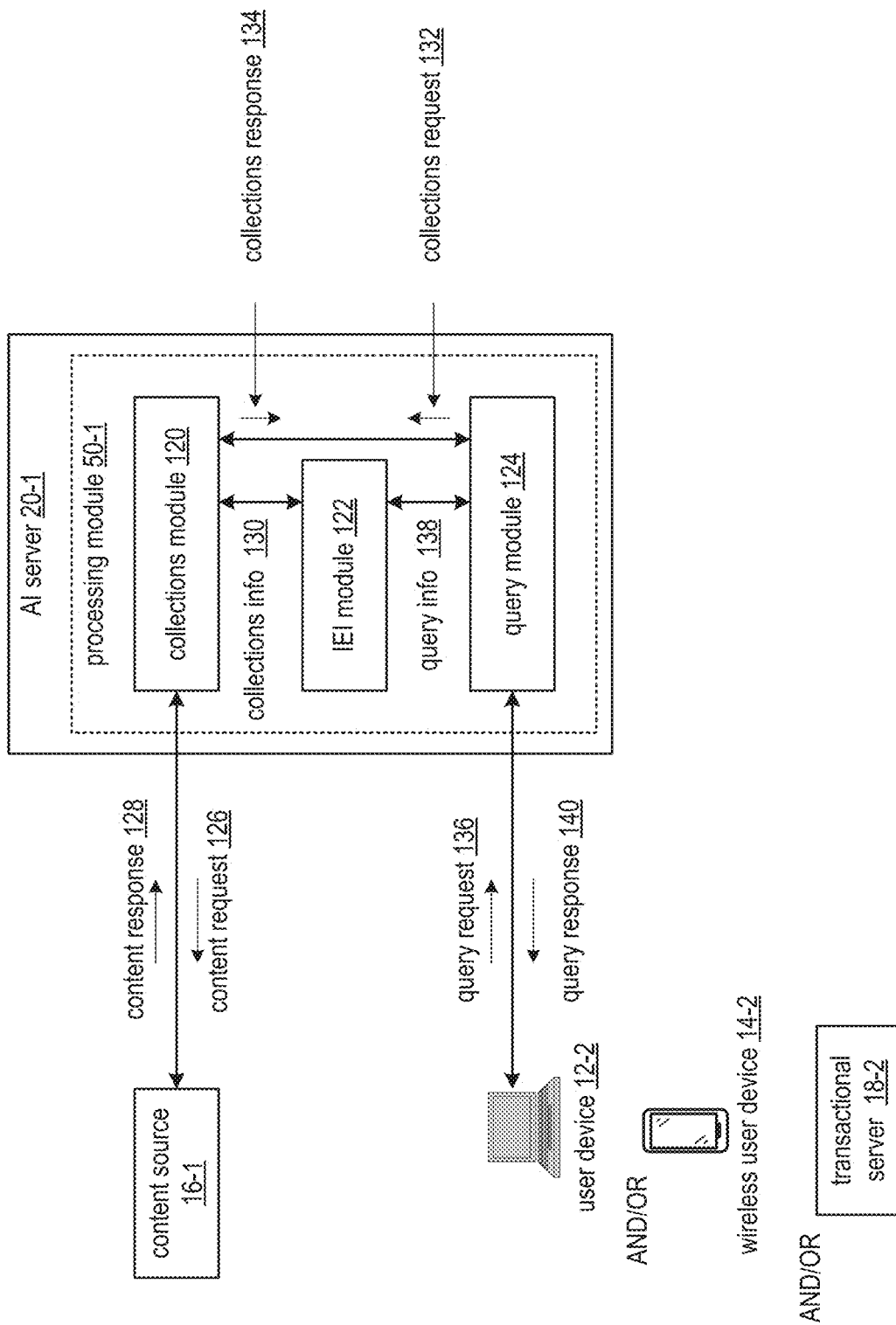

FIGS. 4A and 4B are schematic block diagrams of another embodiment of a computing system that includes one or more of the user device 12-1 of FIG. 1, the wireless user device 14-1 of FIG. 1, the content source 16-1 of FIG. 1, the transactional server 18-1 of FIG. 1, the user device 12-2 of FIG. 1, and the AI server 20-1 of FIG. 1. The AI server 20-1 includes the processing module 50-1 (e.g., associated with the servers) of FIG. 2, where the processing module 50-1 includes a collections module 120, an identigen entigen intelligence (IEI) module 122, and a query module 124. Alternatively, the collections module 120, the IEI module 122, and the query module 124 may be implemented by the processing module 50-1 (e.g., associated with the various user devices) of FIG. 3. The computing system functions to interpret content to produce a response to a query.

FIG. 4A illustrates an example of the interpreting of the content to produce the response to the query where the collections module 120 interprets (e.g., based on an interpretation approach such as rules) at least one of a collections request 132 from the query module 124 and a collections request within collections information 130 from the IEI module 122 to produce content request information (e.g., potential sources, content descriptors of desired content). Alternatively, or in addition to, the collections module 120 may facilitate gathering further content based on a plurality of collection requests from a plurality of devices of the computing system 10 of FIG. 1.

The collections request 132 is utilized to facilitate collection of content, where the content may be received in a real-time fashion once or at desired intervals, or in a static fashion from previous discrete time frames. For instance, the query module 124 issues the collections request 132 to facilitate collection of content as a background activity to support a long-term query (e.g., how many domestic airline flights over the next seven days include travelers between the age of 18 and 35 years old). The collections request 132 may include one or more of a requester identifier (ID), a content type (e.g., language, dialect, media type, topic, etc.), a content source indicator, security credentials (e.g., an authorization level, a password, a user ID, parameters utilized for encryption, etc.), a desired content quality level, trigger information (e.g., parameters under which to collect content based on a pre-event, an event (i.e., content quality level reaches a threshold to cause the trigger, trueness), or a timeframe), a desired format, and a desired timing associated with the content.

Having interpreted the collections request 132, the collections module 120 selects a source of content based on the content request information. The selecting includes one or more of identifying one or more potential sources based on the content request information, selecting the source of content from the potential sources utilizing a selection approach (e.g., favorable history, a favorable security level, favorable accessibility, favorable cost, favorable performance, etc.). For example, the collections module 120 selects the content source 16-1 when the content source 16-1 is known to provide a favorable content quality level for a domain associated with the collections request 132.

Having selected the source of content, the collections module 120 issues a content request 126 to the selected source of content. The issuing includes generating the content request 126 based on the content request information for the selected source of content and sending the content request 126 to the selected source of content. The content request 126 may include one or more of a content type indicator, a requester ID, security credentials for content access, and any other information associated with the collections request 132. For example, the collections module 120 sends the content request 126, via the core network 24 of FIG. 1, to the content source 16-1. Alternatively, or in addition to, the collections module 120 may send a similar content request 126 to one or more of the user device 12-1, the wireless user device 14-1, and the transactional server 18-1 to facilitate collecting of further content.

In response to the content request 126, the collections module 120 receives one or more content responses 128. The content response 128 includes one or more of content associated with the content source, a content source identifier, security credential processing information, and any other information pertaining to the desired content. Having received the content response 128, the collections module 120 interprets the received content response 128 to produce collections information 130, where the collections information 130 further includes a collections response from the collections module 120 to the IEI module 122.

The collections response includes one or more of transformed content (e.g., completed sentences and paragraphs), timing information associated with the content, a content source ID, and a content quality level. Having generated the collections response of the collections information 130, the collections module 120 sends the collections information 130 to the IEI module 122. Having received the collections information 130 from the collections module 120, the IEI module 122 interprets the further content of the content response to generate further knowledge, where the further knowledge is stored in a memory associated with the IEI module 122 to facilitate subsequent answering of questions posed in received queries.

FIG. 4B further illustrates the example of the interpreting of the content to produce the response to the query where, the query module 124 interprets a received query request 136 from a requester to produce an interpretation of the query request. For example, the query module 124 receives the query request 136 from the user device 12-2, and/or from one or more of the wireless user device 14-2 and the transactional server 18-2. The query request 136 includes one or more of an identifier (ID) associated with the request (e.g., requester ID, ID of an entity to send a response to), a question, question constraints (e.g., within a timeframe, within a geographic area, within a domain of knowledge, etc.), and content associated with the question (e.g., which may be analyzed for new knowledge itself).

The interpreting of the query request 136 includes determining whether to issue a request to the IEI module 122 (e.g., a question, perhaps with content) and/or to issue a request to the collections module 120 (e.g., for further background content). For example, the query module 124 produces the interpretation of the query request to indicate to send the request directly to the IEI module 122 when the question is associated with a simple non-time varying function answer (e.g., question: "how many hydrogen atoms does a molecule of water have?").

Having interpreted the query request 136, the query module 124 issues at least one of an IEI request as query information 138 to the IEI module 122 (e.g., when receiving a simple new query request) and a collections request 132 to the collections module 120 (e.g., based on two or more query requests 136 requiring more substantive content gathering). The IEI request of the query information 138 includes one or more of an identifier (ID) of the query module 124, an ID of the requester (e.g., the user device 12-2), a question (e.g., with regards to content for analysis, with regards to knowledge minded by the AI server from general content), one or more constraints (e.g., assumptions, restrictions, etc.) associated with the question, content for analysis of the question, and timing information (e.g., a date range for relevance of the question).

Having received the query information 138 that includes the IEI request from the query module 124, the IEI module 122 determines whether a satisfactory response can be generated based on currently available knowledge, including that of the query request 136. The determining includes indicating that the satisfactory response cannot be generated when an estimated quality level of an answer falls below a minimum quality threshold level. When the satisfactory response cannot be generated, the IEI module 122 facilitates collecting more content. The facilitating includes issuing a collections request to the collections module 120 of the AI server 20-1 and/or to another server or user device, and interpreting a subsequent collections response 134 of collections information 130 that includes further content to produce further knowledge to enable a more favorable answer.

When the IEI module 122 indicates that the satisfactory response can be generated, the IEI module 122 issues an IEI response as query information 138 to the query module 124. The IEI response includes one or more of one or more answers, timing relevance of the one or more answers, an estimated quality level of each answer, and one or more assumptions associated with the answer. The issuing includes generating the IEI response based on the collections response 134 of the collections information 130 and the IEI request, and sending the IEI response as the query information 138 to the query module 124. Alternatively, or in addition to, at least some of the further content collected by the collections module 120 is utilized to generate a collections response 134 issued by the collections module 120 to the query module 124. The collections response 134 includes one or more of further content, a content availability indicator (e.g., when, where, required credentials, etc.), a content freshness indicator (e.g., timestamps, predicted time availability), content source identifiers, and a content quality level.

Having received the query information 138 from the IEI module 122, the query module 124 issues a query response 140 to the requester based on the IEI response and/or the collections response 134 directly from the collections module 120, where the collection module 120 generates the collections response 134 based on collected content and the collections request 132. The query response 140 includes one or more of an answer, answer timing, an answer quality level, and answer assumptions.

Figure 4C:
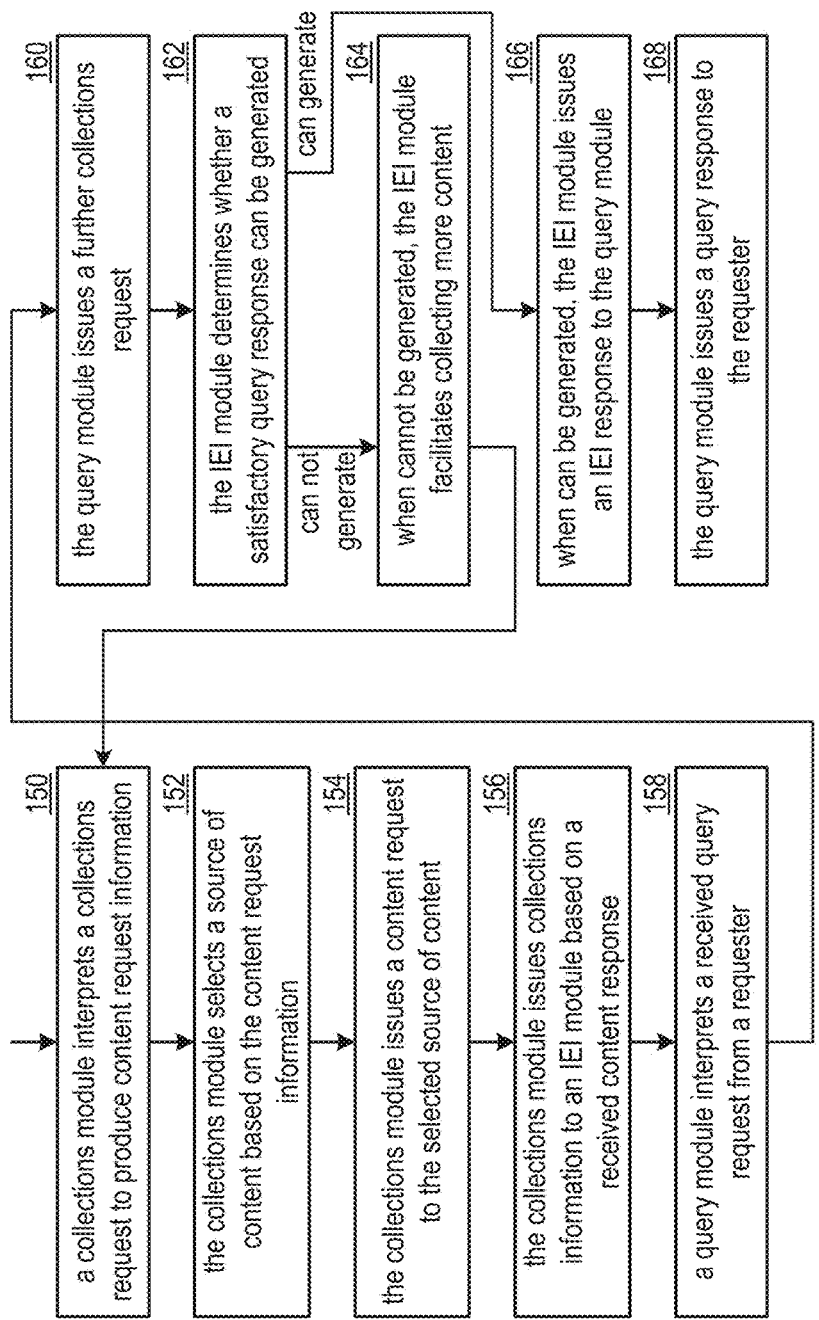
FIG. 4C is a logic diagram of an embodiment of a method for interpreting content to produce a response to a query within a computing system in accordance with the present invention.

FIG. 4C is a logic diagram of an embodiment of a method for interpreting content to produce a response to a query within a computing system. In particular, a method is presented for use in conjunction with one or more functions and features described in conjunction with FIGS. 1-3, 4A-4B, and also FIG. 4C. The method includes step 150 where a collections module of a processing module of one or more computing devices (e.g., of one or more servers) interprets a collections request to produce content request information. The interpreting may include one or more of identifying a desired content source, identifying a content type, identifying a content domain, and identifying content timing requirements.

The method continues at step 152 where the collections module selects a source of content based on the content request information. For example, the collections module identifies one or more potential sources based on the content request information and selects the source of content from the potential sources utilizing a selection approach (e.g., based on one or more of favorable history, a favorable security level, favorable accessibility, favorable cost, favorable performance, etc.). The method continues at step 154 where the collections module issues a content request to the selected source of content. The issuing includes generating a content request based on the content request information for the selected source of content and sending the content request to the selected source of content.

The method continues at step 156 where the collections module issues collections information to an identigen entigen intelligence (IEI) module based on a received content response, where the IEI module extracts further knowledge from newly obtained content from the one or more received content responses. For example, the collections module generates the collections information based on newly obtained content from the one or more received content responses of the selected source of content.

The method continues at step 158 where a query module interprets a received query request from a requester to produce an interpretation of the query request. The interpreting may include determining whether to issue a request to the IEI module (e.g., a question) or to issue a request to the collections module to gather further background content. The method continues at step 160 where the query module issues a further collections request. For example, when receiving a new query request, the query module generates a request for the IEI module. As another example, when receiving a plurality of query requests for similar questions, the query module generates a request for the collections module to gather further background content.

The method continues at step 162 where the IEI module determines whether a satisfactory query response can be generated when receiving the request from the query module. For example, the IEI module indicates that the satisfactory query response cannot be generated when an estimated quality level of an answer is below a minimum answer quality threshold level. The method branches to step 166 when the IEI module determines that the satisfactory query response can be generated. The method continues to step 164 when the IEI module determines that the satisfactory query response cannot be generated. When the satisfactory query response cannot be generated, the method continues at step 164 where the IEI module facilitates collecting more content. The method loops back to step 150.

When the satisfactory query response can be generated, the method continues at step 166 where the IEI module issues an IEI response to the query module. The issuing includes generating the IEI response based on the collections response and the IEI request, and sending the IEI response to the query module. The method continues at step 168 where the query module issues a query response to the requester. For example, the query module generates the query response based on the IEI response and/or a collections response from the collections module and sends the query response to the requester, where the collections module generates the collections response based on collected content and the collections request.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5A:
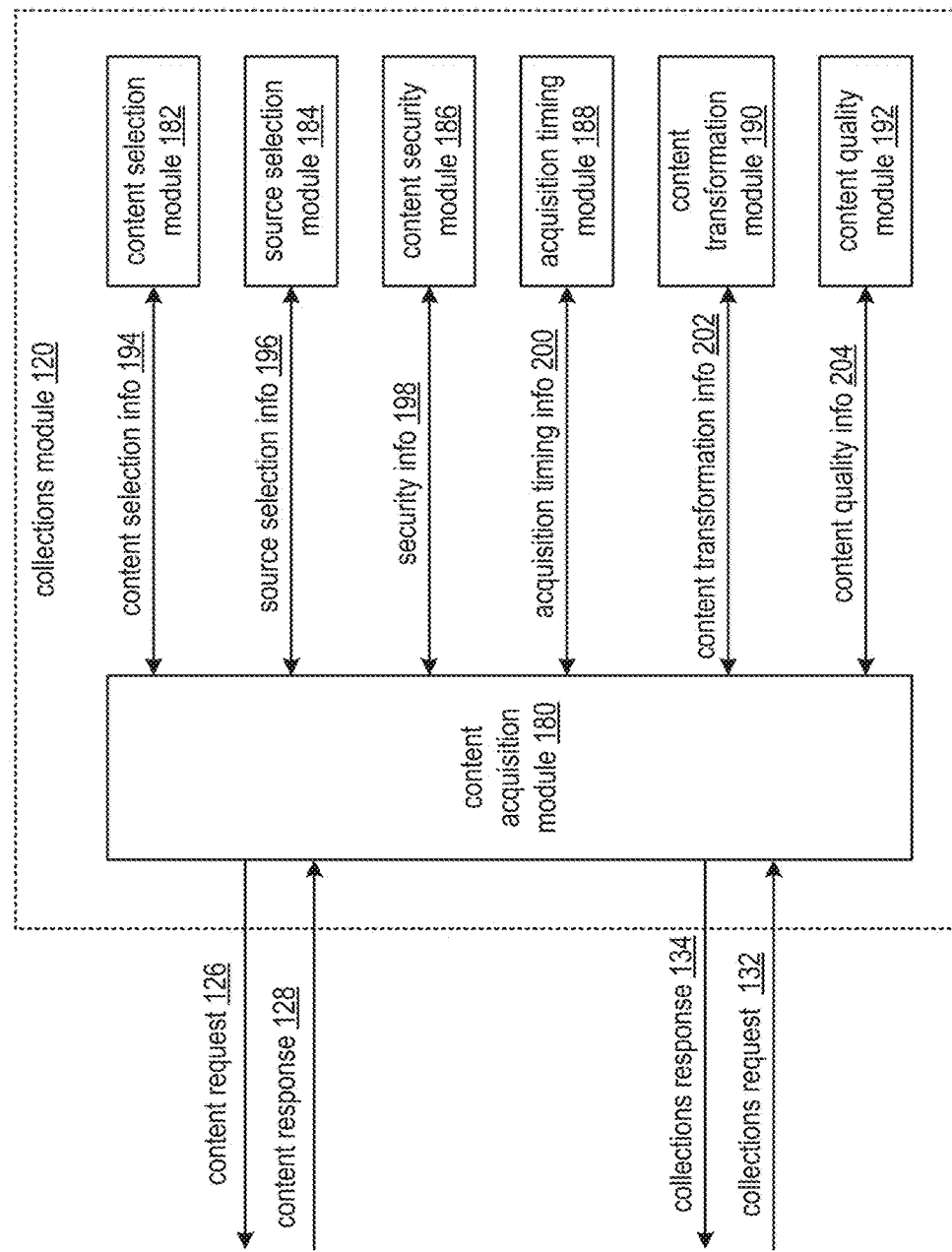
FIG. 5A is a schematic block diagram of an embodiment of a collections module of a computing system in accordance with the present invention.

FIG. 5A is a schematic block diagram of an embodiment of the collections module 120 of FIG. 4A that includes a content acquisition module 180, a content selection module 182, a source selection module 184, a content security module 186, an acquisition timing module 188, a content transformation module 190, and a content quality module 192. Generally, an embodiment of this invention presents solutions where the collections module 120 supports collecting content.

In an example of operation of the collecting of the content, the content acquisition module 180 receives a collections request 132 from a requester. The content acquisition module 180 obtains content selection information 194 based on the collections request 132. The content selection information 194 includes one or more of content requirements, a desired content type indicator, a desired content source identifier, a content type indicator, a candidate source identifier (ID), and a content profile (e.g., a template of typical parameters of the content). For example, the content acquisition module 180 receives the content selection information 194 from the content selection module 182, where the content selection module 182 generates the content selection information 194 based on a content selection information request from the content acquisition module 180 and where the content acquisition module 180 generates the content selection information request based on the collections request 132.

The content acquisition module 180 obtains source selection information 196 based on the collections request 132. The source selection information 196 includes one or more of candidate source identifiers, a content profile, selected sources, source priority levels, and recommended source access timing. For example, the content acquisition module 180 receives the source selection information 196 from the source selection module 184, where the source selection module 184 generates the source selection information 196 based on a source selection information request from the content acquisition module 180 and where the content acquisition module 180 generates the source selection information request based on the collections request 132.

The content acquisition module 180 obtains acquisition timing information 200 based on the collections request 132. The acquisition timing information 200 includes one or more of recommended source access timing, confirmed source access timing, source access testing results, estimated velocity of content update's, content precious, timestamps, predicted time availability, required content acquisition triggers, content acquisition trigger detection indicators, and a duplicative indicator with a pending content request. For example, the content acquisition module 180 receives the acquisition timing information 200 from the acquisition timing module 188, where the acquisition timing module 188 generates the acquisition timing information 200 based on an acquisition timing information request from the content acquisition module 180 and where the content acquisition module 180 generates the acquisition timing information request based on the collections request 132.

Having obtained the content selection information 194, the source selection information 196, and the acquisition timing information 200, the content acquisition module 180 issues a content request 126 to a content source utilizing security information 198 from the content security module 186, where the content acquisition module 180 generates the content request 126 in accordance with the content selection information 194, the source selection information 196, and the acquisition timing information 200. The security information 198 includes one or more of source priority requirements, requester security information, available security procedures, and security credentials for trust and/or encryption. For example, the content acquisition module 180 generates the content request 126 to request a particular content type in accordance with the content selection information 194 and to include security parameters of the security information 198, initiates sending of the content request 126 in accordance with the acquisition timing information 200, and sends the content request 126 to a particular targeted content source in accordance with the source selection information 196.

In response to receiving a content response 128, the content acquisition module 180 determines the quality level of received content extracted from the content response 128. For example, the content acquisition module 180 receives content quality information 204 from the content quality module 192, where the content quality module 192 generates the quality level of the received content based on receiving a content quality request from the content acquisition module 180 and where the content acquisition module 180 generates the content quality request based on content extracted from the content response 128. The content quality information includes one or more of a content reliability threshold range, a content accuracy threshold range, a desired content quality level, a predicted content quality level, and a predicted level of trust.

When the quality level is below a minimum desired quality threshold level, the content acquisition module 180 facilitates acquisition of further content. The facilitating includes issuing another content request 126 to a same content source and/or to another content source to receive and interpret further received content. When the quality level is above the minimum desired quality threshold level, the content acquisition module 180 issues a collections response 134 to the requester. The issuing includes processing the content in accordance with a transformation approach to produce transformed content, generating the collections response 134 to include the transformed content, and sending the collections response 134 to the requester. The processing of the content to produce the transformed content includes receiving content transformation information 202 from the content transformation module 190, where the content transformation module 190 transforms the content in accordance with the transformation approach to produce the transformed content. The content transformation information includes a desired format, available formats, recommended formatting, the received content, transformation instructions, and the transformed content.

Figure 5B:
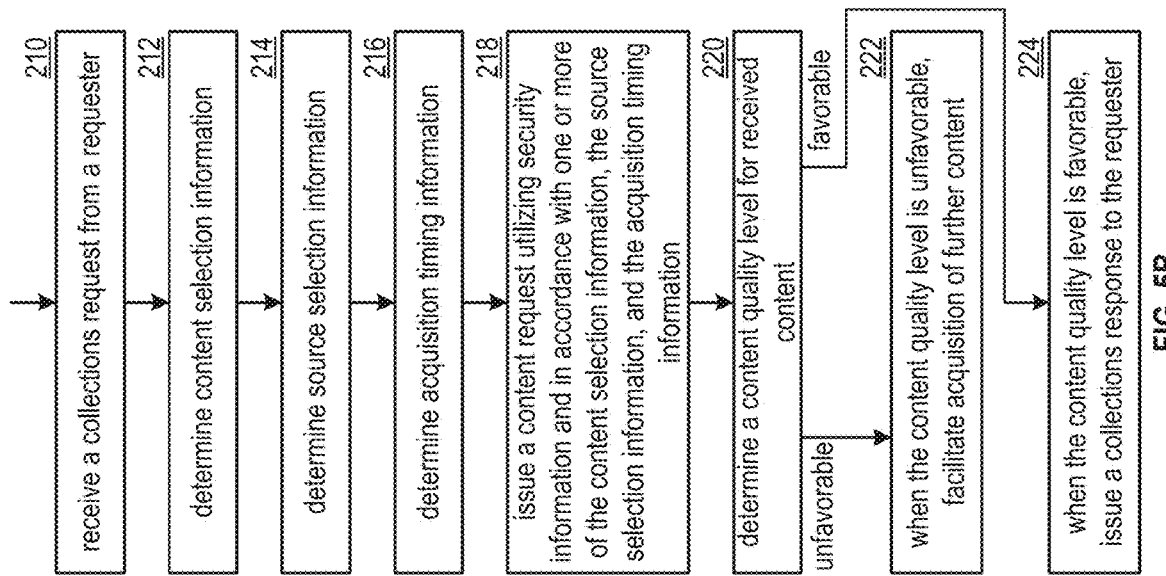
FIG. 5B is a logic diagram of an embodiment of a method for obtaining content within a computing system in accordance with the present invention.

FIG. 5B is a logic diagram of an embodiment of a method for obtaining content within a computing system. In particular, a method is presented for use in conjunction with one or more functions and features described in conjunction with FIGS. 1-3, 4A-4C, 5A, and also FIG. 5B. The method includes step 210 where a processing module of one or more processing modules of one or more computing devices of the computing system receives a collections request from the requester. The method continues at step 212 where the processing module determines content selection information. The determining includes interpreting the collections request to identify requirements of the content.

The method continues at step 214 where the processing module determines source selection information. The determining includes interpreting the collections request to identify and select one or more sources for the content to be collected. The method continues at step 216 where the processing module determines acquisition timing information. The determining includes interpreting the collections request to identify timing requirements for the acquisition of the content from the one or more sources. The method continues at step 218 where the processing module issues a content request utilizing security information and in accordance with one or more of the content selection information, the source selection information, and the acquisition timing information. For example, the processing module issues the content request to the one or more sources for the content in accordance with the content requirements, where the sending of the request is in accordance with the acquisition timing information.

The method continues at step 220 where the processing module determines a content quality level for received content area. The determining includes receiving the content from the one or more sources, obtaining content quality information for the received content based on a quality analysis of the received content. The method branches to step 224 when the content quality level is favorable and the method continues to step 222 when the quality level is unfavorable. For example, the processing module determines that the content quality level is favorable when the content quality level is equal to or above a minimum quality threshold level and determines that the content quality level is unfavorable when the content quality level is less than the minimum quality threshold level.

When the content quality level is unfavorable, the method continues at step 222 where the processing module facilitates acquisition and further content. For example, the processing module issues further content requests and receives further content for analysis. When the content quality level is favorable, the method continues at step 224 where the processing module issues a collections response to the requester. The issuing includes generating the collections response and sending the collections response to the requester. The generating of the collections response may include transforming the received content into transformed content in accordance with a transformation approach (e.g., reformatting, interpreting absolute meaning and translating into another language in accordance with the absolute meaning, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5C:
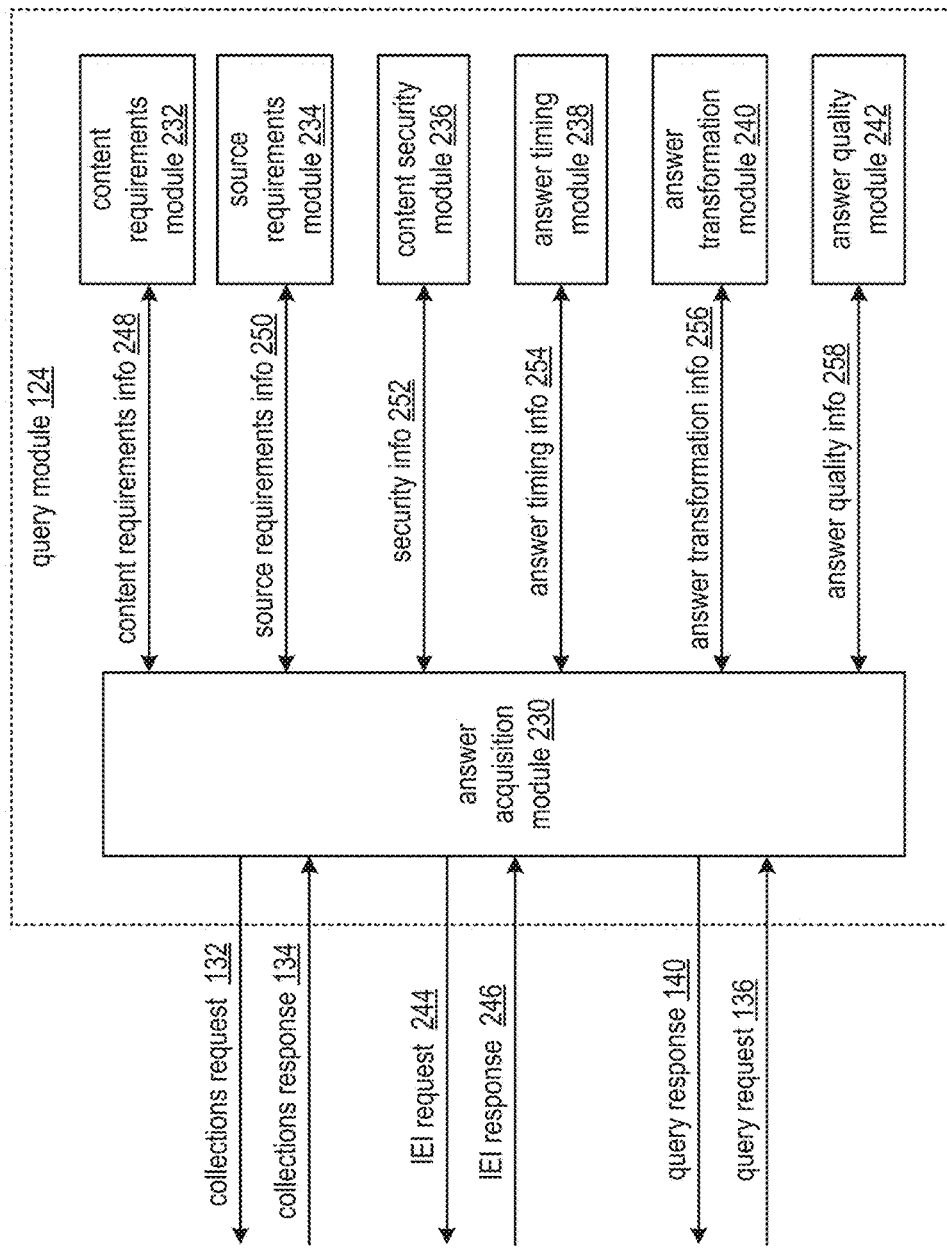
FIG. 5C is a schematic block diagram of an embodiment of a query module of a computing system in accordance with the present invention.

FIG. 5C is a schematic block diagram of an embodiment of the query module 124 of FIG. 4A that includes an answer acquisition module 230, a content requirements module 232, a source requirements module 234, a content security module 236, an answer timing module 238, an answer transformation module 240, and an answer quality module 242. Generally, an embodiment of this invention presents solutions where the query module 124 supports responding to a query.

In an example of operation of the responding to the query, the answer acquisition module 230 receives a query request 136 from a requester. The answer acquisition module 230 obtains content requirements information 248 based on the query request 136. The content requirements information 248 includes one or more of content parameters, a desired content type, a desired content source if any, a content type if any, candidate source identifiers, a content profile, and a question of the query request 136. For example, the answer acquisition module 230 receives the content requirements information 248 from the content requirements module 232, where the content requirements module 232 generates the content requirements information 248 based on a content requirements information request from the answer acquisition module 230 and where the answer acquisition module 230 generates the content requirements information request based on the query request 136.

The answer acquisition module 230 obtains source requirements information 250 based on the query request 136. The source requirements information 250 includes one or more of candidate source identifiers, a content profile, a desired source parameter, recommended source parameters, source priority levels, and recommended source access timing. For example, the answer acquisition module 230 receives the source requirements information 250 from the source requirements module 234, where the source requirements module 234 generates the source requirements information 250 based on a source requirements information request from the answer acquisition module 230 and where the answer acquisition module 230 generates the source requirements information request based on the query request 136.

The answer acquisition module 230 obtains answer timing information 254 based on the query request 136. The answer timing information 254 includes one or more of requested answer timing, confirmed answer timing, source access testing results, estimated velocity of content updates, content freshness, timestamps, predicted time available, requested content acquisition trigger, and a content acquisition trigger detected indicator. For example, the answer acquisition module 230 receives the answer timing information 254 from the answer timing module 238, where the answer timing module 238 generates the answer timing information 254 based on an answer timing information request from the answer acquisition module 230 and where the answer acquisition module 230 generates the answer timing information request based on the query request 136.

Having obtained the content requirements information 248, the source requirements information 250, and the answer timing information 254, the answer acquisition module 230 determines whether to issue an JET request 244 and/or a collections request 132 based on one or more of the content requirements information 248, the source requirements information 250, and the answer timing information 254. For example, the answer acquisition module 230 selects the JET request 244 when an immediate answer to a simple query request 136 is required and is expected to have a favorable quality level. As another example, the answer acquisition module 230 selects the collections request 132 when a longer-term answer is required as indicated by the answer timing information to before and/or when the query request 136 has an unfavorable quality level.

When issuing the JET request 244, the answer acquisition module 230 generates the JET request 244 in accordance with security information 252 received from the content security module 236 and based on one or more of the content requirements information 248, the source requirements information 250, and the answer timing information 254. Having generated the JET request 244, the answer acquisition module 230 sends the JET request 244 to at least one JET module.

When issuing the collections request 132, the answer acquisition module 230 generates the collections request 132 in accordance with the security information 252 received from the content security module 236 and based on one or more of the content requirements information 248, the source requirements information 250, and the answer timing information 254. Having generated the collections request 132, the answer acquisition module 230 sends the collections request 132 to at least one collections module. Alternatively, the answer acquisition module 230 facilitate sending of the collections request 132 to one or more various user devices (e.g., to access a subject matter expert).

The answer acquisition module 230 determines a quality level of a received answer extracted from a collections response 134 and/or an JET response 246. For example, the answer acquisition module 230 extracts the quality level of the received answer from answer quality information 258 received from the answer quality module 242 in response to an answer quality request from the answer acquisition module 230. When the quality level is unfavorable, the answer acquisition module 230 facilitates obtaining a further answer. The facilitation includes issuing at least one of a further JET request 244 and a further collections request 132 to generate a further answer for further quality testing. When the quality level is favorable, the answer acquisition module 230 issues a query response 140 to the requester. The issuing includes generating the query response 140 based on answer transformation information 256 received from the answer transformation module 240, where the answer transformation module 240 generates the answer transformation information 256 to include a transformed answer based on receiving the answer from the answer acquisition module 230. The answer transformation information 250 6A further include the question, a desired format of the answer, available formats, recommended formatting, received JET responses, transformation instructions, and transformed JET responses into an answer.

Figure 5D:
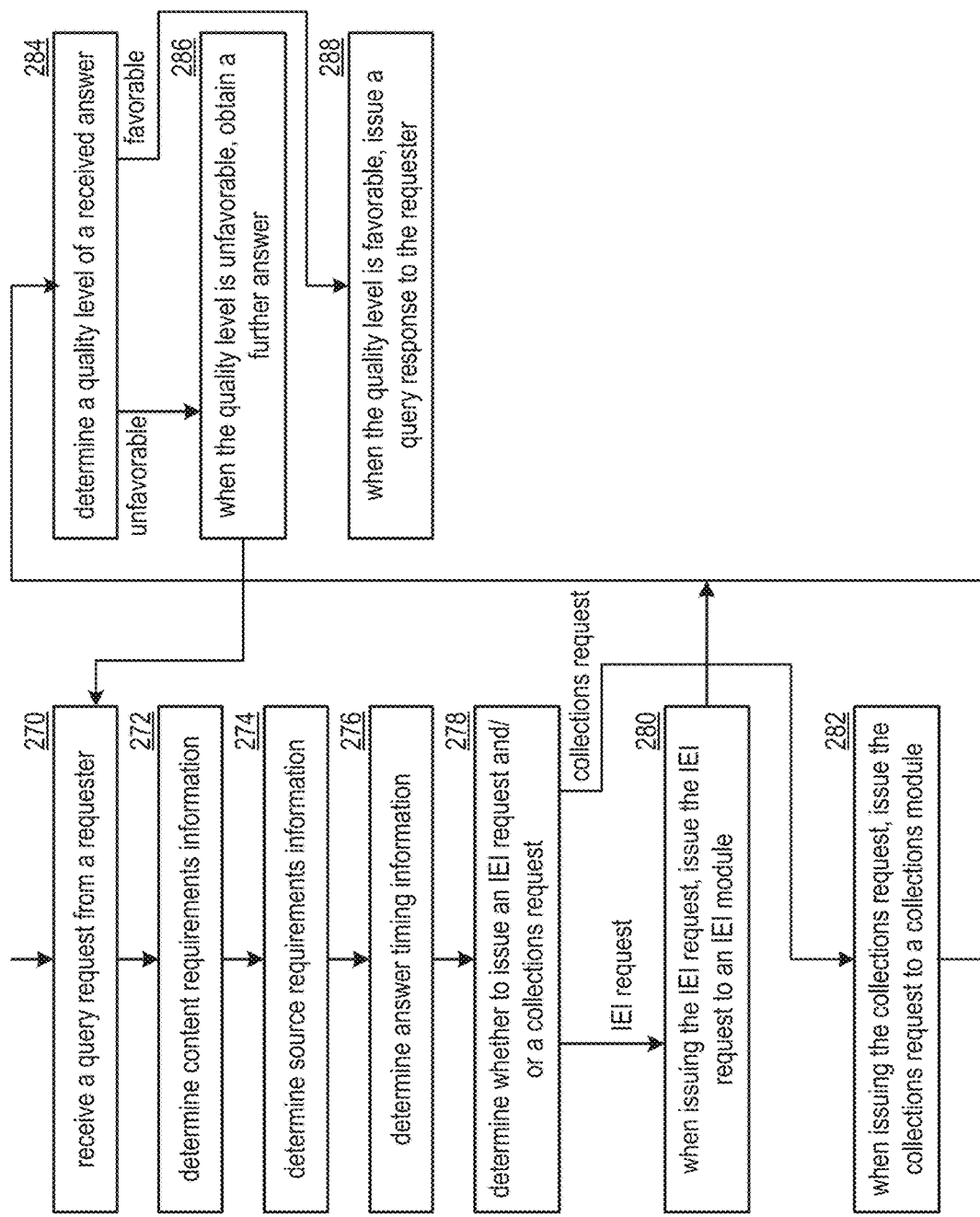
FIG. 5D is a logic diagram of an embodiment of a method for providing a response to a query within a computing system in accordance with the present invention.

FIG. 5D is a logic diagram of an embodiment of a method for providing a response to a query within a computing system. In particular, a method is presented for use in conjunction with one or more functions and features described in conjunction with FIGS. 1-3, 4A-4C, 5C, and also FIG. 5D. The method includes step 270 where a processing module of one or more processing modules of one or more computing devices of the computing system receives a query request (e.g., a question) from a requester.

The method continues at step 272 where the processing module determines content requirements information. The determining includes interpreting the query request to produce the content requirements. The method continues at step 274 where the processing module determines source requirements information. The determining includes interpreting the query request to produce the source requirements. The method continues at step 276 where the processing module determines answer timing information. The determining includes interpreting the query request to produce the answer timing information.

The method continues at step 278 where the processing module determines whether to issue an IEI request and/or a collections request. For example, the determining includes selecting the IEI request when the answer timing information indicates that a simple one-time answer is appropriate. As another example, the processing module selects the collections request when the answer timing information indicates that the answer is associated with a series of events over an event time frame.

When issuing the IEI request, the method continues at step 280 where the processing module issues the IEI request to an IEI module. The issuing includes generating the IEI request in accordance with security information and based on one or more of the content requirements information, the source requirements information, and the answer timing information.

When issuing the collections request, the method continues at step 282 where the processing module issues the collections request to a collections module. The issuing includes generating the collections request in accordance with the security information and based on one or more of the content requirements information, the source requirements information, and the answer timing information. Alternatively, the processing module issues both the IEI request and the collections request when a satisfactory partial answer may be provided based on a corresponding IEI response and a further more generalized and specific answer may be provided based on a corresponding collections response and associated further IEI response.

The method continues at step 284 where the processing module determines a quality level of a received answer. The determining includes extracting the answer from the collections response and/or the IEI response and interpreting the answer in accordance with one or more of the content requirements information, the source requirements information, the answer timing information, and the query request to produce the quality level. The method branches to step 288 when the quality level is favorable and the method continues to step 286 when the quality level is unfavorable. For example, the processing module indicates that the quality level is favorable when the quality level is equal to or greater than a minimum answer quality threshold level. As another example, the processing module indicates that the quality level is unfavorable when the quality level is less than the minimum answer quality threshold level.

When the quality level is unfavorable, the method continues at step 286 where the processing module obtains a further answer. The obtaining includes at least one of issuing a further IEI request and a further collections request to facilitate obtaining of a further answer for further answer quality level testing as the method loops back to step 270. When the quality level is favorable, the method continues at step 288 where the processing module issues a query response to the requester. The issuing includes transforming the answer into a transformed answer in accordance with an answer transformation approach (e.g., formatting, further interpretations of the virtual question in light of the answer and further knowledge) and sending the transformed answer to the requester as the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5E:
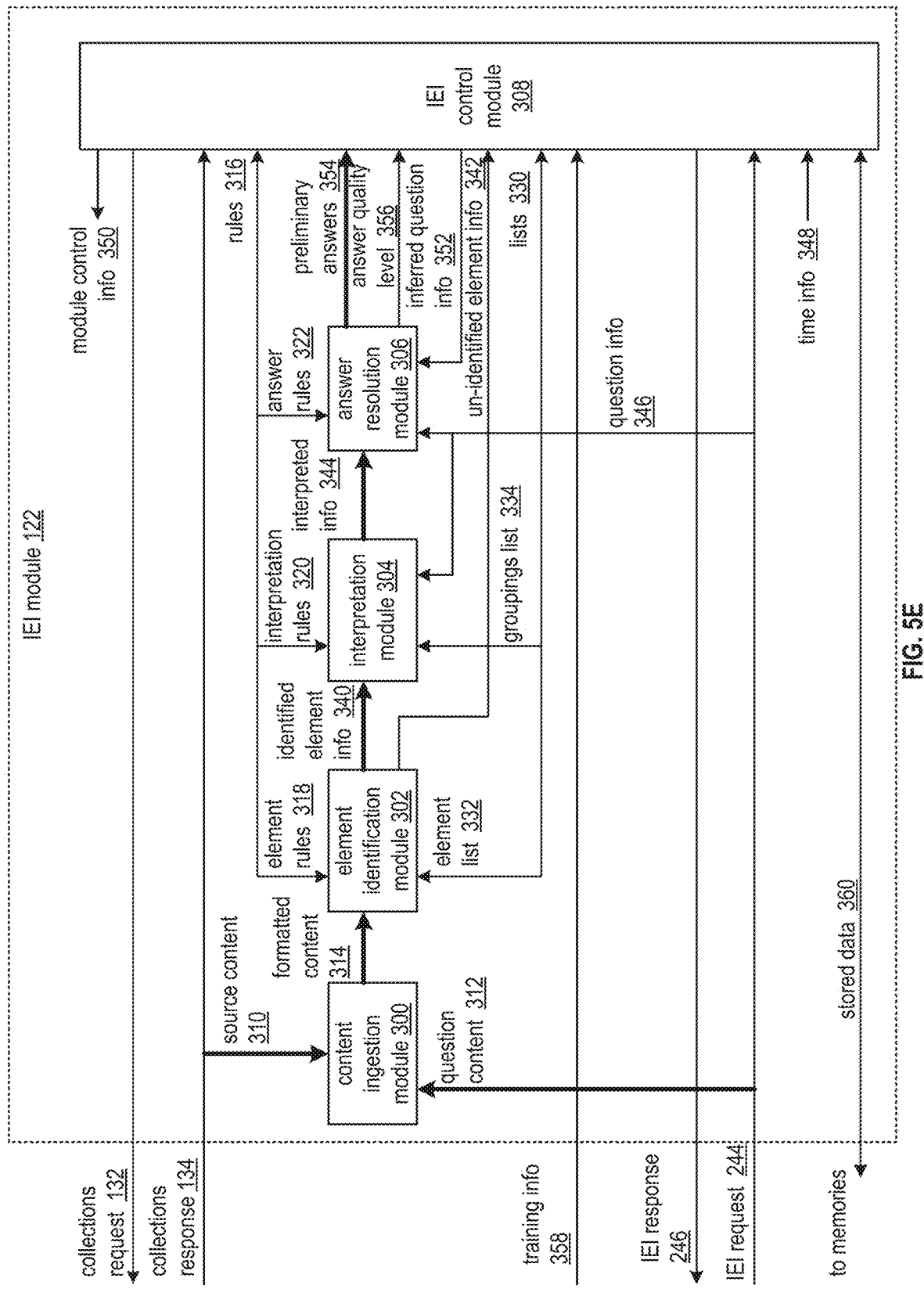
FIG. 5E is a schematic block diagram of an embodiment of an identigen entigen intelligence (IEI) module of a computing system in accordance with the present invention.

FIG. 5E is a schematic block diagram of an embodiment of the identigen entigen intelligence (IEI) module 122 of FIG. 4A that includes a content ingestion module 300, an element identification module 302, and interpretation module 304, and answer resolution module 306, and an IEI control module 308. Generally, an embodiment of this invention presents solutions where the IEI module 122 supports interpreting content to produce knowledge that may be utilized to answer questions.

In an example of operation of the producing and utilizing of the knowledge, the content ingestion module 300 generates formatted content 314 based on question content 312 and/or source content 310, where the IEI module 122 receives an IEI request 244 that includes the question content 312 and the IEI module 122 receives a collections response 134 that includes the source content 310. The source content 310 includes content from a source extracted from the collections response 134. The question content 312 includes content extracted from the IEI request 244 (e.g., content paired with a question). The content ingestion module 300 generates the formatted content 314 in accordance with a formatting approach (e.g., creating proper sentences from words of the content). The formatted content 314 includes modified content that is compatible with subsequent element identification (e.g., complete sentences, combinations of words and interpreted sounds and/or inflection cues with temporal associations of words).

The element identification module 302 processes the formatted content 314 based on element rules 318 and an element list 332 to produce identified element information 340. Rules 316 includes the element rules 318 (e.g., match, partial match, language translation, etc.). Lists 330 includes the element list 332 (e.g., element ID, element context ID, element usage ID, words, characters, symbols etc.). The IEI control module 308 may provide the rules 316 and the lists 330 by accessing stored data 360 from a memory associated with the IEI module 122. Generally, an embodiment of this invention presents solutions where the stored data 360 may further include one or more of a descriptive dictionary, categories, representations of element sets, element list, sequence data, pending questions, pending request, recognized elements, unrecognized elements, errors, etc.

The identified element information 340 includes one or more of identifiers of elements identified in the formatted content 314, may include ordering and/or sequencing and grouping information. For example, the element identification module 302 compares elements of the formatted content 314 to known elements of the element list 332 to produce identifiers of the known elements as the identified element information 340 in accordance with the element rules 318.

Alternatively, the element identification module 302 outputs un-identified element information 342 to the IEI control module 308, where the un-identified element information 342 includes temporary identifiers for elements not identifiable from the formatted content 314 when compared to the element list 332.

The interpretation module 304 processes the identified element information 340 in accordance with interpretation rules 320 (e.g., potentially valid permutations of various combinations of identified elements), question information 346 (e.g., a question extracted from the IEI request 244 which may be paired with content associated with the question), and a groupings list 334 (e.g., representations of associated groups of representations of things, a set of element identifiers, valid element usage IDs in accordance with similar, an element context, permutations of sets of identifiers for possible interpretations of a sentence or other) to produce interpreted information 344. The interpreted information 344 includes potentially valid interpretations of combinations of identified elements. Generally, an embodiment of this invention presents solutions where the interpretation module 304 supports producing the interpreted information 344 by considering permutations of the identified element information 340 in accordance with the interpretation rules 320 and the groupings list 334.

The answer resolution module 306 processes the interpreted information 344 based on answer rules 322 (e.g., guidance to extract a desired answer), the question information 346, and inferred question information 352 (e.g., posed by the IEI control module or analysis of general collections of content or refinement of a stated question from a request) to produce preliminary answers 354 and an answer quality level 356. The answer generally lies in the interpreted information 344 as both new content received and knowledge based on groupings list 334 generated based on previously received content. The preliminary answers 354 includes an answer to a stated or inferred question that subject further refinement. The answer quality level 356 includes a determination of a quality level of the preliminary answers 354 based on the answer rules 322. The inferred question information 352 may further be associated with time information 348, where the time information includes one or more of current real-time, a time reference associated with entity submitting a request, and a time reference of a collections response.

When the IEI control module 308 determines that the answer quality level 356 is below an answer quality threshold level, the IEI control module 308 facilitates collecting of further content (e.g., by issuing a collections request 132 and receiving corresponding collections responses 134 for analysis). When the answer quality level 356 compares favorably to the answer quality threshold level, the IEI control module 308 issues an IEI response 246 based on the preliminary answers 354. When receiving training information 358, the IEI control module 308 facilitates updating of one or more of the lists 330 and the rules 316 and stores the updated list 330 and the updated rules 316 in the memories as updated stored data 360.

Figure 5F:
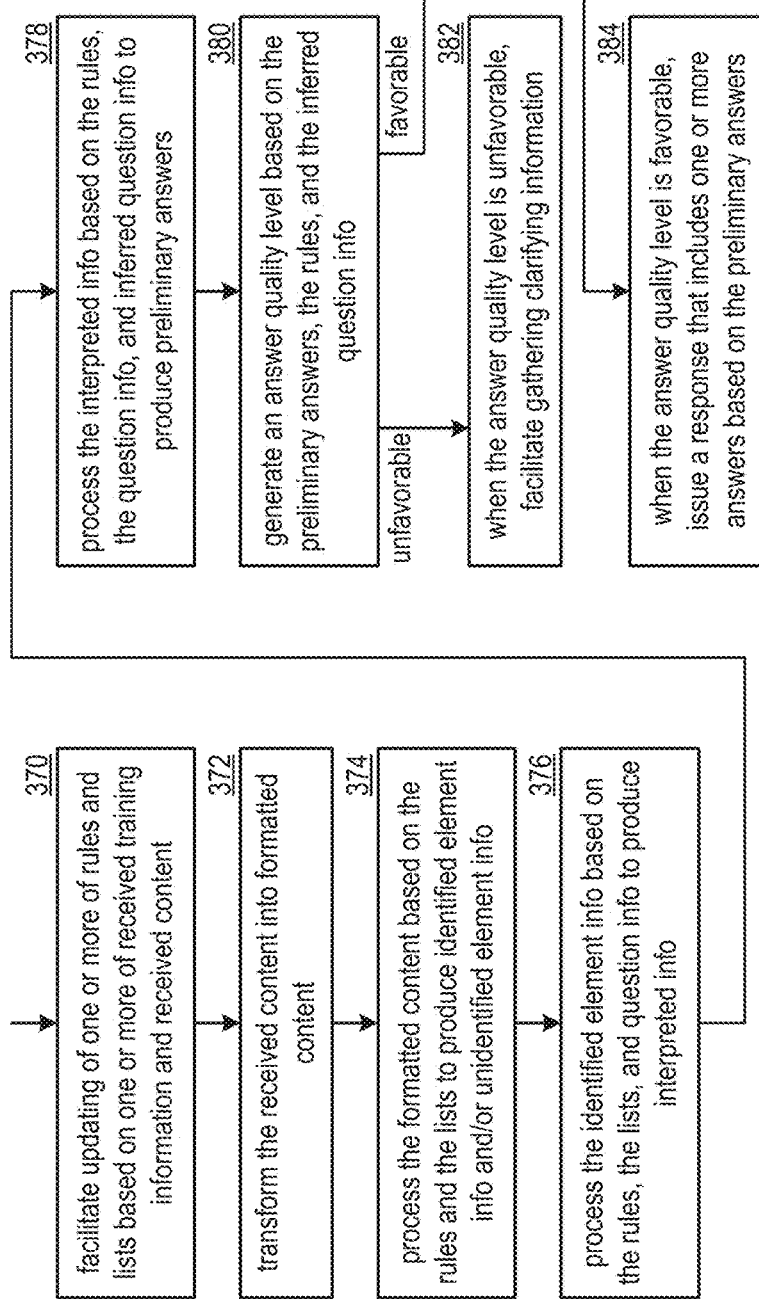
FIG. 5F is a logic diagram of an embodiment of a method for analyzing content within a computing system in accordance with the present invention.

FIG. 5F is a logic diagram of an embodiment of a method for analyzing content within a computing system. In particular, a method is presented for use in conjunction with one or more functions and features described in conjunction with FIGS. 1-3, 4A-4C, 5E, and also FIG. 5F. The method includes step 370 where a processing module of one or more processing modules of one or more computing devices of the computing system facilitates updating of one or more rules and lists based on one or more of received training information and received content. For example, the processing module updates rules with received rules to produce updated rules and updates element lists with received elements to produce updated element lists. As another example, the processing module interprets the received content to identify a new word for at least temporary inclusion in the updated element list.

The method continues at step 372 where the processing module transforms at least some of the received content into formatted content. For example, the processing module processes the received content in accordance with a transformation approach to produce the formatted content, where the formatted content supports compatibility with subsequent element identification (e.g., typical sentence structures of groups of words).

The method continues at step 374 where the processing module processes the formatted content based on the rules and the lists to produce identified element information and/or an identified element information. For example, the processing module compares the formatted content to element lists to identify a match producing identifiers for identified elements or new identifiers for unidentified elements when there is no match.

The method continues at step 376 with a processing module processes the identified element information based on rules, the lists, and question information to produce interpreted information. For example, the processing module compares the identified element information to associated groups of representations of things to generate potentially valid interpretations of combinations of identified elements.

The method continues at step 378 where the processing module processes the interpreted information based on the rules, the question information, and inferred question information to produce preliminary answers. For example, the processing module matches the interpreted information to one or more answers (e.g., embedded knowledge based on a fact base built from previously received content) with highest correctness likelihood levels that is subject to further refinement.

The method continues at step 380 where the processing module generates an answer quality level based on the preliminary answers, the rules, and the inferred question information. For example, the processing module predicts the answer correctness likelihood level based on the rules, the inferred question information, and the question information. The method branches to step 384 when the answer quality level is favorable and the method continues to step 382 when the answer quality level is unfavorable. For example, the generating of the answer quality level further includes the processing module indicating that the answer quality level is favorable when the answer quality level is greater than or equal to a minimum answer quality threshold level. As another example, the generating of the answer quality level further includes the processing module indicating that the answer quality level is unfavorable when the answer quality level is less than the minimum answer quality threshold level.

When the answer quality level is unfavorable, the method continues at step 382 where the processing module facilitates gathering clarifying information. For example, the processing module issues a collections request to facilitate receiving further content and or request question clarification from a question requester. When the answer quality level is favorable, the method continues at step 384 where the processing module issues a response that includes one or more answers based on the preliminary answers and/or further updated preliminary answers based on gathering further content. For example, the processing module generates a response that includes one or more answers and the answer quality level and issues the response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6A:
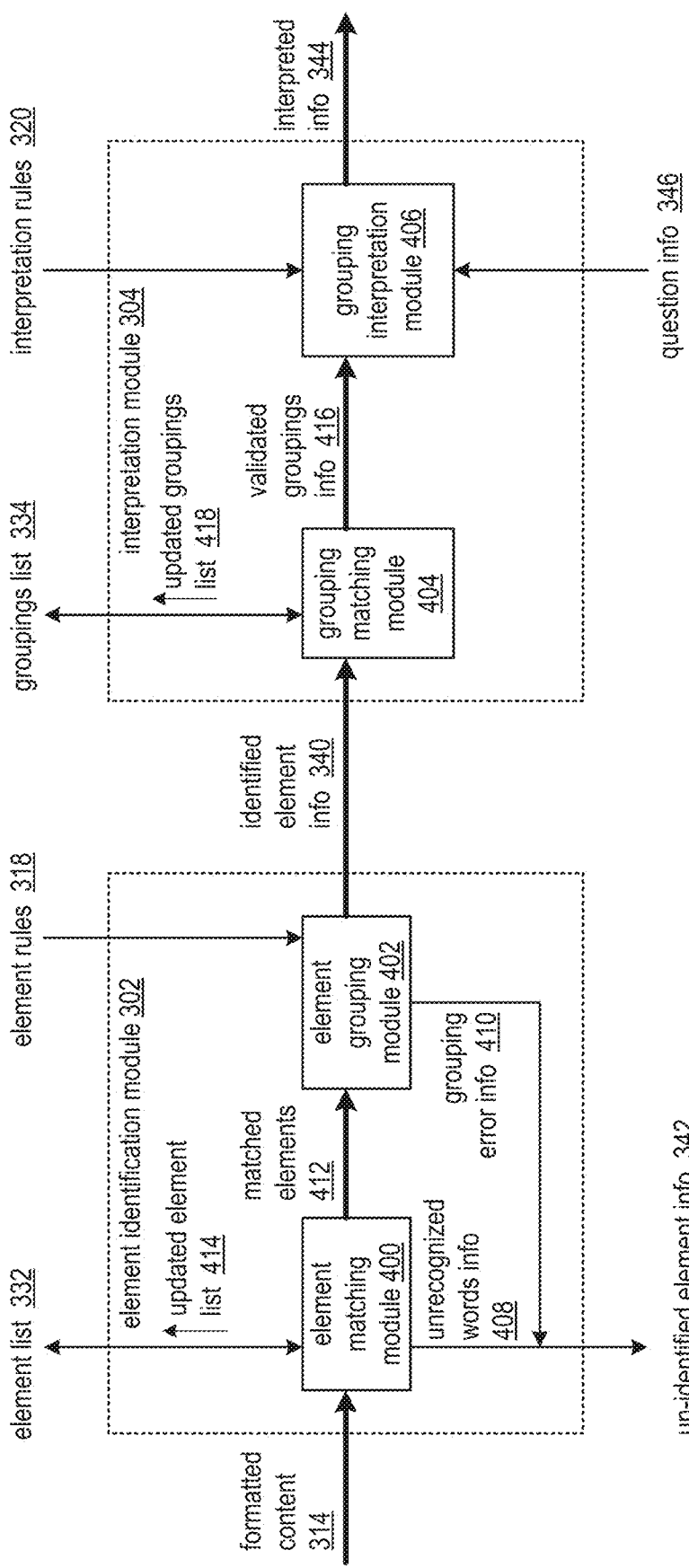
FIG. 6A is a schematic block diagram of an embodiment of an element identification module and an interpretation module of a computing system in accordance with the present invention.

FIG. 6A is a schematic block diagram of an embodiment of the element identification module 302 of FIG. 5A and the interpretation module 304 of FIG. 5A. The element identification module 302 includes an element matching module 400 and an element grouping module 402. The interpretation module 304 includes a grouping matching module 404 and a grouping interpretation module 406. Generally, an embodiment of this invention presents solutions where the element identification module 302 supports identifying potentially valid permutations of groupings of elements while the interpretation module 304 interprets the potentially valid permutations of groupings of elements to produce interpreted information that includes the most likely of groupings based on a question.

In an example of operation of the identifying of the potentially valid permutations of groupings of elements, when matching elements of the formatted content 314, the element matching module 400 generates matched elements 412 (e.g., identifiers of elements contained in the formatted content 314) based on the element list 332. For example, the element matching module 400 matches a received element to an element of the element list 332 and outputs the matched elements 412 to include an identifier of the matched element. When finding elements that are unidentified, the element matching module 400 outputs un-recognized words information 408 (e.g., words not in the element list 332, may temporarily add) as part of un-identified element information 342. For example, the element matching module 400 indicates that a match cannot be made between a received element of the formatted content 314, generates the unrecognized words info 408 to include the received element and/or a temporary identifier, and issues and updated element list 414 that includes the temporary identifier and the corresponding unidentified received element.

The element grouping module 402 analyzes the matched elements 412 in accordance with element rules 318 to produce grouping error information 410 (e.g., incorrect sentence structure indicators) when a structural error is detected. The element grouping module 402 produces identified element information 340 when favorable structure is associated with the matched elements in accordance with the element rules 318. The identified element information 340 may further include grouping information of the plurality of permutations of groups of elements (e.g., several possible interpretations), where the grouping information includes one or more groups of words forming an associated set and/or super-group set of two or more subsets when subsets share a common core element.

In an example of operation of the interpreting of the potentially valid permutations of groupings of elements to produce the interpreted information, the grouping matching module 404 analyzes the identified element information 340 in accordance with a groupings list 334 to produce validated groupings information 416. For example, the grouping matching module 404 compares a grouping aspect of the identified element information 340 (e.g., for each permutation of groups of elements of possible interpretations), generates the validated groupings information 416 to include identification of valid permutations aligned with the groupings list 334. Alternatively, or in addition to, the grouping matching module 404 generates an updated groupings list 418 when determining a new valid grouping (e.g., has favorable structure and interpreted meaning) that is to be added to the groupings list 334.

The grouping interpretation module 406 interprets the validated groupings information 416 based on the question information 346 and in accordance with the interpretation rules 320 to produce interpreted information 344 (e.g., most likely interpretations, next most likely interpretations, etc.). For example, the grouping interpretation module 406 obtains context, obtains favorable historical interpretations, processes the validated groupings based on interpretation rules 320, where each interpretation is associated with a correctness likelihood level.

Figure 6B:
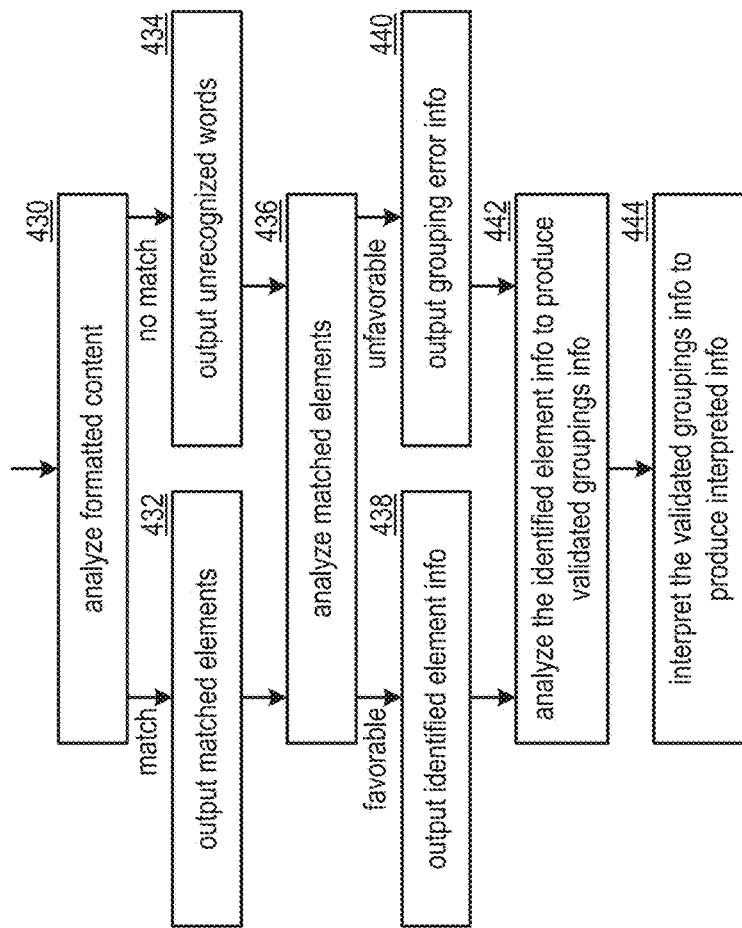
FIG. 6B is a logic diagram of an embodiment of a method for interpreting information within a computing system in accordance with the present invention.

FIG. 6B is a logic diagram of an embodiment of a method for interpreting information within a computing system. In particular, a method is presented for use in conjunction with one or more functions and features described in conjunction with FIGS. 1-3, 4A-4C, 5E-5F, 6A, and also FIG. 6B. The method includes step 430 where a processing module of one or more processing modules of one or more computing devices of the computing system analyzes formatted content. For example, the processing module attempt to match a received element of the formatted content to one or more elements of an elements list. When there is no match, the method branches to step 434 and when there is a match, the method continues to step 432. When there is a match, the method continues at step 432 where the processing module outputs matched elements (e.g., to include the matched element and/or an identifier of the matched element). When there is no match, the method continues at step 434 where the processing module outputs unrecognized words (e.g., elements and/or a temporary identifier for the unmatched element).

The method continues at step 436 where the processing module analyzes matched elements. For example, the processing module attempt to match a detected structure of the matched elements (e.g., chained elements as in a received sequence) to favorable structures in accordance with element rules. The method branches to step 440 when the analysis is unfavorable and the method continues to step 438 when the analysis is favorable. When the analysis is favorable matching a detected structure to the favorable structure of the element rules, the method continues at step 438 where the processing module outputs identified element information (e.g., an identifier of the favorable structure, identifiers of each of the detected elements). When the analysis is unfavorable matching a detected structure to the favorable structure of the element rules, the method continues at step 440 where the processing module outputs grouping error information (e.g., a representation of the incorrect structure, identifiers of the elements of the incorrect structure, a temporary new identifier of the incorrect structure).

The method continues at step 442 where the processing module analyzes the identified element information to produce validated groupings information. For example, the processing module compares a grouping aspect of the identified element information and generates the validated groupings information to include identification of valid permutations that align with the groupings list. Alternatively, or in addition to, the processing module generates an updated groupings list when determining a new valid grouping.

The method continues at step 444 where the processing module interprets the validated groupings information to produce interpreted information. For example, the processing module obtains one or more of context and historical interpretations and processes the validated groupings based on interpretation rules to generate the interpreted information, where each interpretation is associated with a correctness likelihood level (e.g., a quality level).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth memory element, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6C:
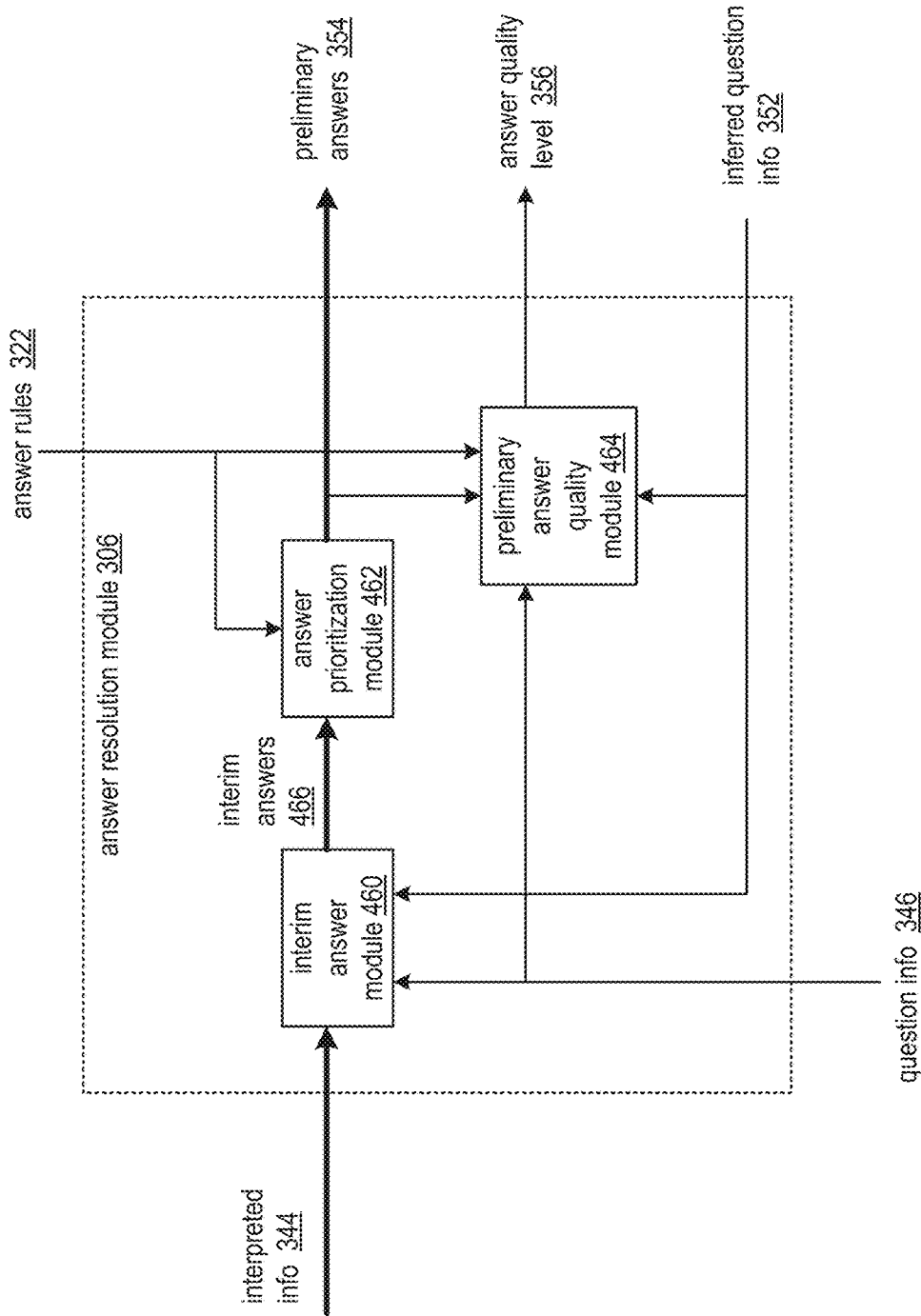
FIG. 6C is a schematic block diagram of an embodiment of an answer resolution module of a computing system in accordance with the present invention.

FIG. 6C is a schematic block diagram of an embodiment of the answer resolution module 306 of FIG. 5A that includes an interim answer module 460, and answer prioritization module 462, and a preliminary answer quality module 464. Generally, an embodiment of this invention presents solutions where the answer resolution module 306 supports producing an answer for interpreted information 344.

In an example of operation of the providing of the answer, the interim answer module 460 analyzes the interpreted information 344 based on question information 346 and inferred question information 352 to produce interim answers 466 (e.g., answers to stated and/or inferred questions without regard to rules that is subject to further refinement). The answer prioritization module 462 analyzes the interim answers 466 based on answer rules 322 to produce preliminary answer 354. For example, the answer prioritization module 462 identifies all possible answers from the interim answers 466 that conform to the answer rules 322.

The preliminary answer quality module 464 analyzes the preliminary answers 354 in accordance with the question information 346, the inferred question information 352, and the answer rules 322 to produce an answer quality level 356. For example, for each of the preliminary answers 354, the preliminary answer quality module 464 may compare a fit of the preliminary answer 354 to a corresponding previous answer and question quality level, calculate the answer quality level 356 based on a level of conformance to the answer rules 322, calculate the answer quality level 356 based on alignment with the inferred question information 352, and determine the answer quality level 356 based on an interpreted correlation with the question information 346.

Figure 6D:
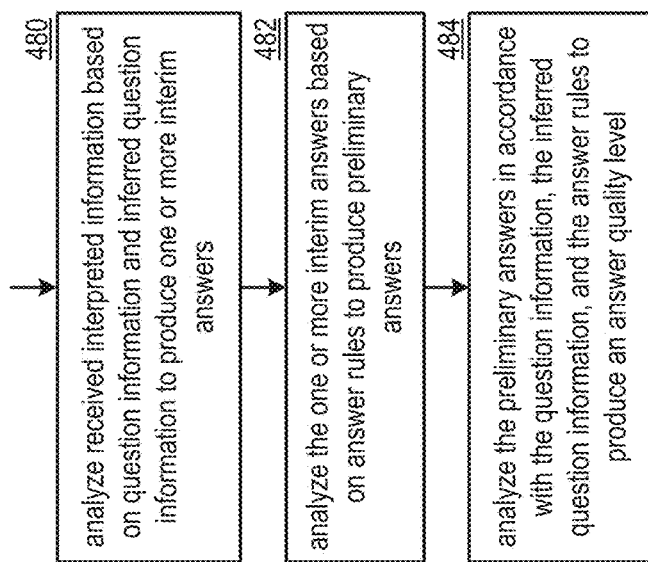
FIG. 6D is a logic diagram of an embodiment of a method for producing an answer within a computing system in accordance with the present invention.

FIG. 6D is a logic diagram of an embodiment of a method for producing an answer within a computing system. In particular, a method is presented for use in conjunction with one or more functions and features described in conjunction with FIGS. 1-3, 4A-4C, 5E-5F, 6C, and also FIG. 6D. The method includes step 480 where a processing module of one or more processing modules of one or more computing devices of the computing system analyzes received interpreted information based on question information and inferred question information to produce one or more interim answers. For example, the processing module generates potential answers based on patterns consistent with previously produced knowledge and likelihood of correctness.

The method continues at step 482 where the processing module analyzes the one or more interim answers based on answer rules to produce preliminary answers. For example, the processing module identifies all possible answers from the interim answers that conform to the answer rules. The method continues at step 484 where the processing module analyzes the preliminary answers in accordance with the question information, the inferred question information, and the answer rules to produce an answer quality level. For example, for each of the elementary answers, the processing module may compare a fit of the preliminary answer to a corresponding previous answer-and-answer quality level, calculate the answer quality level based on performance to the answer rules, calculate answer quality level based on alignment with the inferred question information, and determine the answer quality level based on interpreted correlation with the question information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 7A:
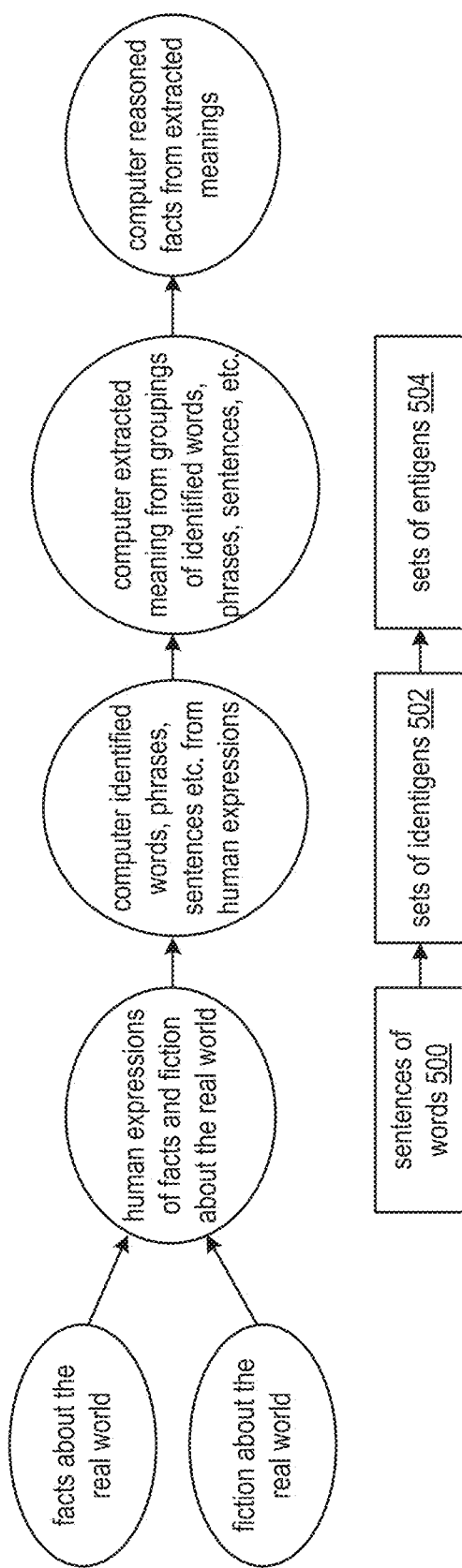
FIG. 7A is an information flow diagram for interpreting information within a computing system in accordance with the present invention.

FIG. 7A is an information flow diagram for interpreting information within a computing system, where sets of entigens 504 are interpreted from sets of identigens 502 which are interpreted from sentences of words 500. Such identigen entigen intelligence (IEI) processing of the words (e.g., to IEI process) includes producing one or more of interim knowledge, a preliminary answer, and an answer quality level. For example, the IEI processing includes identifying permutations of identigens of a phrase of a sentence (e.g., interpreting human expressions to produce identigen groupings for each word of ingested content), reducing the permutations of identigens (e.g., utilizing rules to eliminate unfavorable permutations), mapping the reduced permutations of identigens to at least one set of entigens (e.g., most likely identigens become the entigens) to produce the interim knowledge, processing the knowledge in accordance with a knowledge database (e.g., comparing the set of entigens to the knowledge database) to produce a preliminary answer, and generating the answer quality level based on the preliminary answer for a corresponding domain.

Human expressions are utilized to portray facts and fiction about the real world. The real-world includes items, actions, and attributes. The human expressions include textual words, textual symbols, images, and other sensorial information (e.g., sounds). It is known that many words, within a given language, can mean different things based on groupings and orderings of the words. For example, the sentences of words 500 can include many different forms of sentences that mean vastly different things even when the words are very similar.

The present invention presents solutions where the computing system 10 supports producing a computer-based representation of a truest meaning possible of the human expressions given the way that multitudes of human expressions relate to these meanings. As a first step of the flow diagram to transition from human representations of things to a most precise computer representation of the things, the computer identifies the words, phrases, sentences, etc. from the human expressions to produce the sets of identigens 502. Each identigen includes an identifier of their meaning and an identifier of an instance for each possible language, culture, etc. For example, the words car and automobile share a common meaning identifier but have different instance identifiers since they are different words and are spelled differently. As another example, the word duck is associated both with a bird and an action to elude even though they are spelled the same. In this example the bird duck has a different meaning than the elude duck and as such each has a different meaning identifier of the corresponding identigens.

As a second step of the flow diagram to transition from human representations of things to the most precise computer representation of the things, the computer extracts meaning from groupings of the identified words, phrases, sentences, etc. to produce the sets of entigens 504. Each entigen includes an identifier of a single conceivable and perceivable thing in space and time (e.g., independent of language and other aspects of the human expressions). For example, the words car and automobile are different instances of the same meaning and point to a common shared entigen. As another example, the word duck for the bird meaning has an associated unique entigen that is different than the entigen for the word duck for the elude meaning.

As a third step of the flow diagram to transition from human expressions of things to the most precise computer representation of the things, the computer reasons facts from the extracted meanings. For example, the computer maintains a fact-based of the valid meanings from the valid groupings or sets of entigens so as to support subsequent inferences, deductions, rationalizations of posed questions to produce answers that are aligned with a most factual view. As time goes on, and as an entigen has been identified, it can encounter an experience transformations in time, space, attributes, actions, and words which are used to identify it without creating contradictions or ever losing its identity.

Figure 7B:
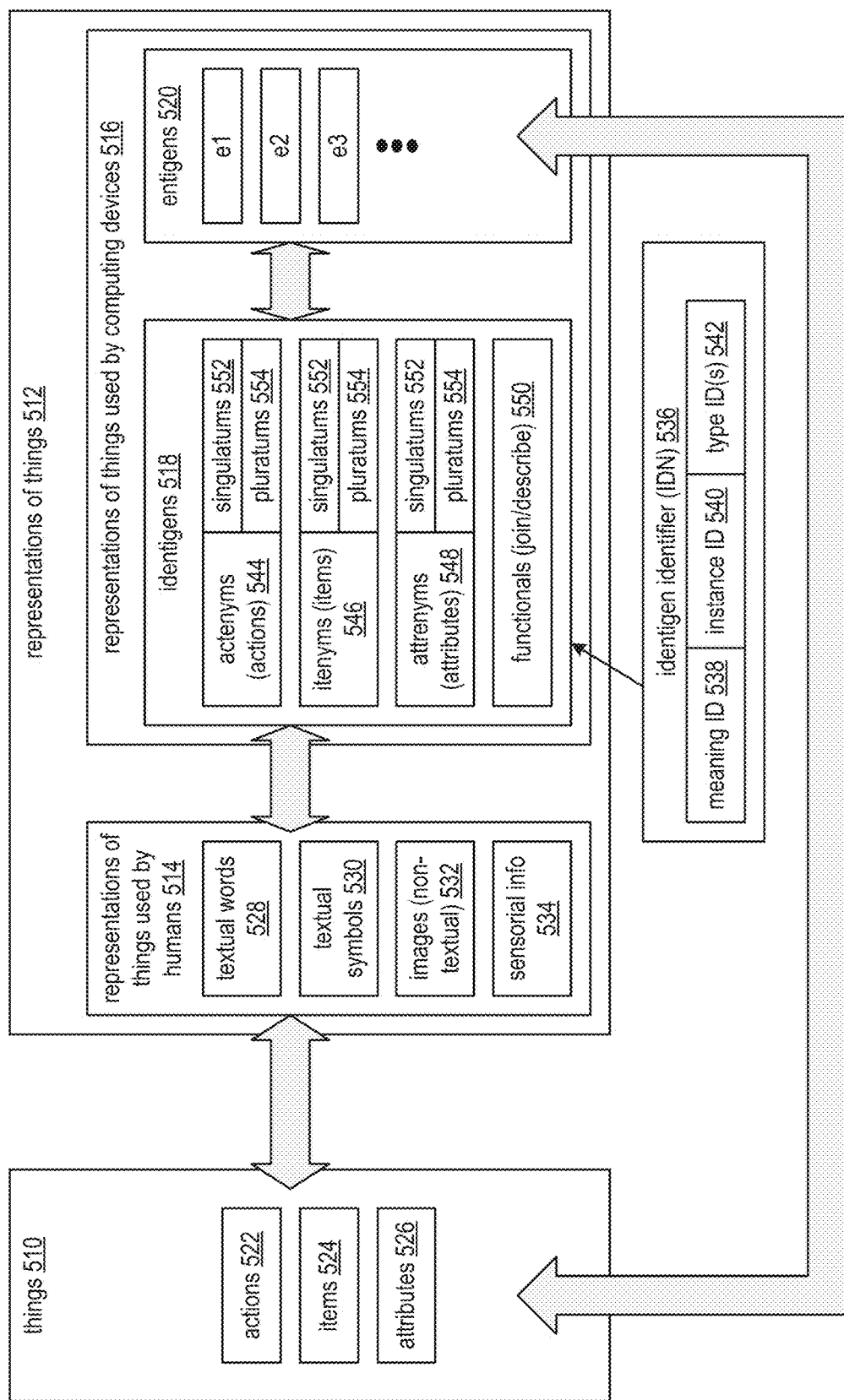
FIG. 7B is a relationship block diagram illustrating an embodiment of relationships between things and representations of things within a computing system in accordance with the present invention.

FIG. 7B is a relationship block diagram illustrating an embodiment of relationships between things 510 and representations of things 512 within a computing system. The things 510 includes conceivable and perceivable things including actions 522, items 524, and attributes 526. The representation of things 512 includes representations of things used by humans 514 and representation of things used by of computing devices 516 of embodiments of the present invention. The things 510 relates to the representations of things used by humans 514 where the invention presents solutions where the computing system 10 supports mapping the representations of things used by humans 514 to the representations of things used by computing devices 516, where the representations of things used by computing devices 516 map back to the things 510.

The representations of things used by humans 514 includes textual words 528, textual symbols 530, images (e.g., non-textual) 532, and other sensorial information 534 (e.g., sounds, sensor data, electrical fields, voice inflections, emotion representations, facial expressions, whistles, etc.). The representations of things used by computing devices 516 includes identigens 518 and entigens 520. The representations of things used by humans 514 maps to the identigens 518 and the identigens 518 map to the entigens 520. The entigens 520 uniquely maps back to the things 510 in space and time, a truest meaning the computer is looking for to create knowledge and answer questions based on the knowledge.

To accommodate the mapping of the representations of things used by humans 514 to the identigens 518, the identigens 518 is partitioned into actenyms 544 (e.g., actions), itenyms 546 (e.g., items), attrenyms 548 (e.g., attributes), and functionals 550 (e.g., that join and/or describe). Each of the actenyms 544, itenyms 546, and attrenyms 548 may be further classified into singulatums 552 (e.g., identify one unique entigen) and pluratums 554 (e.g., identify a plurality of entigens that have similarities).

Each identigen 518 is associated with an identigens identifier (IDN) 536. The IDN 536 includes a meaning identifier (ID) 538 portion, an instance ID 540 portion, and a type ID 542 portion. The meaning ID 538 includes an identifier of common meaning. The instance ID 540 includes an identifier of a particular word and language. The type ID 542 includes one or more identifiers for actenyms, itenyms, attrenyms, singulatums, pluratums, a time reference, and any other reference to describe the IDN 536. The mapping of the representations of things used by humans 514 to the identigens 518 by the computing system of the present invention includes determining the identigens 518 in accordance with logic and instructions for forming groupings of words.

Generally, an embodiment of this invention presents solutions where the identigens 518 map to the entigens 520. Multiple identigens may map to a common unique entigen. The mapping of the identigens 518 to the entigens 520 by the computing system of the present invention includes determining entigens in accordance with logic and instructions for forming groupings of identigens.

FIG. 7C is a diagram of an embodiment of a synonym words table 570 within a computing system, where the synonym words table 570 includes multiple fields including textual words 572, identigens 518, and entigens 520. The identigens 518 includes fields for the meaning identifier (ID) 538 and the instance ID 540. The computing system of the present invention may utilize the synonym words table 570 to map textual words 572 to identigens 518 and map the identigens 518 to entigens 520. For example, the words car, automobile, auto, bil (Swedish), carro (Spanish), and bil (Danish) all share a common meaning but are different instances (e.g., different words and languages). The words map to a common meaning ID but to individual unique instant identifiers. Each of the different identigens map to a common entigen since they describe the same thing.

FIG. 7D is a diagram of an embodiment of a polysemous words table 576 within a computing system, where the polysemous words table 576 includes multiple fields including textual words 572, identigens 518, and entigens 520. The identigens 518 includes fields for the meaning identifier (ID) 538 and the instance ID 540. The computing system of the present invention may utilize the polysemous words table 576 to map textual words 572 to identigens 518 and map the identigens 518 to entigens 520. For example, the word duck maps to four different identigens since the word duck has four associated different meanings (e.g., bird, fabric, to submerge, to elude) and instances. Each of the identigens represent different things and hence map to four different entigens.

FIG. 7E is a diagram of an embodiment of transforming words into groupings within a computing system that includes a words table 580, a groupings of words section to validate permutations of groupings, and a groupings table 584 to capture the valid groupings. The words table 580 includes multiple fields including textual words 572, identigens 518, and entigens 520. The identigens 518 includes fields for the meaning identifier (ID) 538, the instance ID 540, and the type ID 542. The computing system of the present invention may utilize the words table 580 to map textual words 572 to identigens 518 and map the identigens 518 to entigens 520. For example, the word pilot may refer to a flyer and the action to fly. Each meaning has a different identigen and different entigen.

The computing system the present invention may apply rules to the fields of the words table 580 to validate various groupings of words. Those that are invalid are denoted with a "X" while those that are valid are associated with a check mark. For example, the grouping "pilot Tom" is invalid when the word pilot refers to flying and Tom refers to a person. The identigen combinations for the flying pilot and the person Tom are denoted as invalid by the rules. As another example, the grouping "pilot Tom" is valid when the word pilot refers to a flyer and Tom refers to the person. The identigen combinations for the flyer pilot and the person Tom are denoted as valid by the rules.

The groupings table 584 includes multiple fields including grouping ID 586, word strings 588, identigens 518, and entigens 520. The computing system of the present invention may produce the groupings table 584 as a stored fact base for valid and/or invalid groupings of words identified by their corresponding identigens. For example, the valid grouping "pilot Tom" referring to flyer Tom the person is represented with a grouping identifier of 3001 and identity and identifiers 150.001 and 457.001. The entigen field 520 may indicate associated entigens that correspond to the identigens. For example, entigen e717 corresponds to the flyer pilot meaning and entigen e61 corresponds to the time the person meaning. Alternatively, or in addition to, the entigen field 520 may be populated with a single entigen identifier (ENI).

The word strings field 588 may include any number of words in a string. Different ordering of the same words can produce multiple different strings and even different meanings and hence entigens. More broadly, each entry (e.g., role) of the groupings table 584 may refer to groupings of words, two or more word strings, an idiom, just identigens, just entigens, and/or any combination of the preceding elements. Each entry has a unique grouping identifier. An idiom may have a unique grouping ID and include identifiers of original word identigens and replacing identigens associated with the meaning of the idiom not just the meaning of the original words. Valid groupings may still have ambiguity on their own and may need more strings and/or context to select a best fit when interpreting a truest meaning of the grouping.

Figure 8A:
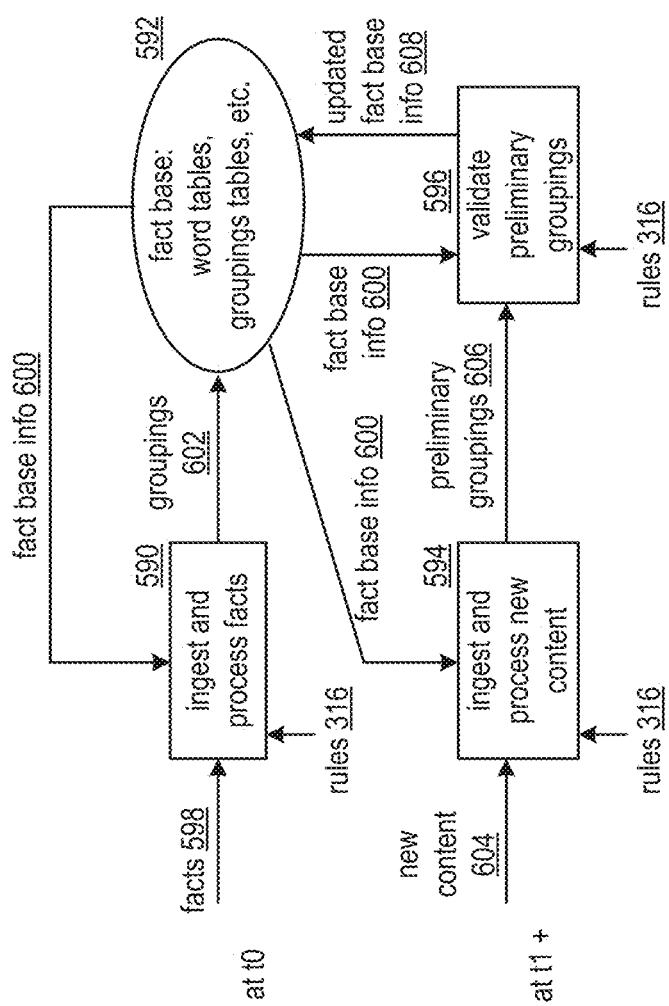
FIG. 8A is a data flow diagram for accumulating knowledge within a computing system in accordance with the present invention.

FIG. 8A is a data flow diagram for accumulating knowledge within a computing system, where a computing device, at a time=t0, ingests and processes facts 598 at a step 590 based on rules 316 and fact base information 600 to produce groupings 602 for storage in a fact base 592 (e.g., words, phrases, word groupings, identigens, entigens, quality levels). The facts 598 may include information from books, archive data, Central intelligence agency (CIA) world fact book, trusted content, etc. The ingesting may include filtering to organize and promote better valid groupings detection (e.g., considering similar domains together). The groupings 602 includes one or more of groupings identifiers, identigen identifiers, entigen identifiers, and estimated fit quality levels. The processing step 590 may include identifying identigens from words of the facts 598 in accordance with the rules 316 and the fact base info 600 and identifying groupings utilizing identigens in accordance with rules 316 and fact base info 600.

Subsequent to ingestion and processing of the facts 598 to establish the fact base 592, at a time=t1+, the computing device ingests and processes new content 604 at a step 594 in accordance with the rules 316 and the fact base information 600 to produce preliminary grouping 606. The new content may include updated content (e.g., timewise) from periodicals, newsfeeds, social media, etc. The preliminary grouping 606 includes one or more of preliminary groupings identifiers, preliminary identigen identifiers, preliminary entigen identifiers, estimated fit quality levels, and representations of unidentified words.

The computing device validates the preliminary groupings 606 at a step 596 based on the rules 316 and the fact base info 600 to produce updated fact base info 608 for storage in the fact base 592. The validating includes one or more of reasoning a fit of existing fact base info 600 with the new preliminary grouping 606, discarding preliminary groupings, updating just time frame information associated with an entry of the existing fact base info 600 (e.g., to validate knowledge for the present), creating new entigens, and creating a median entigen to summarize portions of knowledge within a median indicator as a quality level indicator (e.g., suggestive not certain).

Storage of the updated fact base information 608 captures patterns that develop by themselves instead of searching for patterns as in prior art artificial intelligence systems. Growth of the fact base 592 enables subsequent reasoning to create new knowledge including deduction, induction, inference, and inferential sentiment (e.g., a chain of sentiment sentences). Examples of sentiments includes emotion, beliefs, convictions, feelings, judgments, notions, opinions, and views.

FIG. 8B is a diagram of an embodiment of a groupings table 620 within a computing system. The groupings table 620 includes multiple fields including grouping ID 586, word strings 588, an IF string 622 and a THEN string 624. Each of the fields for the IF string 622 and the THEN string 624 includes fields for an identigen (IDN) string 626, and an entigen (ENI) string 628. The computing system of the present invention may produce the groupings table 620 as a stored fact base to enable IF THEN based inference to generate a new knowledge inference 630.

As a specific example, grouping 5493 points out the logic of IF someone has a tumor, THEN someone is sick and the grouping 5494 points of the logic that IF someone is sick, THEN someone is sad. As a result of utilizing inference, the new knowledge inference 630 may produce grouping 5495 where IF someone has a tumor, THEN someone is possibly sad (e.g., or is sad).

Figure 8C:
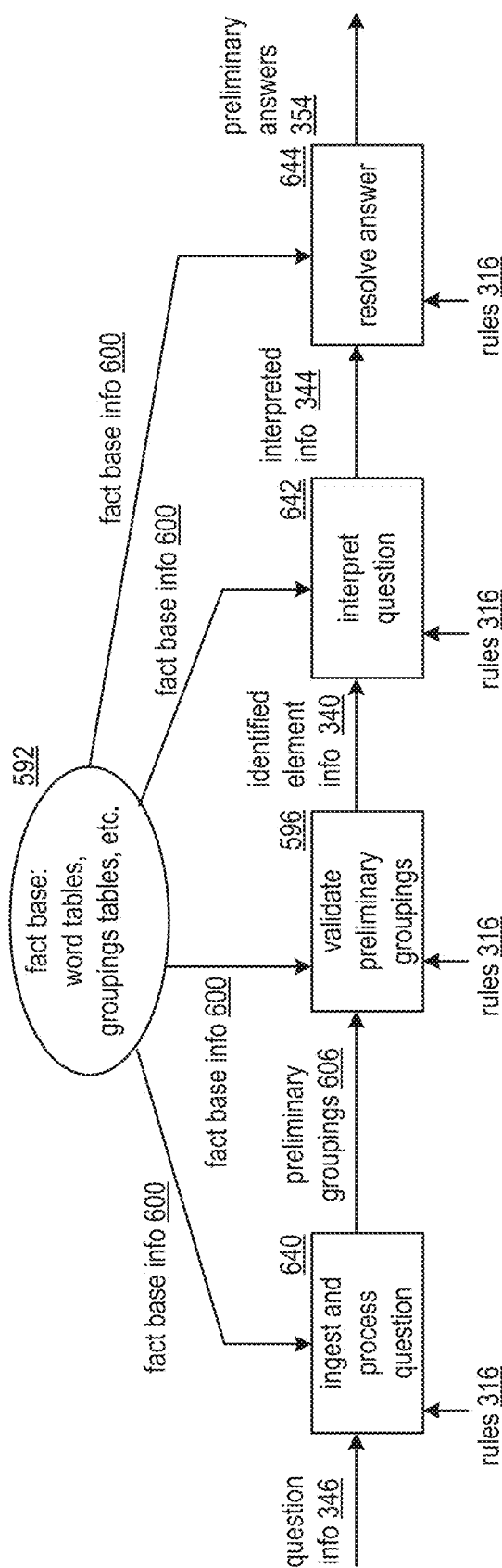
FIG. 8C is a data flow diagram for answering questions utilizing accumulated knowledge within a computing system in accordance with the present invention.

FIG. 8C is a data flow diagram for answering questions utilizing accumulated knowledge within a computing system, where a computing device ingests and processes question information 346 at a step 640 based on rules 316 and fact base info 600 from a fact base 592 to produce preliminary grouping 606. The ingesting and processing questions step 640 includes identifying identigens from words of a question in accordance with the rules 316 and the fact base information 600 and may also include identifying groupings from the identified identigens in accordance with the rules 316 and the fact base information 600.

The computing device validates the preliminary grouping 606 at a step 596 based on the rules 316 and the fact base information 600 to produce identified element information 340. For example, the computing device reasons fit of existing fact base information with new preliminary groupings 606 to produce the identified element information 340 associated with highest quality levels. The computing device interprets a question of the identified element information 340 at a step 642 based on the rules 316 and the fact base information 600. The interpreting of the question may include separating new content from the question and reducing the question based on the fact base information 600 and the new content.

The computing device produces preliminary answers 354 from the interpreted information 344 at a resolve answer step 644 based on the rules 316 and the fact base information 600. For example, the computing device compares the interpreted information 344 two the fact base information 600 to produce the preliminary answers 354 with highest quality levels utilizing one or more of deduction, induction, inferencing, and applying inferential sentiments logic. Alternatively, or in addition to, the computing device may save new knowledge identified from the question information 346 to update the fact base 592.

Figure 8D:
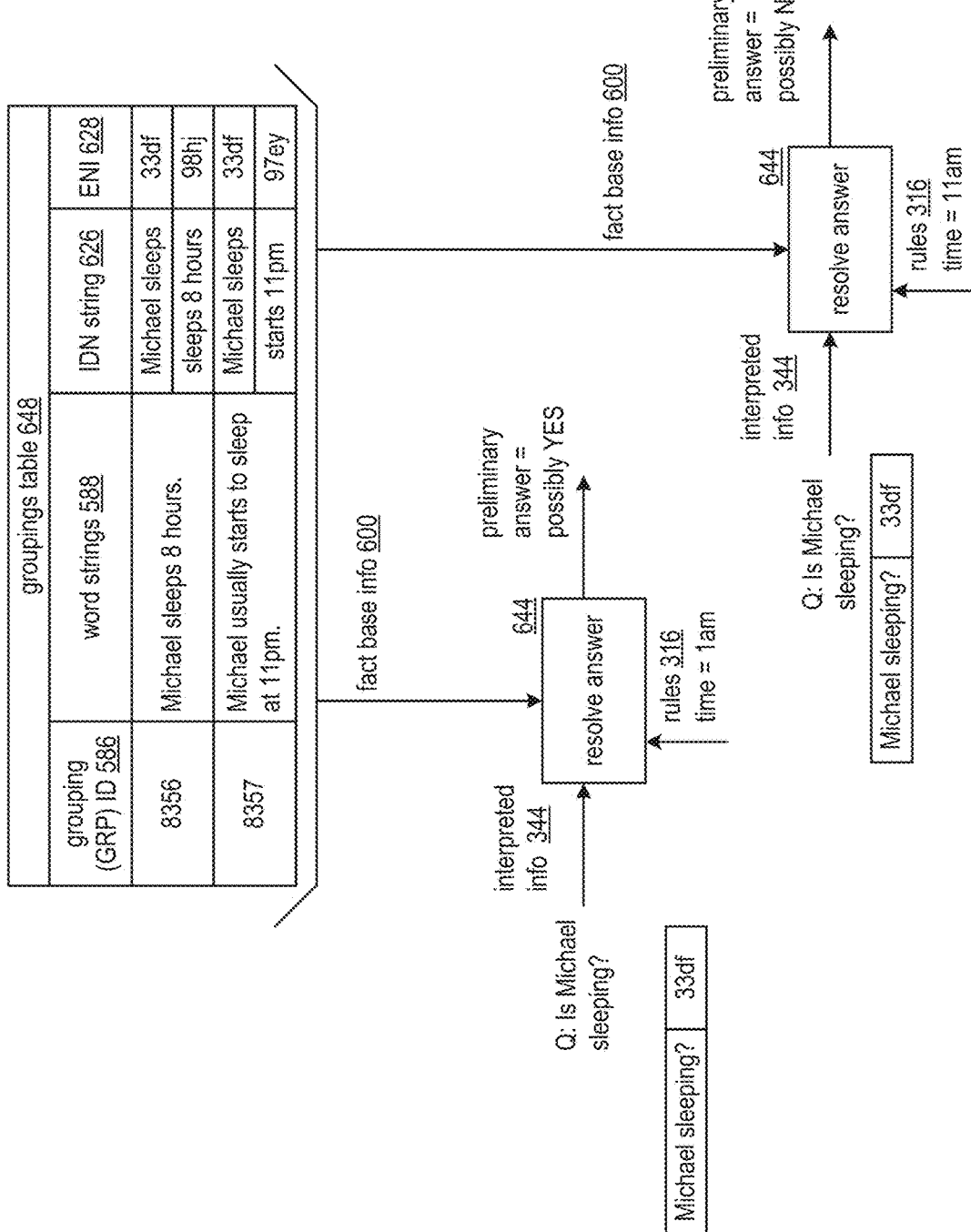
FIG. 8D is a data flow diagram for answering questions utilizing interference within a computing system in accordance with the present invention.

FIG. 8D is a data flow diagram for answering questions utilizing interference within a computing system that includes a groupings table 648 and the resolve answer step 644 of FIG. 8C. The groupings table 648 includes multiple fields including fields for a grouping (GRP) identifier (ID) 586, word strings 588, an identigen (IDN) string 626, and an entigen (ENI) 628. The groupings table 648 may be utilized to build a fact base to enable resolving a future question into an answer. For example, the grouping 8356 notes knowledge that Michael sleeps eight hours and grouping 8357 notes that Michael usually starts to sleep at 11 PM.

In a first question example that includes a question "Michael sleeping?", the resolve answer step 644 analyzes the question from the interpreted information 344 in accordance with the fact base information 600, the rules 316, and a real-time indicator that the current time is 1 AM to produce a preliminary answer of "possibly YES" when inferring that Michael is probably sleeping at 1 AM when Michael usually starts sleeping at 11 PM and Michael usually sleeps for a duration of eight hours.

In a second question example that includes the question "Michael sleeping?", the resolve answer step 644 analyzes the question from the interpreted information 344 in accordance with the fact base information 600, the rules 316, and a real-time indicator that the current time is now 11 AM to produce a preliminary answer of "possibly NO" when inferring that Michael is probably not sleeping at 11 AM when Michael usually starts sleeping at 11 PM and Michael usually sleeps for a duration of eight hours.

Figure 8E:
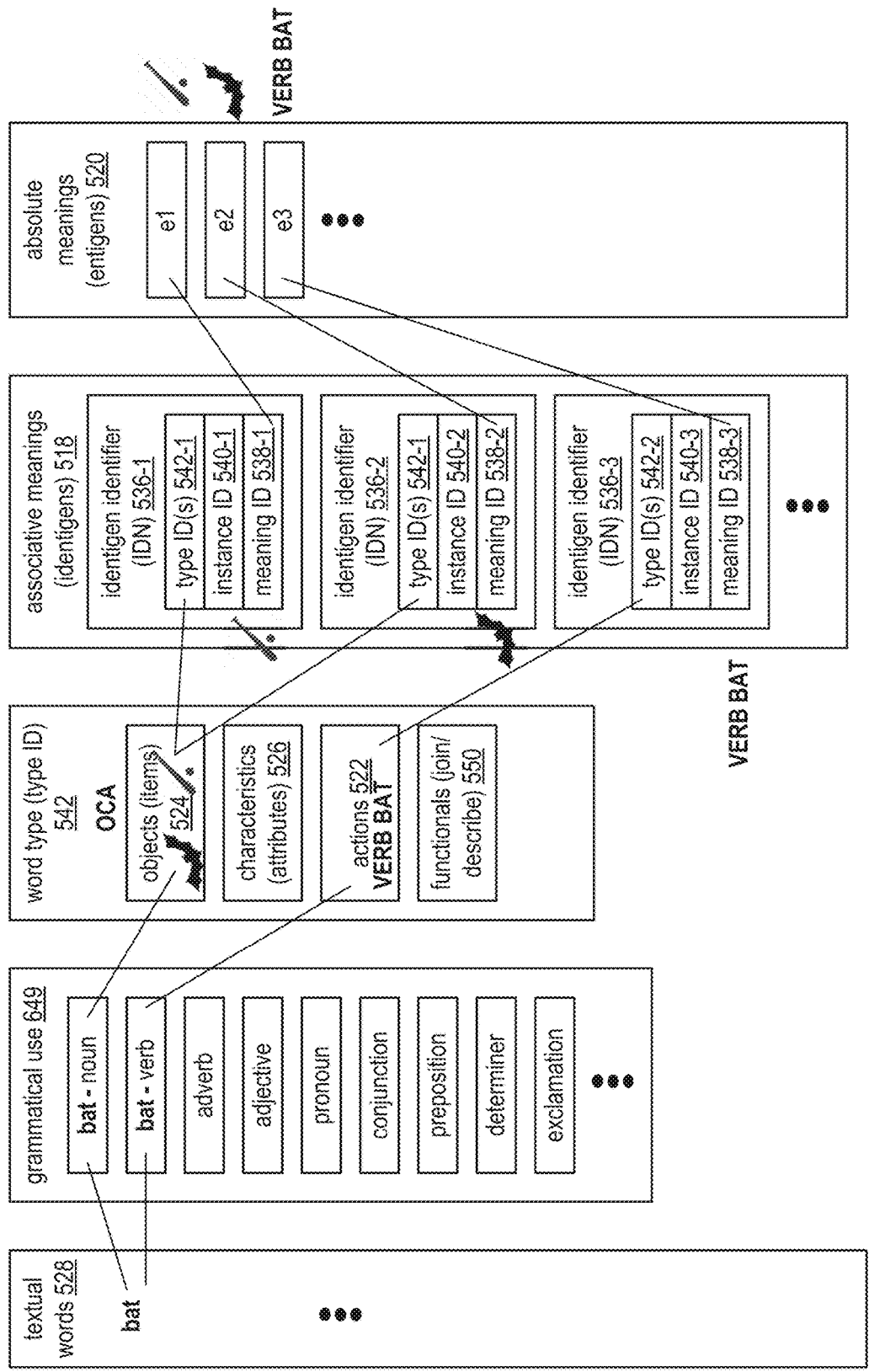
FIG. 8E is a relationship block diagram illustrating another embodiment of relationships between things and representations of things within a computing system in accordance with the present invention.

FIG. 8E is a relationship block diagram illustrating another embodiment of relationships between things and representations of things within a computing system. While things in the real world are described with words, it is often the case that a particular word has multiple meanings in isolation. Interpreting the meaning of the particular word may hinge on analyzing how the word is utilized in a phrase, a sentence, multiple sentences, paragraphs, and even whole documents or more. Describing and stratifying the use of words, word types, and possible meanings help in interpreting a true meaning.

Humans utilize textual words 528 to represent things in the real world. Quite often a particular word has multiple instances of different grammatical use when part of a phrase of one or more sentences. The grammatical use 649 of words includes the nouns and the verbs, and also includes adverbs, adjectives, pronouns, conjunctions, prepositions, determiners, exclamations, etc.

As an example of multiple grammatical use, the word "bat" in the English language can be utilized as a noun or a verb. For instance, when utilized as a noun, the word "bat" may apply to a baseball bat or may apply to a flying "bat." As another instance, when utilized as a verb, the word "bat" may apply to the action of hitting or batting an object, i.e., "bat the ball."

To stratify word types by use, the words are associated with a word type (e.g., type identifier 542). The word types include objects (e.g., items 524), characteristics (e.g., attributes 526), actions 522, and the functionals 550 for joining other words and describing words. For example, when the word "bat" is utilized as a noun, the word is describing the object of either the baseball bat or the flying bat. As another example, when the word "bat" is utilized as a verb, the word is describing the action of hitting.

To determine possible meanings, the words, by word type, are mapped to associative meanings (e.g., identigens 518). For each possible associative meaning, the word type is documented with the meaning and further with an identifier (ID) of the instance (e.g., an identigen identifier).

For the example of the word "bat" when utilized as a noun for the baseball bat, a first identigen identifier 536-1 includes a type ID 542-1 associated with the object 524, an instance ID 540-1 associated with the first identigen identifier (e.g., unique for the baseball bat), and a meaning ID 538-1 associated with the baseball bat. For the example of the word "bat" when utilized as a noun for the flying bat, a second identigen identifier 536-2 includes a type ID 542-1 associated with the object 524, an instance ID 540-2 associated with the second identigen identifier (e.g., unique for the flying bat), and a meaning ID 538-2 associated with the flying bat. For the example of the word "bat" when utilized as a verb for the bat that hits, a third identigen identifier 536-2 includes a type ID 542-2 associated with the actions 522, an instance ID 540-3 associated with the third identigen identifier (e.g., unique for the bat that hits), and a meaning ID 538-3 associated with the bat that hits.

With the word described by a type and possible associative meanings, a combination of full grammatical use of the word within the phrase etc., application of rules, and utilization of an ever-growing knowledge database that represents knowledge by linked entigens, the absolute meaning (e.g., entigen 520) of the word is represented as a unique entigen. For example, a first entigen e1 represents the absolute meaning of a baseball bat (e.g., a generic baseball bat not a particular baseball bat that belongs to anyone), a second entigen e2 represents the absolute meaning of the flying bat (e.g., a generic flying bat not a particular flying bat), and a third entigen e3 represents the absolute meaning of the verb bat (e.g., to hit).

An embodiment of methods to ingest text to produce absolute meanings for storage in a knowledge database are discussed in greater detail with reference to FIGS. 8F-H. Those embodiments further discuss the discerning of the grammatical use, the use of the rules, and the utilization of the knowledge database to definitively interpret the absolute meaning of a string of words.

Another embodiment of methods to respond to a query to produce an answer based on knowledge stored in the knowledge database are discussed in greater detail with reference to FIGS. 8I-K. Those embodiments further discuss the discerning of the grammatical use, the use of the rules, and the utilization of the knowledge database to interpret the query. The query interpretation is utilized to extract the answer from the knowledge database to facilitate forming the query response.

Figure 8F:
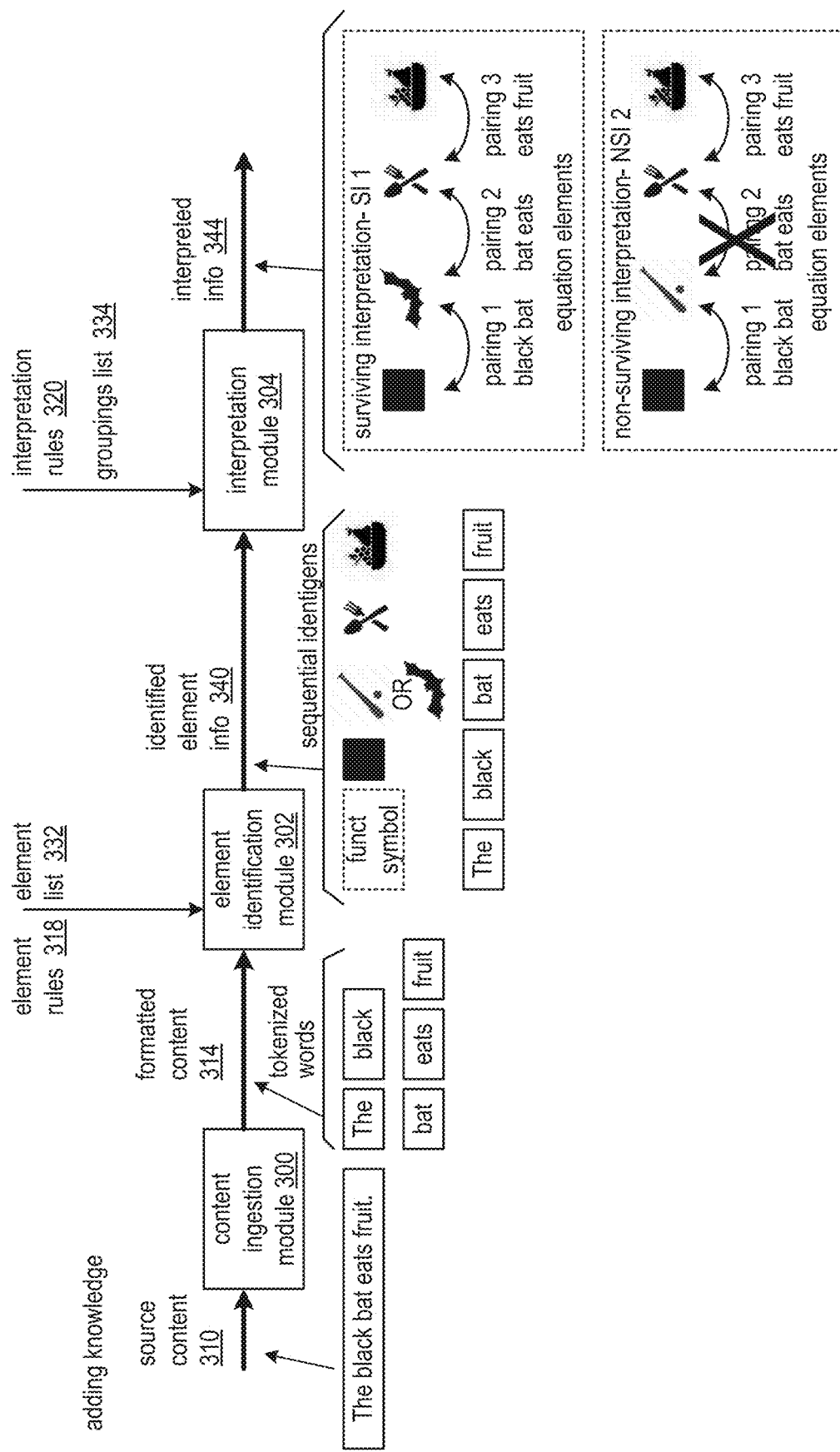
FIGS. 8F and 8G are schematic block diagrams of another embodiment of a computing system in accordance with the present invention.
Figure 8G:
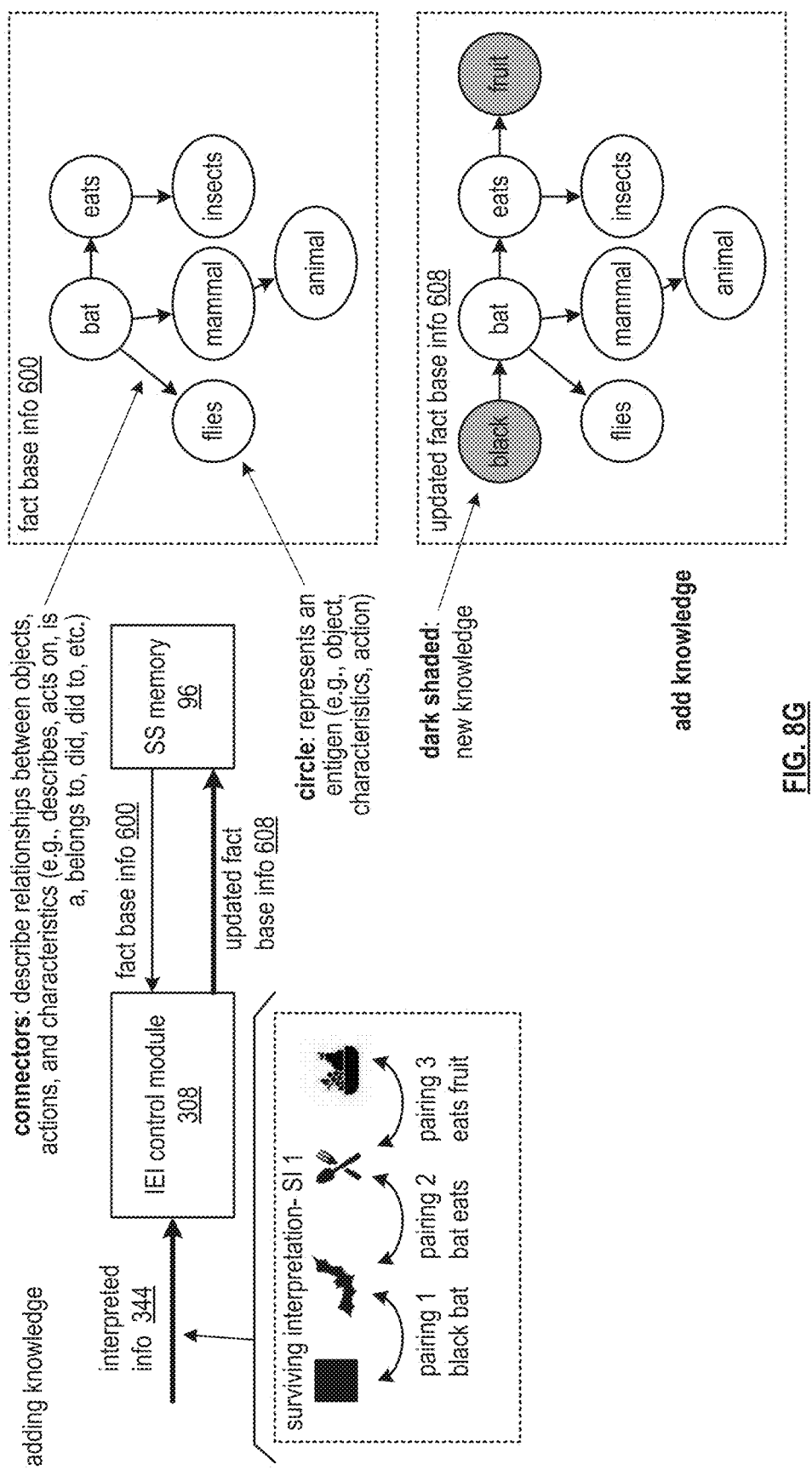

FIGS. 8F and 8G are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention provides presents solutions where the computing system supports processing content to produce knowledge for storage in a knowledge database.

The processing of the content to produce the knowledge includes a series of steps. For example, a first step includes identifying words of an ingested phrase to produce tokenized words. As depicted in FIG. 8F, a specific example of the first step includes the content ingestion module 300 comparing words of source content 310 to dictionary entries to produce formatted content 314 that includes identifiers of known words. Alternatively, when a comparison is unfavorable, the temporary identifier may be assigned to an unknown word. For instance, the content ingestion module 300 produces identifiers associated with the words "the", "black", "bat", "eats", and "fruit" when the ingested phrase includes "The black bat eats fruit", and generates the formatted content 314 to include the identifiers of the words.

A second step of the processing of the content to produce the knowledge includes, for each tokenized word, identifying one or more identigens that correspond the tokenized word, where each identigen describes one of an object, a characteristic, and an action. As depicted in FIG. 8F, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and the action (OCA) associated with the tokenized word (e.g. sequential identigens). For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit." When at least one tokenized word is associated with multiple identigens, two or more permutations of sequential combinations of identigens for each tokenized word result. For example, when "bat" is associated with two identigens, two permutations of sequential combinations of identigens result for the ingested phrase.

A third step of the processing of the content to produce the knowledge includes, for each permutation of sequential combinations of identigens, generating a corresponding equation package (i.e., candidate interpretation), where the equation package includes a sequential linking of pairs of identigens (e.g., relationships), where each sequential linking pairs a preceding identigen to a next identigen, and where an equation element describes a relationship between paired identigens (OCAs) such as describes, acts on, is a, belongs to, did, did to, etc. Multiple OCAs occur for a common word when the word has multiple potential meanings (e.g., a baseball bat, a flying bat).

As depicted in FIG. 8F, a specific example of the third step includes the interpretation module 304, for each permutation of identigens of each tokenized word of the identified element information 340, the interpretation module 304 generates, in accordance with interpretation rules 320 and a groupings list 334, an equation package to include one or more of the identifiers of the tokenized words, a list of identifiers of the identigens of the equation package, a list of pairing identifiers for sequential pairs of identigens, and a quality metric associated with each sequential pair of identigens (e.g., likelihood of a proper interpretation). For instance, the interpretation module 304 produces a first equation package that includes a first identigen pairing of a black bat (e.g., flying bat with a higher quality metric level), the second pairing of bat eats (e.g., the flying bat eats, with a higher quality metric level), and a third pairing of eats fruit, and the interpretation module 304 produces a second equation package that includes a first pairing of a black bat (e.g., baseball bat, with a neutral quality metric level), the second pairing of bat eats (e.g., the baseball bat eats, with a lower quality metric level), and a third pairing of eats fruit.

A fourth step of the processing of the content to produce the knowledge includes selecting a surviving equation package associated with a most favorable confidence level. As depicted in FIG. 8F, a specific example of the fourth step includes the interpretation module 304 applying interpretation rules 320 (i.e., inference, pragmatic engine, utilizing the identifiers of the identigens to match against known valid combinations of identifiers of entigens) to reduce a number of permutations of the sequential combinations of identigens to produce interpreted information 344 that includes identification of at least one equation package as a surviving interpretation SI (e.g., higher quality metric level).

Non-surviving equation packages are eliminated that compare unfavorably to pairing rules and/or are associated with an unfavorable quality metric levels to produce a non-surviving interpretation NSI 2 (e.g., lower quality metric level), where an overall quality metric level may be assigned to each equation package based on quality metric levels of each pairing, such that a higher quality metric level of an equation package indicates a higher probability of a most favorable interpretation. For instance, the interpretation module 304 eliminates the equation package that includes the second pairing indicating that the "baseball bat eats" which is inconsistent with a desired quality metric level of one or more of the groupings list 334 and the interpretation rules 320 and selects the equation package associated with the "flying bat eats" which is favorably consistent with the one or more of the quality metric levels of the groupings list 334 and the interpretation rules 320.

A fifth step of the processing of the content to produce the knowledge utilizing the confidence level includes integrating knowledge of the surviving equation package into a knowledge database. For example, integrating at least a portion of the reduced OCA combinations into a graphical database to produce updated knowledge. As another example, the portion of the reduced OCA combinations may be translated into rows and columns entries when utilizing a rows and columns database rather than a graphical database. When utilizing the rows and columns approach for the knowledge database, subsequent access to the knowledge database may utilize structured query language (SQL) queries.

As depicted in FIG. 8G, a specific example of the fifth step includes the IEI control module 308 recovering fact base information 600 from SS memory 96 to identify a portion of the knowledge database for potential modification utilizing the OCAs of the surviving interpretation SI 1 (i.e., compare a pattern of relationships between the OCAs of the surviving interpretation SI 1 from the interpreted information 344 to relationships of OCAs of the portion of the knowledge database including potentially new quality metric levels).

The fifth step further includes determining modifications (e.g., additions, subtractions, further clarifications required when information is complex, etc.) to the portion of the knowledge database based on the new quality metric levels. For instance, the IEI control module 308 causes adding the element "black" as a "describes" relationship of an existing bat OCA and adding the element "fruit" as an eats "does to" relationship to implement the modifications to the portion of the fact base information 600 to produce updated fact base information 608 for storage in the SS memory 96.

Figure 8H:
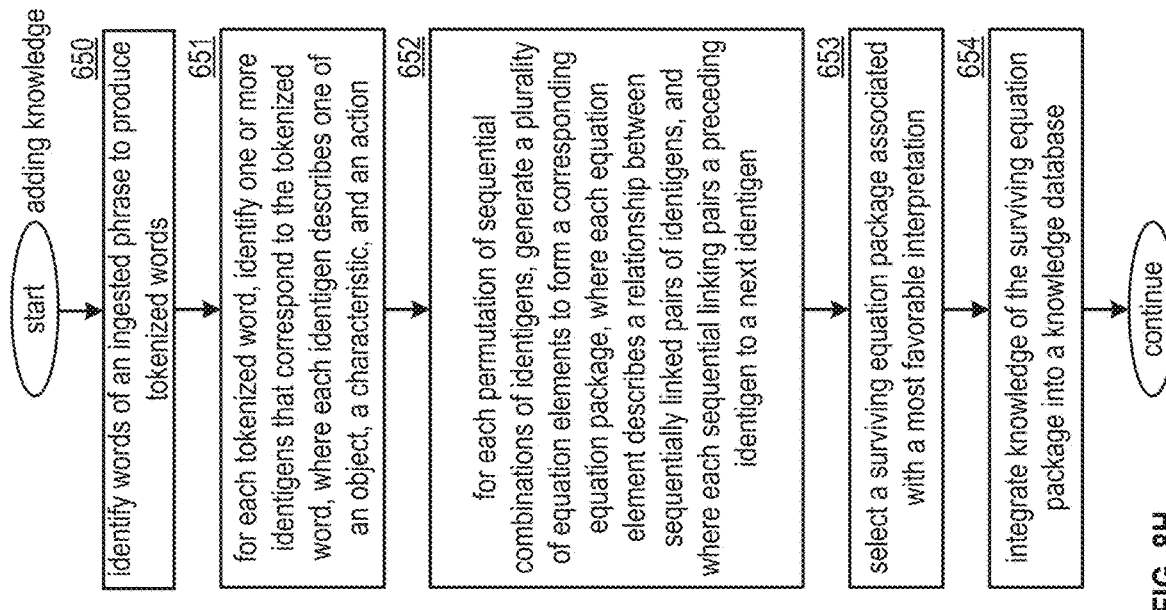
FIG. 8H is a logic diagram of an embodiment of a method for processing content to produce knowledge within a computing system in accordance with the present invention.

FIG. 8H is a logic diagram of an embodiment of a method for processing content to produce knowledge for storage within a computing system. In particular, a method is presented for use in conjunction with one or more functions and features described in conjunction with FIGS. 1-8E, 8F, and also FIG. 8G. The method includes step 650 where a processing module of one or more processing modules of one or more computing devices of the computing system identifies words of an ingested phrase to produce tokenized words. The identified includes comparing words to known words of dictionary entries to produce identifiers of known words.

For each tokenized word, the method continues at step 651 where the processing module identifies one or more identigens that corresponds to the tokenized word, where each identigen describes one of an object, a characteristic, and an action (e.g., OCA). The identifying includes performing a lookup of identifiers of the one or more identigens associated with each tokenized word, where the different identifiers associated with each of the potential object, the characteristic, and the action associated with the tokenized word.

The method continues at step 652 where the processing module, for each permutation of sequential combinations of identigens, generates a plurality of equation elements to form a corresponding equation package, where each equation element describes a relationship between sequentially linked pairs of identigens, where each sequential linking pairs a preceding identigen to a next identigen. For example, for each permutation of identigens of each tokenized word, the processing module generates the equation package to include a plurality of equation elements, where each equation element describes the relationship (e.g., describes, acts on, is a, belongs to, did, did too, etc.) between sequentially adjacent identigens of a plurality of sequential combinations of identigens. Each equation element may be further associated with a quality metric to evaluate a favorability level of an interpretation in light of the sequence of identigens of the equation package.

The method continues at step 653 where the processing module selects a surviving equation package associated with most favorable interpretation. For example, the processing module applies rules (i.e., inference, pragmatic engine, utilizing the identifiers of the identigens to match against known valid combinations of identifiers of entigens), to reduce the number of permutations of the sequential combinations of identigens to identify at least one equation package, where non-surviving equation packages are eliminated the compare unfavorably to pairing rules and/or are associated with an unfavorable quality metric levels to produce a non-surviving interpretation, where an overall quality metric level is assigned to each equation package based on quality metric levels of each pairing, such that a higher quality metric level indicates an equation package with a higher probability of favorability of correctness.

The method continues at step 654 where the processing module integrates knowledge of the surviving equation package into a knowledge database. For example, the processing module integrates at least a portion of the reduced OCA combinations into a graphical database to produce updated knowledge. The integrating may include recovering fact base information from storage of the knowledge database to identify a portion of the knowledge database for potential modifications utilizing the OCAs of the surviving equation package (i.e., compare a pattern of relationships between the OCAs of the surviving equation package to relationships of the OCAs of the portion of the knowledge database including potentially new quality metric levels). The integrating further includes determining modifications (e.g., additions, subtractions, further clarifications required when complex information is presented, etc.) to produce the updated knowledge database that is based on fit of acceptable quality metric levels, and implementing the modifications to the portion of the fact base information to produce the updated fact base information for storage in the portion of the knowledge database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 8I:
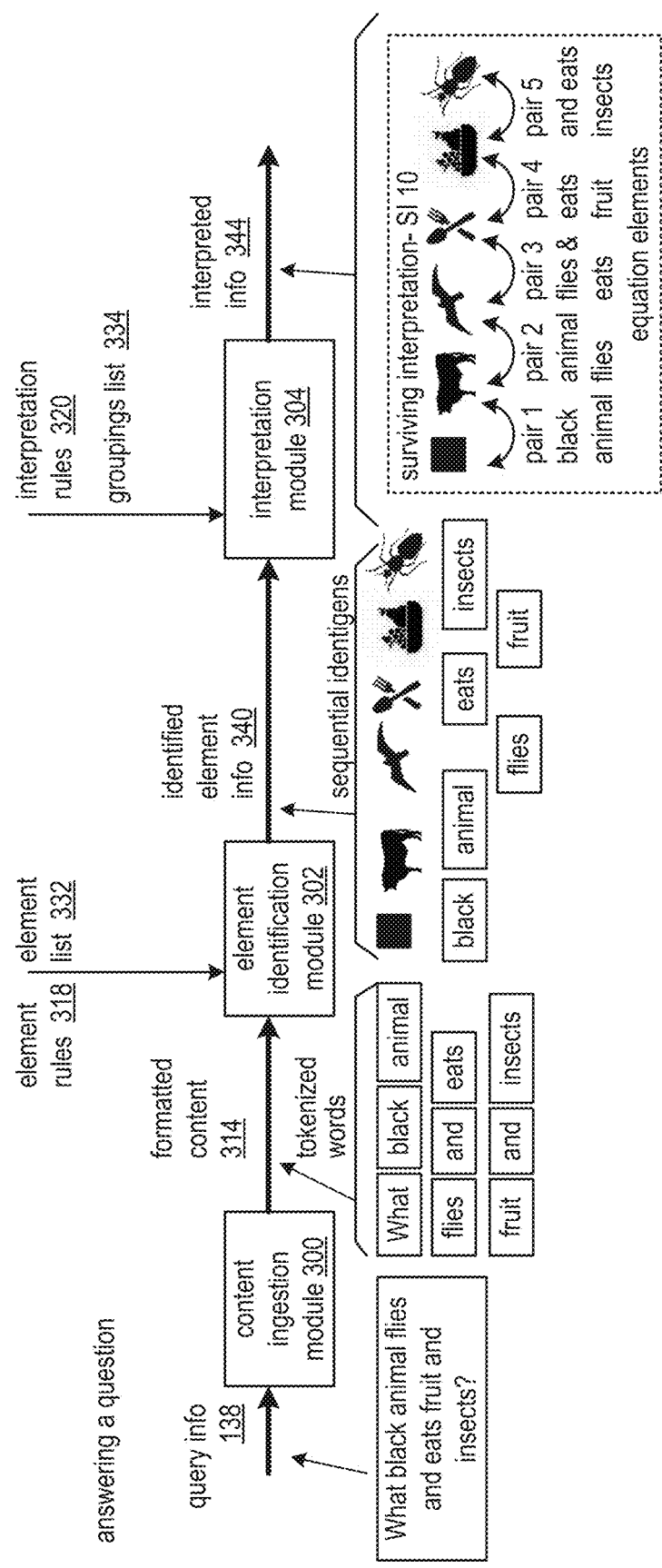
FIGS. 8I and 8J are schematic block diagrams of another embodiment of a computing system in accordance with the present invention.
Figure 8J:
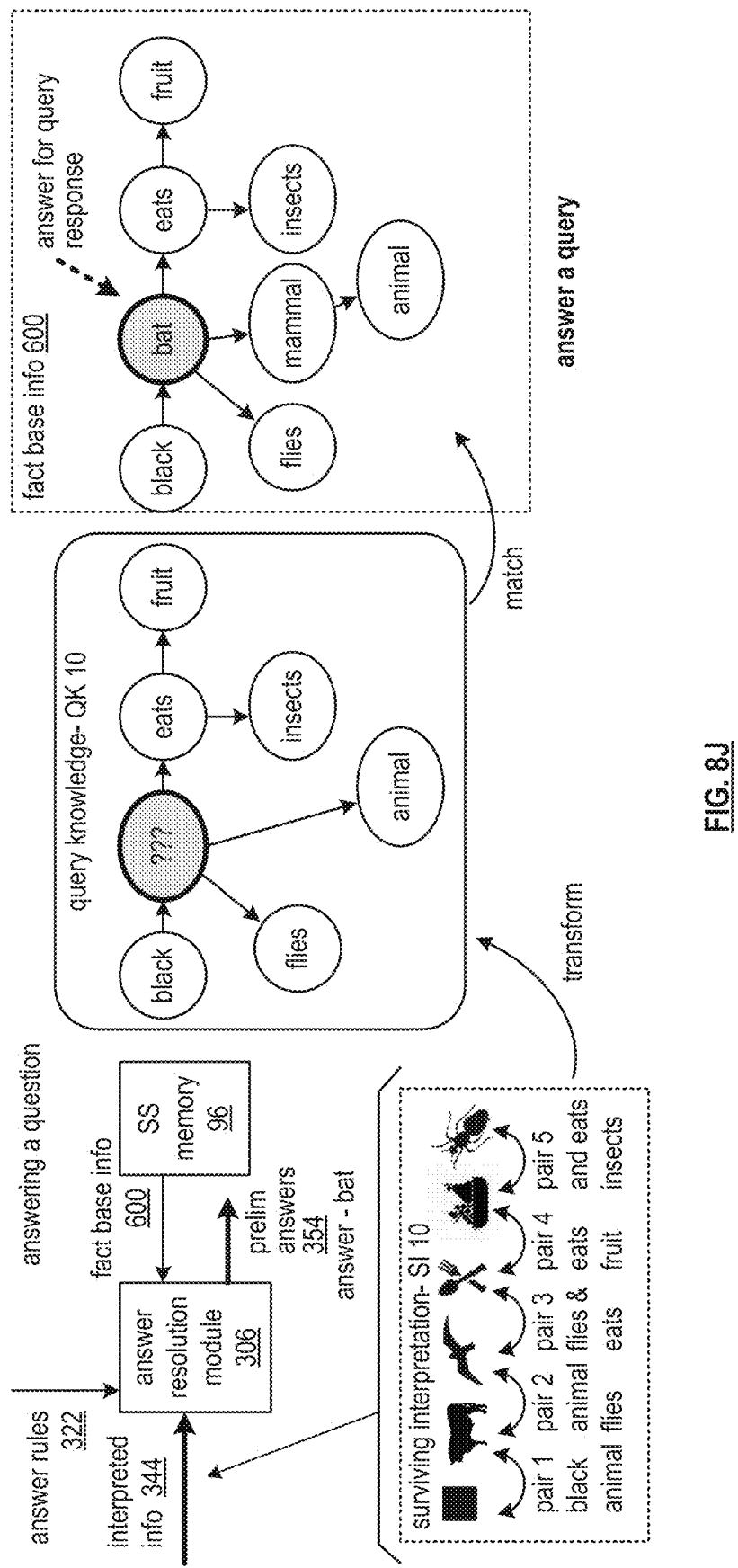

FIGS. 8I and 8J are schematic block diagrams of another embodiment of a computing system that includes the content ingestion module 300 of FIG. 5E, the element identification module 302 of FIG. 5E, the interpretation module 304 of FIG. 5E, the answer resolution module 306 of FIG. 5E, and the SS memory 96 of FIG. 2. Generally, an embodiment of this invention provides solutions where the computing system 10 supports for generating a query response to a query utilizing a knowledge database.

The generating of the query response to the query includes a series of steps. For example, a first step includes identifying words of an ingested query to produce tokenized words. As depicted in FIG. 8I, a specific example of the first step includes the content ingestion module 300 comparing words of query info 138 to dictionary entries to produce formatted content 314 that includes identifiers of known words. For instance, the content ingestion module 300 produces identifiers for each word of the query "what black animal flies and eats fruit and insects?"

A second step of the generating of the query response to the query includes, for each tokenized word, identifying one or more identigens that correspond the tokenized word, where each identigen describes one of an object, a characteristic, and an action (OCA). As depicted in FIG. 8I, a specific example of the second step includes the element identification module 302 performing a look up of identifiers, utilizing an element list 332 and in accordance with element rules 318, of the one or more identigens associated with each tokenized word of the formatted content 314 to produce identified element information 340. A unique identifier is associated with each of the potential object, the characteristic, and the action associated with a particular tokenized word. For instance, the element identification module 302 produces a single identigen identifier for each of the black color, an animal, flies, eats, fruit, and insects.

A third step of the generating of the query response to the query includes, for each permutation of sequential combinations of identigens, generating a corresponding equation package (i.e., candidate interpretation). The equation package includes a sequential linking of pairs of identigens, where each sequential linking pairs a preceding identigen to a next identigen. An equation element describes a relationship between paired identigens (OCAs) such as describes, acts on, is a, belongs to, did, did to, etc.

As depicted in FIG. 8I, a specific example of the third step includes the interpretation module 304, for each permutation of identigens of each tokenized word of the identified element information 340, generating the equation packages in accordance with interpretation rules 320 and a groupings list 334 to produce a series of equation elements that include pairings of identigens. For instance, the interpretation module 304 generates a first pairing to describe a black animal, a second pairing to describe an animal that flies, a third pairing to describe flies and eats, a fourth pairing to describe eats fruit, and a fifth pairing to describe eats fruit and insects.

A fourth step of the generating the query response to the query includes selecting a surviving equation package associated with a most favorable interpretation. As depicted in FIG. 8I, a specific example of the fourth step includes the interpretation module 304 applying the interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344. The interpreted information 344 includes identification of at least one equation package as a surviving interpretation SI 10, where non-surviving equation packages, if any, are eliminated that compare unfavorably to pairing rules to produce a non-surviving interpretation.

A fifth step of the generating the query response to the query includes utilizing a knowledge database, generating a query response to the surviving equation package of the query, where the surviving equation package of the query is transformed to produce query knowledge for comparison to a portion of the knowledge database. An answer is extracted from the portion of the knowledge database to produce the query response.

As depicted in FIG. 8J, a specific example of the fifth step includes the answer resolution module 306 interpreting the surviving interpretation SI 10 of the interpreted information 344 in accordance with answer rules 322 to produce query knowledge QK 10 (i.e., a graphical representation of knowledge when the knowledge database utilizes a graphical database). For example, the answer resolution module 306 accesses fact base information 600 from the SS memory 96 to identify the portion of the knowledge database associated with a favorable comparison of the query knowledge QK 10 (e.g., by comparing attributes of the query knowledge QK to attributes of the fact base information 600), and generates preliminary answers 354 that includes the answer to the query. For instance, the answer is "bat" when the associated OCAs of bat, such as black, eats fruit, eats insects, is an animal, and flies, aligns with OCAs of the query knowledge.

Figure 8K:
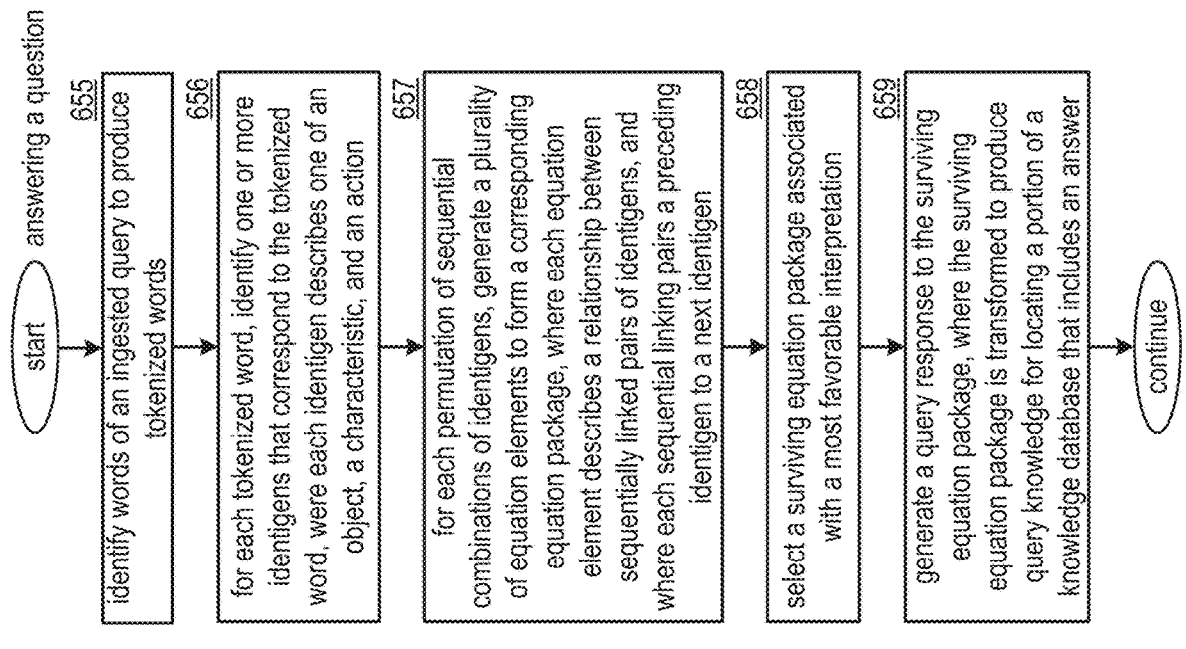
FIG. 8K is a logic diagram of an embodiment of a method for generating a query response to a query within a computing system in accordance with the present invention.

FIG. 8K is a logic diagram of an embodiment of a method for generating a query response to a query utilizing knowledge within a knowledge database within a computing system. In particular, a method is presented for use in conjunction with one or more functions and features described in conjunction with FIGS. 1-8D, 8I, and also FIG. 8J. The method includes step 655 where a processing module of one or more processing modules of one or more computing devices of the computing system identifies words of an ingested query to produce tokenized words. For example, the processing module compares words to known words of dictionary entries to produce identifiers of known words.

For each tokenized word, the method continues at step 656 where the processing module identifies one or more identigens that correspond to the tokenized word, where each identigen describes one of an object, a characteristic, and an action. For example, the processing module performs a lookup of identifiers of the one or more identigens associated with each tokenized word, where different identifiers associated with each permutation of a potential object, characteristic, and action associated with the tokenized word.

For each permutation of sequential combinations of identigens, the method continues at step 657 where the processing module generates a plurality of equation elements to form a corresponding equation package, where each equation element describes a relationship between sequentially linked pairs of identigens. Each sequential linking pairs a preceding identigen to a next identigen. For example, for each permutation of identigens of each tokenized word, the processing module includes all other permutations of all other tokenized words to generate the equation packages. Each equation package includes a plurality of equation elements describing the relationships between sequentially adjacent identigens of a plurality of sequential combinations of identigens.

The method continues at step 658 where the processing module selects a surviving equation package associated with a most favorable interpretation. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated the compare unfavorably to pairing rules.

The method continues at step 659 where the processing module generates a query response to the surviving equation package, where the surviving equation package is transformed to produce query knowledge for locating the portion of a knowledge database that includes an answer to the query. As an example of generating the query response, the processing module interprets the surviving the equation package in accordance with answer rules to produce the query knowledge (e.g., a graphical representation of knowledge when the knowledge database utilizes a graphical database format).

The processing module accesses fact base information from the knowledge database to identify the portion of the knowledge database associated with a favorable comparison of the query knowledge (e.g., favorable comparison of attributes of the query knowledge to the portion of the knowledge database, aligning favorably comparing entigens without conflicting entigens). The processing module extracts an answer from the portion of the knowledge database to produce the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 9A:
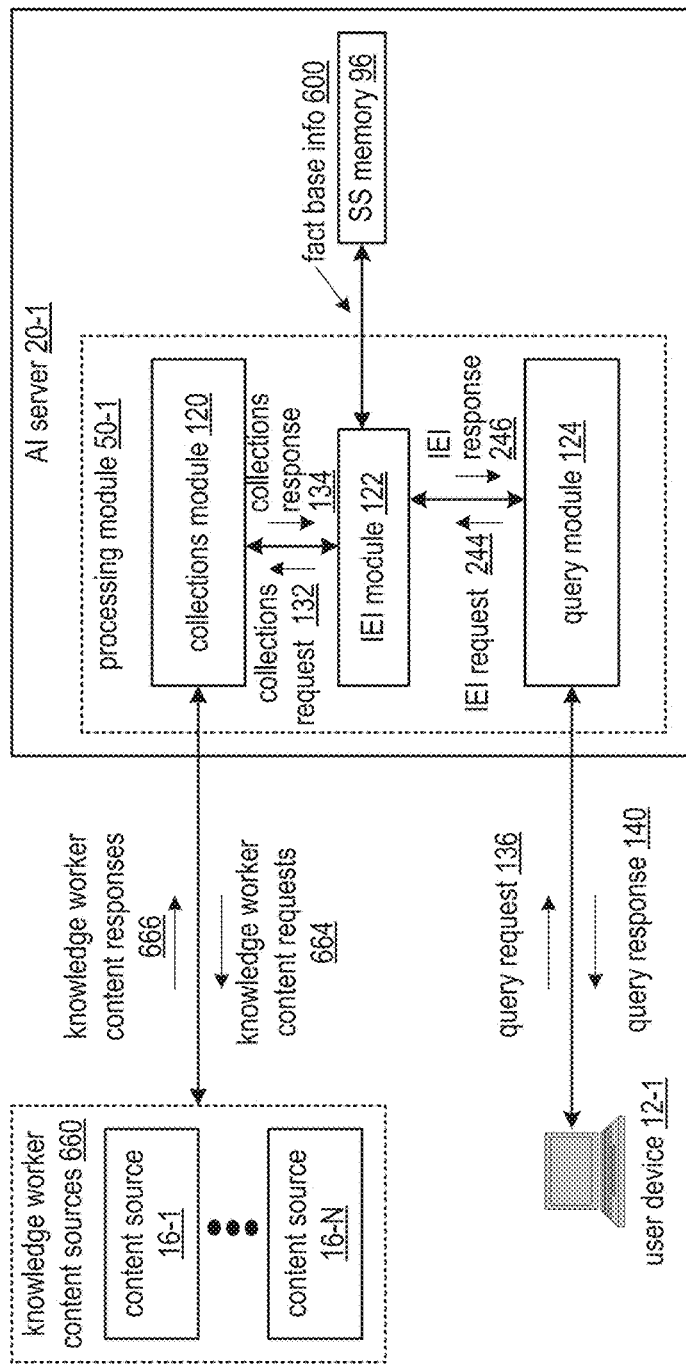
FIG. 9A is a schematic block diagram of another embodiment of a computing system in accordance with the present invention.

FIG. 9A is a schematic block diagram of another embodiment of a computing system that includes knowledge worker content sources 660, the AI server 20-1 of FIG. 1, and the user device 12-1 of FIG. 1. The knowledge worker content sources 660 includes the content sources 16-1 through 16-N of FIG. 1 and provides content. The content is generated, or retrieved, in response to one or more knowledge worker content requests 664 in accordance with a knowledge worker response generating approach. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of the invention presents solutions where the computing system 10 supports capturing knowledge.

In an example of operation of the capturing of the knowledge, the IEI module 122 determines to accumulate knowledge associated with a knowledge worker. An example of the determining includes interpreting an IEI request 244 from the query module 124, where the query module 124 receives a query request 136 from the user device 12-1. The request is to identify the knowledge worker associated with a class of knowledge associated with the query request 136. The identifying includes calculating a risk level of loss of knowledge (e.g., likelihood of a knowledge worker becoming unavailable such as moving to a new role, being part of job elimination, severed for unfavorable performance, retiring, etc.), and indicating to accumulate the knowledge associated with the identified knowledge worker when the risk level of loss of the knowledge and an estimated impact of the loss of the knowledge are unfavorable.

Having determined to accumulate knowledge associated with the identified knowledge worker, the IEI module 122 determines a content collection plan for content associated with the knowledge worker. The content collection plan includes one or more of a pace of capturing knowledge, identifiers of content sources of the knowledge worker content sources 660, a type of desired content, a content domain, a content prior to level, a knowledge worker importance level, a knowledge scarcity level, etc. The determining of the content collection plan includes one or more of identifying a relative timeframe associated with unavailability of the knowledge worker, producing the pace of the capturing of the knowledge based on the relative timeframe, and identifying content sources associated with the knowledge worker (e.g., file servers containing work product from the content worker, etc.).

Having produced the content collection plan, the IEI module 122 facilitates collection of the content associated with the knowledge worker to produce the knowledge associated with the knowledge worker. The facilitating includes causing one or more content collection cycles, where each cycle includes the IEI module 122 issuing a collections request 132 to the collections module 120. The request includes at least a portion of the content collection plan.

The collections module 120 facilitates one or more knowledge worker content collection cycles. Each cycle includes issuing one or more knowledge worker content requests 664 to one or more content sources 16-1 through 16-N of the knowledge worker content sources 660 to cause receiving of knowledge worker content responses 666. One or more of the content sources generates content of the knowledge worker content responses 666 based on locally prestored content and/or a knowledge worker content response generating approach.

The knowledge worker content responses 666 includes content that is traversed by the knowledge worker including work products, papers, plans, reviews, emails, notes, recordings, materials read, etc. The collections module 120 issues a collections response 134 to the IEI module 122 when favorable knowledge worker content has been collected. Detection of favorable collection includes a goal of a content collection cycle has been met, a goal of the content collection plan has been met, content has been collected in accordance with the pace of the capturing of the knowledge, a number of content sources have been query, a sufficient number of incremental content has been collected, and one or more mandatory content sources have provided incremental content.

Having collected the content associated with the knowledge worker, the IEI module 122 processes the knowledge worker content of the collections response 134 to produce further knowledge for storage as fact base information 600 in the SS memory 96. The IEI processing includes analyzing the human expressions from the knowledge worker content to produce identigens, and utilizing rules to interpret permutations of possible identigens to resolve to a set of associated entigens and knowledge.

Having produced the further knowledge, the IEI module 122 issues, in accordance with the query request 136, an IEI response 246 to the query module 124. The IEI module 122 generates the IEI response 246 to include a response to the query request 136 based on the knowledge worker knowledge of the knowledge base. The query module 124 issues a query response 142 the user device 12-1. The query module 124 generates the query response 140 to include at least some of the IEI response 246.

Figure 9B:
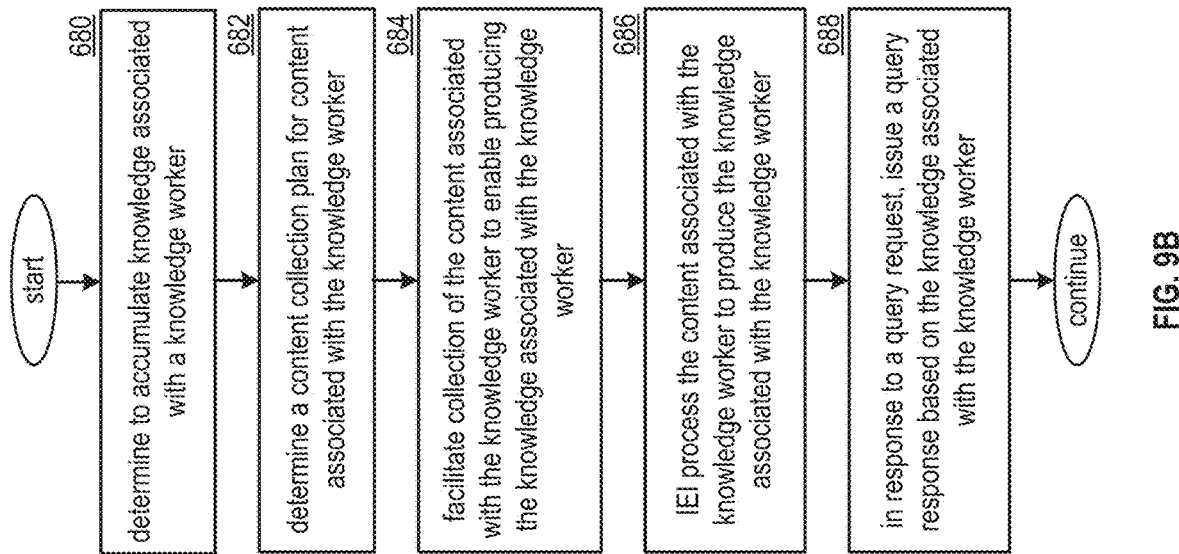
FIG. 9B is a logic diagram of an embodiment of a method for capturing knowledge within a computing system in accordance with the present invention.

FIG. 9B is a logic diagram of an embodiment of a method for capturing knowledge within a computing system. In particular, a method is presented for use in conjunction with one or more functions and features described in conjunction with FIGS. 1-8D, 9A, and also FIG. 9B. The method includes step 680 where a processing module of one or more processing modules of one or more computing devices of the computing system determines to accumulate knowledge associated with a knowledge worker. For example, the processing module identifies the knowledge worker associated with a class of knowledge associated with a query request, calculates a risk level of loss of knowledge (e.g., likelihood of the knowledge worker becoming unavailable), computes an estimated impact of loss of knowledge (e.g., impact on an associated organization), and indicates to accumulate the knowledge associated with the identified knowledge worker when the risk level of loss of the knowledge and the estimated impact of the loss of the knowledge are unfavorable.

The method continues at step 682 where the processing module determines a content collection plan for content associated with the knowledge worker. The determining includes identifying a relative timeframe associated with unavailability of the knowledge worker, producing a pace of capturing of the knowledge based on the relative timeframe, and identifying content sources associated with the knowledge worker.

The method continues at step 684 where the processing module facilitates collection of the content associated with the knowledge worker to enable producing the knowledge associated with the knowledge worker. In an example of the facilitating, the processing module causes one or more content collection cycles, where each cycle includes issuing a collections request. The request includes at least a portion of the content collection plan and facilitates one or more knowledge worker content collection cycles. Each cycle includes issuing one or more knowledge worker content requests to one or more content sources of knowledge worker content sources to cause receiving of knowledge worker content responses. One or more of the content sources generates content of the knowledge worker content responses based on locally prestored content and/or a knowledge worker content response generating approach.

The example of the facilitating further includes issuing a collections response when favorable knowledge worker content has been collected. Favorable collection includes a goal of a content collection cycle has been met, a goal of a content collection plan has been met, content has been collected in accordance with the pace of the capturing of the knowledge, a number of content sources have been query, a sufficient volume of incremental content has been collected, one or more mandatory content sources have provided incremental content.

The method continues at step 686 where the processing module IEI processes the content associated with the knowledge worker to produce the knowledge associated with the knowledge worker. The IEI processing includes analyzing human expressions to produce identigens and utilizing rules to interpret permutations of identigens to resolve to a set of associated entigens and knowledge.

The method continues at step 688 where, in response to a query request, the processing module issues a query response based on the knowledge associated with the knowledge worker. For example, the processing module generates the query response based on the query request and the knowledge of the knowledge worker and sends the query response to a requesting entity.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 10A:
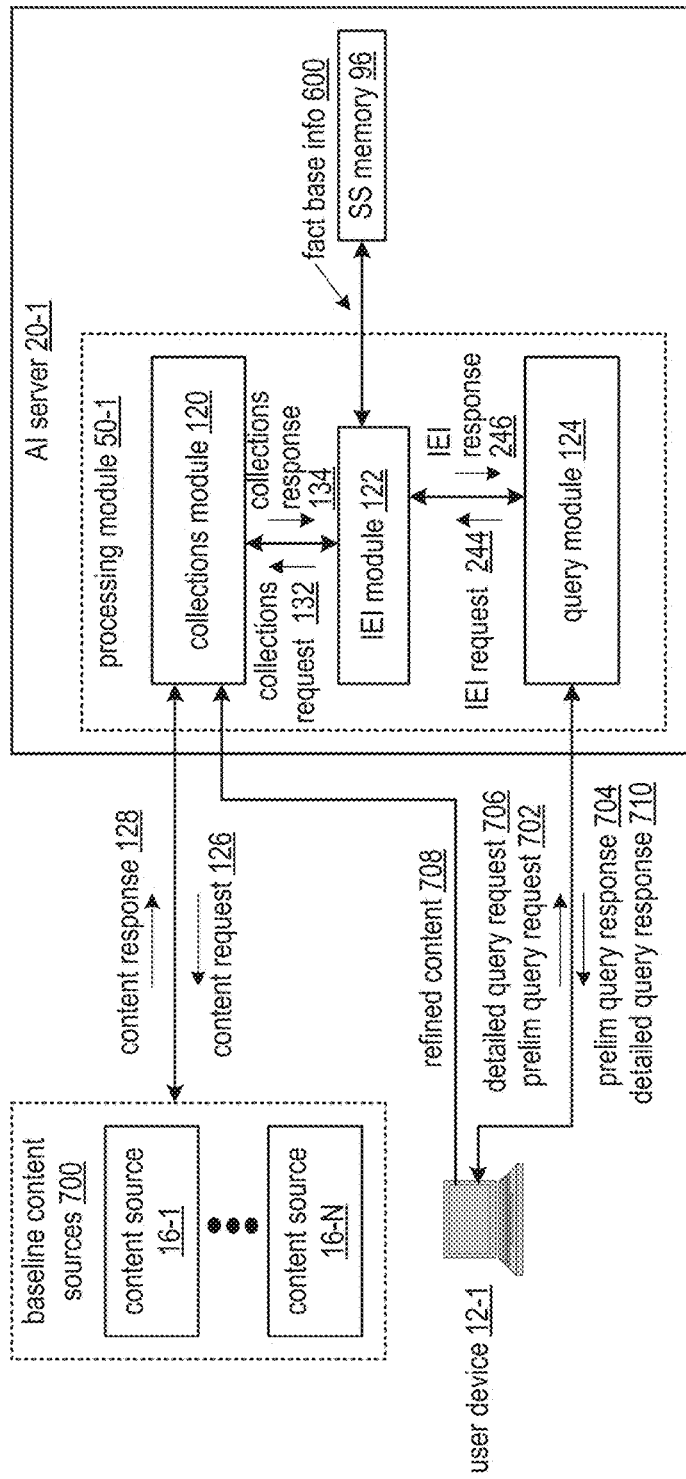
FIG. 10A is a schematic block diagram of another embodiment of a computing system in accordance with the present invention.

FIG. 10A is a schematic block diagram of another embodiment of a computing system that includes baseline content sources 700, the AI server 20-1 of FIG. 1, and the user device 12-1 of FIG. 1. The baseline content sources 700 includes the content sources 16-1 through 16-N of FIG. 1 and provides content generated, or retrieved, in response to one or more content requests 126 in accordance with a baseline response generating approach. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of the invention presents solutions where the computing system 10 supports analyzing knowledge.

In an example of operation of the analyzing of the knowledge, the IEI module 122 facilitates issuing of a preliminary query response in response to a preliminary query request, where the preliminary query response is generated utilizing existing knowledge from a knowledge base. The facilitating includes interpreting and IEI request 244 from the query module 124, where the query module 124 receives the preliminary query request 702 from the user device 12-1, IEI processes the IEI request 244 utilizing fact base information 600 from the SS memory 96 to produce an IEI response 246.

The query module 124 issues a preliminary query response 704 based on the IEI response 246. The IEI module 122 generates the fact base information 600 by IEI processing content of a collections response 134 from the collections module 120. The collections module 120 receives content responses 128 from content sources of the baseline content sources 700 (e.g., including content that provides at least preliminary knowledge for further analysis) in response to issuing content requests 126 to the baseline content sources 700. The collections module 120 issues the content request 126 based on receiving a collections request 132 from the IEI module 122 when the IEI module 122 facilitates generating the existing knowledge of the knowledge base.

Having issued the preliminary query response, the IEI module 122 determines to collect refined content associated with one or more of the preliminary query request 702 and an associated detailed query request 706. The refined content includes new content associated with the preliminary query response 704 (e.g., a manually drafted report generated by an expert when reviewing the preliminary query response 704).

Having determined to collect the refined content, the IEI module 122 facilitates collection of the refined content. The facilitating includes causing one or more content collection cycles. Each cycle includes the IEI module 122 issuing a collections request 132 to the collections module 120. The request includes an indicator to collect the refined content.

The collections module 120 facilitates one or more refined content collection cycles, where each cycle includes receiving a portion of the refined content 708. At least one of the user device 12-1 and a content source of the baseline content sources 700 generates content of the refined content 708. The collections module 120 issues a collections response 134 to the IEI module 122 when favorable refined content has been collected (e.g., a goal of a content collection cycle has been met, in number of content sources have been query, the user device 12-1 has responded, a sufficient volume of incremental content has been collected, one or more mandatory content sources have provided incremental content, etc.).

Having selected the refined content, the IEI module 122 IEI processes the refined content of the collections response 134 to produce further knowledge for storage as fact base information 600 in the SS memory 96. The processing includes analyzing human expressions of the refined content to produce permutations of identigens, utilizing rules to interpret permutations of the identigens to resolve to a set of associated entigens and knowledge.

Having produced the further knowledge, the IEI module 122 issues, in accordance with the detailed query request 706, an IEI response 246 to the query module 124. The IEI module 122 generates the IEI response 246 to include a response to the detailed query request 706 based on the further knowledge and previous existing knowledge of the knowledge database. The query module 124 issues a detailed query response 710 to the user device 12-1. The query module 124 generates the detailed query response 710 to include at least some of the IEI response 246.

Figure 10B:
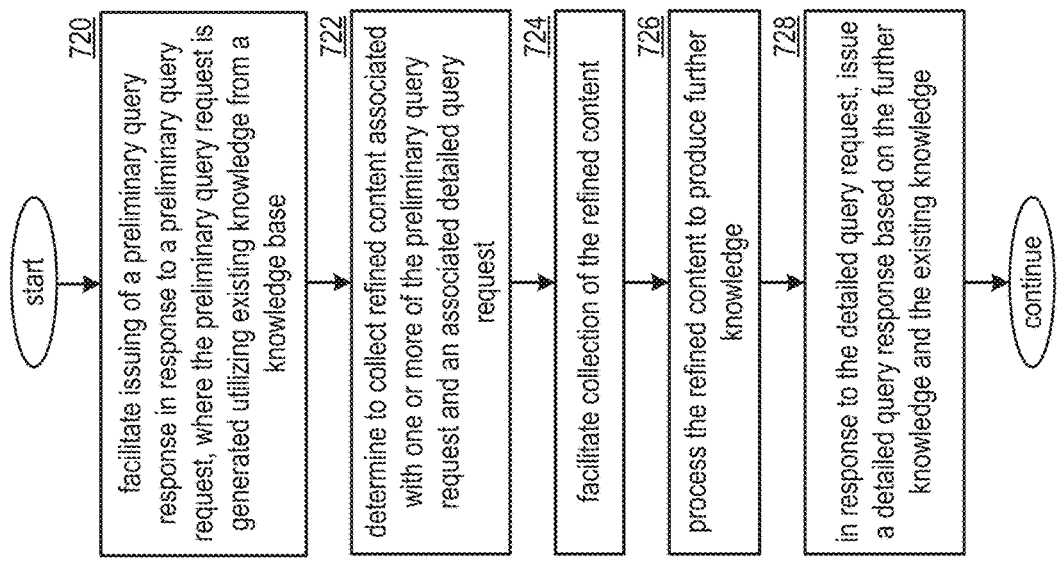
FIG. 10B is a logic diagram of an embodiment of a method for analyzing knowledge within a computing system in accordance with the present invention.

FIG. 10B is a logic diagram of an embodiment of a method for analyzing knowledge within a computing system. In particular, a method is presented for use in conjunction with one or more functions and features described in conjunction with FIGS. 1-8D, 10A, and also FIG. 10B. The method includes step 720 where a processing module of one or more processing modules of one or more computing devices of the computing system facilitates issuing a preliminary query response in response to a preliminary query request, where the preliminary query request is generated utilizing existing knowledge from a knowledge base. The facilitating includes IEI processing the preliminary query request utilizing fact base information of the knowledge base to produce the preliminary query response and sending the preliminary query response to a requesting entity.

The method continues at step 722 where the processing module determines to collect refined content associated with one or more of the preliminary query request and an associated detailed query request. The determining includes receiving a detailed query request subsequent to issuing the preliminary query response or autonomously receiving the refined content (e.g., from a user device).

The method continues at step 724 where the processing module facilitates collection of the refined content. For example, the processing module causes receiving a portion of the refined content in one or more collection cycles, where at least one of the user device and a content source of baseline content sources generates content of the refine content.

The method continues at step 726 for the processing module processes the refined content to produce further knowledge. The processing includes analyzing human expressions of the refined content to produce entigens and utilizing rules to interpret permutations of identigens to resolve to a set of associated entigens and knowledge.

The method continues at step 728 where the processing module, in response to the detailed query request, issues a detailed query response based on the further knowledge and the existing knowledge. For example, the processing module generates the detailed query response based on the detailed query request, the further knowledge, and the existing knowledge, and sends the detailed query response to the requesting entity.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 11A:
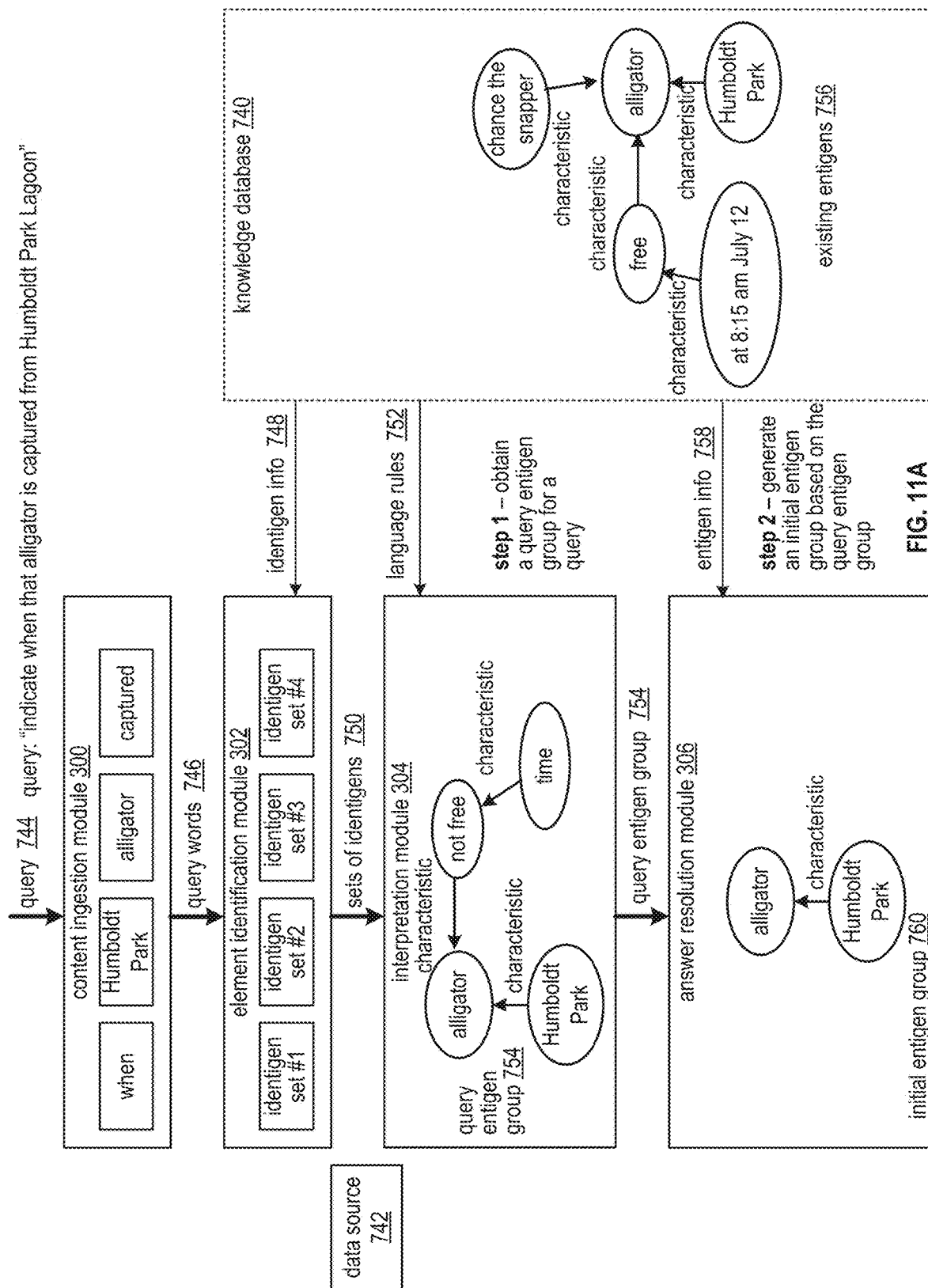
FIGS. 11A-11B are schematic block diagrams of another embodiment of a computing system illustrating an embodiment of a method for processing a query request in accordance with the present invention.
Figure 11B:
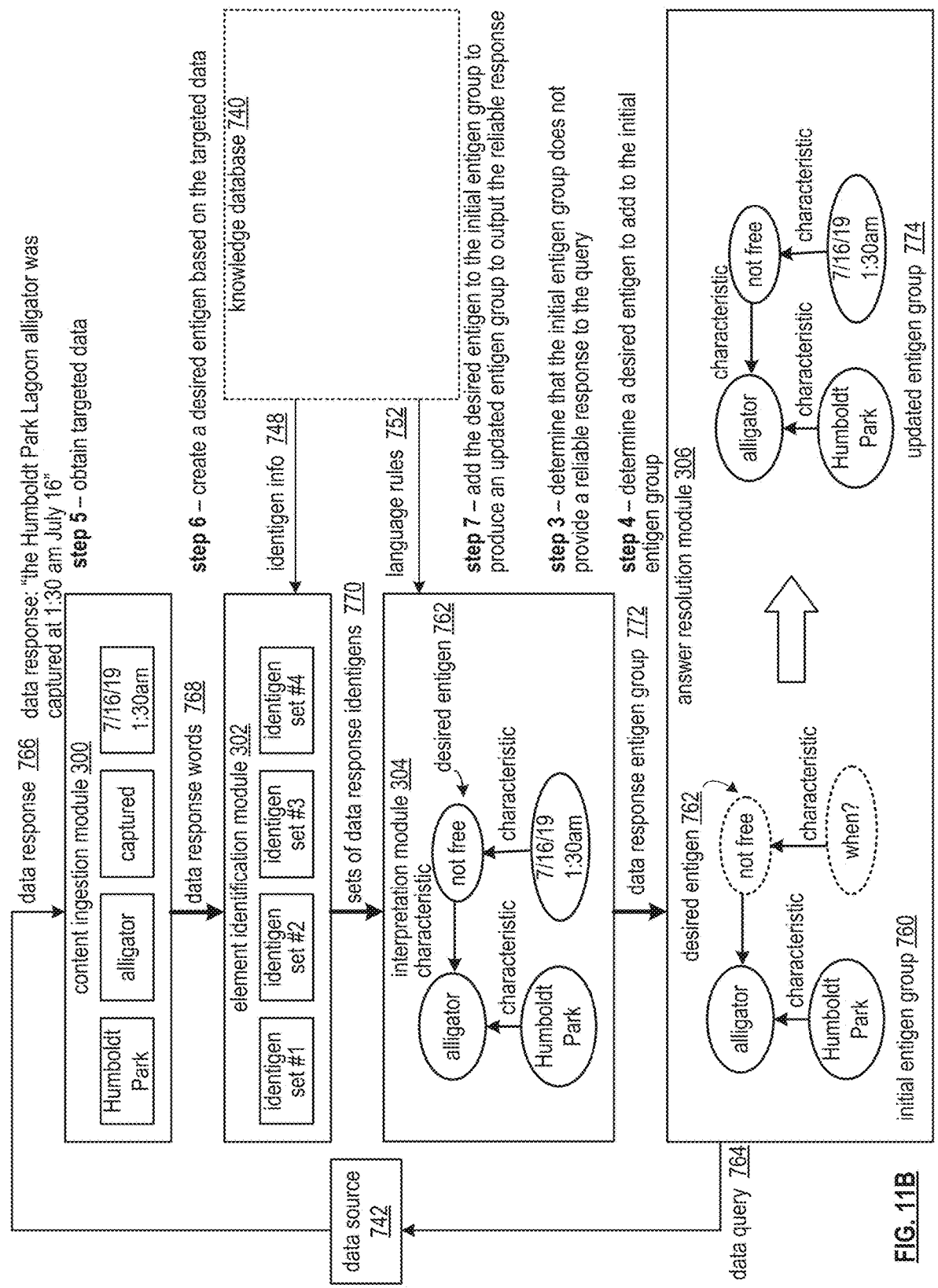

FIGS. 11A-11B are schematic block diagrams of another embodiment of a computing system illustrating an embodiment of a method for processing a query request. The computing system includes the content ingestion module 300 of FIG. 5E, the element identification module 302 of FIG. 5E, the interpretation module 304 of FIG. 5E, the answer resolution module 306 of FIG. 5E, a knowledge database 740, and a data source 742. In an embodiment, the knowledge database 740 is implemented utilizing the fact base 592 of FIG. 8A. In an embodiment, the data source 742 is implemented utilizing one or more of the content sources 16-1 through 16-N of FIG. 1.

FIG. 11A illustrates an example of the method of the processing of the query request where the content ingestion module 300 receives a query 744 and parses the query 701 to produce query words 746 that includes a plurality of words. For example, when the query includes "indicate when that alligator is captured from Humboldt Park Lagoon", the content ingestion module 300 produces the query words 746 to include "when", "Humboldt Park", "alligator", and "captured."

The element identification module 302 identifies a set of identigens for each word of the query to produce a plurality of sets of identigens 750. For example, the element identification module 302 accesses the knowledge database 740 utilizing the query words 746 to recover identigen information 748. The identigen information 748 includes, for each word, a set of associated identigens. A set of identigens of the plurality of sets of identigens includes one or more different meanings of a word of the query. For instance, an identigen set #3 is recovered that corresponds to the word "alligator" (e.g., noun American alligator reptile, noun Chinese alligator reptile) and an entigen set #4 is recovered that corresponds to the word "captured" (e.g., past tense taken to one's position, record, express), etc.

The interpretation module 304 interprets, utilizing language rules 752, the plurality of sets of identigens 750 to produce a query entigen group 754. A query entigen of the query entigen group corresponds to an identigen of the set identigens 750 having a selected meaning of the one or more different meanings of the word of the query. The language rules 752 includes an indication of valid sequential permutations of identigens as found in accordance with a particular language of the words of the query.

The query entigen group 754 represents a most likely interpretation of the query 744. An entigen group includes a plurality of entigens, where each entigen represents one of an object, a characteristic, and an action. For example, the interpretation module 304 generates the query entigen group 754 to include an object entigen for alligator, a characteristic entigen for Humboldt Park, a characteristic entigen for not free, and a characteristic entigen for time (e.g., of capture/not free).

An entigen group further includes relationships between entigens including describes, acts on, is a, belongs to, did, did too, etc. The query entigen group 754 further includes a relationship between the Humboldt Park entigen and the alligator entigen, a relationship between the time entigen and the not free entigen, and a relationship between the not free entigen and the alligator entigen.

Having received the query entigen group 754, the answer resolution module 306 generates an initial entigen group 760 for the query 744 from existing entigens 756 in the knowledge database 740. The generating of the initial entigen group 760 includes identifying a group of entigens from entigen information 758 of the existing entigen 756 of the knowledge database 740 that compares favorably to the query entigen group 754 as the initial entigen group 760. For example, the answer resolution module 306 identifies a first entigen of the initial entigen group 760 that is substantially the same as a first query entigen of the query entigen group 754. For instance, the entigen for "alligator" is identified in both the query entigen group 754 and an entigen of the knowledge database 740.

The answer resolution module 306 further identifies that a second entigen of the initial entigen group 760 is substantially the same as a second query entigen of the query entigen group 754. For instance, the entigen for "Humboldt Park" is identified in both the query entigen group 754 and another entigen of the knowledge database 740.

The answer resolution module 306 further identifies that a first entigen relationship between the first and second query entigens of the query entigen group 754 is substantially the same as a second entigen relationship between the first and second entigens of the initial entigen group 760. For instance, the relationship is identified between the entigens for alligator and Humboldt Park of both the query entigen group 754 and the identified entigens of the knowledge database 740.

The identifying of entigens in common and entigen relationships in common is carried out to find a best matching entigen group of the knowledge database 740 to the query entigen group 754. For example, the answer resolution module 306 produces the initial entigen group 760 to include the alligator entigen and the Humboldt Park entigen since they are included in the existing entigens 756.

The existing entigen 756 typically includes further entigens associated with the entigens in common. For example, a conflicting entigen indicating that the alligator is free is included in the knowledge database 740 along with a characteristic entigen indicating a time at which the alligator was free. Subsequent information to that time indicating that the alligator is not free is desired to satisfy the query request. It is noted that the not free entigen is temporarily missing from the knowledge database 740 in this example which is further discussed with reference to FIG. 11B.

FIG. 11B further illustrates the example of the method of the processing of the query request where the answer resolution module 306 determines whether the initial entigen group 760 provides a reliable response to the query 744. A first root cause is associated with the knowledge database 740 including an entigen that conflicts with the query entigen group 754. For instance, the not free entigen conflicts with the free entigen. A second root cause is associated with the knowledge database 740 missing an entigen as compared to the query entigen group 754. For instance, the knowledge database 740 does not include the not free entigen of the query entigen group 754.

The determining of whether the initial entigen group 760 provides the reliable response to the query 744 includes a series of steps. In a first step, the answer resolution module 306 determines a number of query entigens of the query entigen group 754. For instance, the answer resolution module 306 indicates that the query entigen group 754 includes four entigens (e.g., Humboldt Park, alligator, not free, time).

A second step includes the answer resolution module 306 determining a number of entigens of the initial entigen group 760. For instance, the answer resolution module 306 indicates that the initial entigen group 760 includes two entigens (e.g., Humboldt Park and alligator).

A third step includes the answer resolution module 306 indicating that the initial entigen group 760 does not provide the reliable response to the query when the number of entigens of the initial entigen group is less than the number of query entigens of the query entigen group. For instance, the answer resolution module 306 indicates that the initial entigen group 760 does not provide the reliable response to the query when the initial entigen group 760 includes the two entigens and the query entigen group 754 includes the four entigens (e.g., two fewer entigens).

When the initial entigen group does not provide a reliable response to the query, the answer resolution module 306 determines a desired entigen 762 to add to the initial entigen group 760 to produce an updated entigen group 774 that leads to the reliable response to the query. The determining of the desired entigen 762 includes obtaining the query entigen group 754 based on the words of the query and identifying a non-corresponding query entigen of query entigen group 754 as the desired entigen 762, where the non-corresponding query entigen does not correspond to any of the entigens of the initial entigen group 760. For instance, the answer resolution module 306 determines the desired entigen 762 to include the not free entigen (e.g., since it is missing from the initial entigen group 760 and is included in the query entigen group 754).

Having determined the desired entigen 762, the answer resolution module 306 creates the desired entigen 762 based on obtained targeted data. The creating of the desired entigen 762 includes a series of steps. A first step includes generating a data query 764 based on the desired entigen 762 and the initial entigen group 760. For example, the data query 764 is generated to pertain to the alligator being not free. Numerous words are associated with the alligator being not free. For instance, trapped, captured, caged, killed, etc.

A second step includes querying one or more data sources (e.g., including the data source 742) based on the data query 764 to obtain the targeted data. For example, the answer resolution module 306 identifies the data source 742 as a data source that likely contains content associated with the data query 764 (e.g., newsfeeds or social media reporting capture of the alligator). Having identified the data source 742, the answer resolution module 306 sends the data query 764 to the data source 742.

A third step includes the content ingestion module 300 receiving a data response 766 in response to the data query 764. For example, the content ingestion module 300 and parses words of the data response 766 to produce data response word 768 including "the Humboldt Park Lagoon alligator was captured at 1:30 AM July 16."

A fourth step includes the element identification module 302 processing each word of the data response words 768 to identify a set of identigens from identigen information 748 from the knowledge database 740 to produce a plurality of sets of data response identigens 770. A fifth step includes the interpretation module 304 interpreting the sets of data response identigens 770 in accordance with the language rules 752 of the knowledge database 740 to produce a data response entigen group 772. For example, the interpretation module 304 generates the data response entigen group 772 to include a Humboldt Park entigen, an alligator entigen, a net free entigen, and a time entigen (e.g., July 16 1:30 AM).

A sixth step includes the answer resolution module 306 generating the desired entigen 762 based on the data response 766. For example, the answer resolution module 306 verifies that the not free entigen of the data response entigen group 772 corresponds to the desired entigen 762 (e.g., not free) identified based on the initial entigen group 760.

Having generated the desired entigen 762, the answer resolution module 306 adds the desired entigen 762 to the initial entigen group 760 to produce the updated entigen group 774. For example, the updated entigen group 774 includes the Humboldt Park entigen, the alligator entigen, the not free entigen, and the time entigen.

Having produced the updated entigen group 774, the answer resolution module 306 determines whether the updated entigen group 774 provides the reliable response to the query. The determining whether the updated entigen group 774 provides the reliable response includes a series of steps. A first step includes determining the number of query entigens of the query entigen group 754. For instance, the answer resolution module 306 determines that the query entigen group 754 includes four entigens.

A second step includes determining a number of entigens of the updated entigen group 774. For instance, the answer resolution module 306 determines that the updated entigen group 774 includes four entigens.

A third step includes indicating that the updated entigen group 774 provides the reliable response to the query when the number of entigens of the updated entigen group is substantially the same as the number of query entigens of the query entigen group. For instance, the answer resolution module 306 indicates that the updated entigen group 774 provides the reliable response to the query when each include the same four entigens.

When the updated entigen group 774 provides the reliable response to the query, the answer resolution module 306 outputs the reliable response. For instance, the answer resolution module 306 indicates that the Humboldt Park alligator was captured July 16 at 1:30 AM. Alternatively, or in addition to, the answer resolution module facilitates storage of the updated entigen group 774 in the knowledge database 740. For instance, the not free and time entigens are added to the knowledge database 740, where the not free entigen is associated with the alligator entigen and the time entigen is associated with the not free entigen.

The method described above in conjunction with the content ingestion module 300, the element identification module 302, the interpretation module 304, and the answer resolution module 306 can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices of the computing system 10, cause the one or more computing devices to perform any or all of the method described above.

Figure 12A:
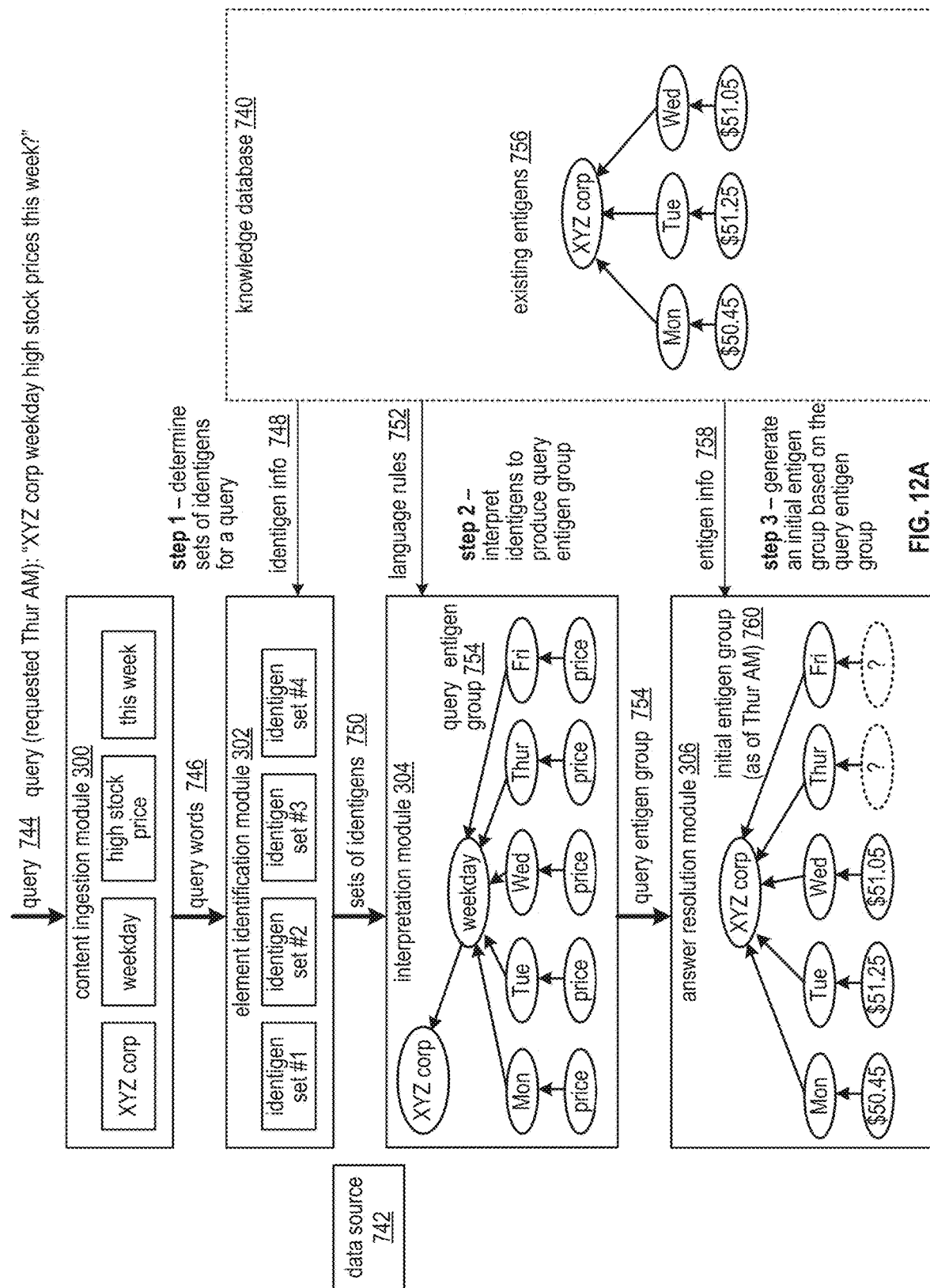
FIGS. 12A-12B are schematic block diagrams of another embodiment of a computing system illustrating an embodiment of a method for providing a timely response to a query request in accordance with the present invention.
Figure 12B:
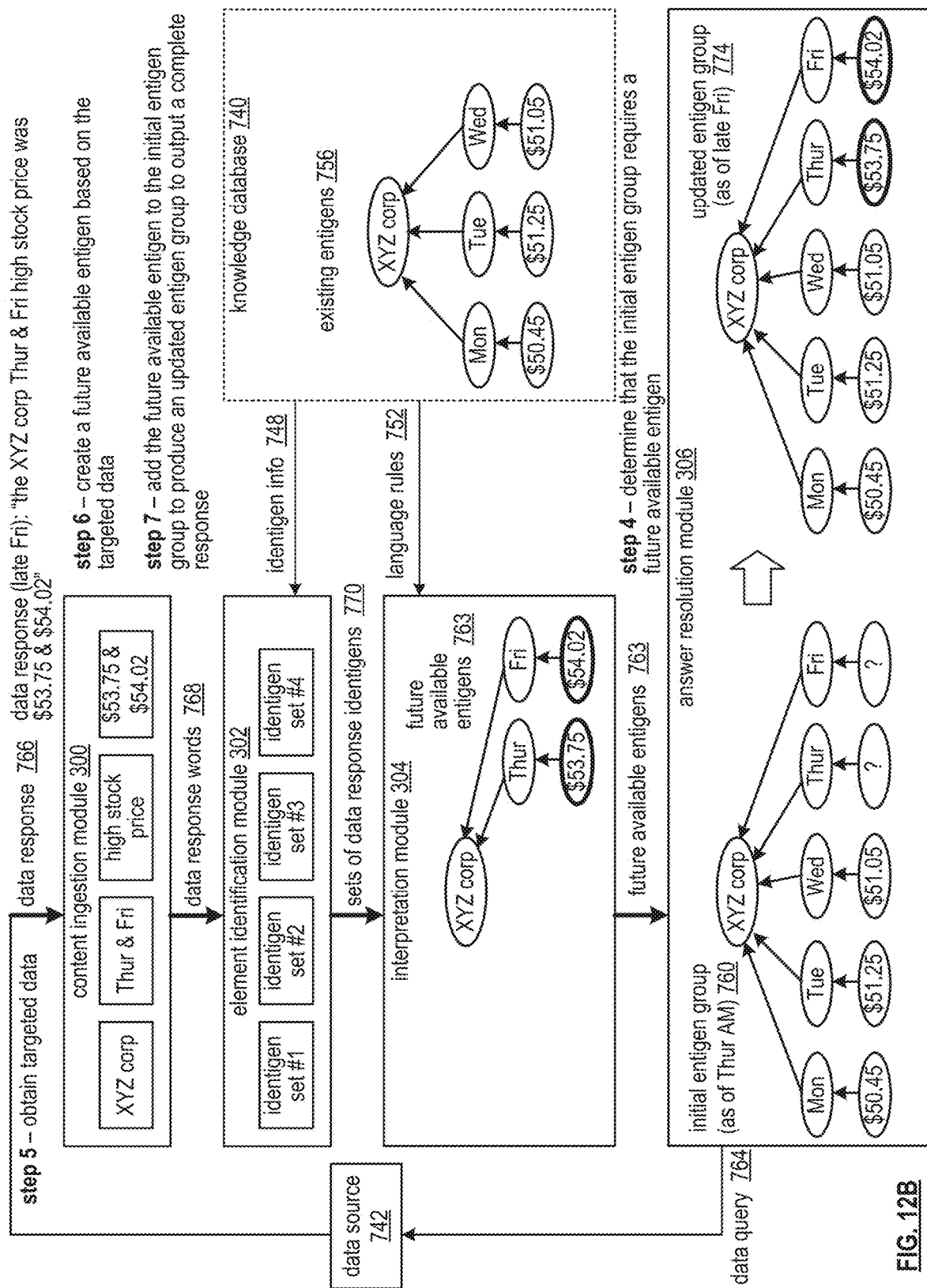

FIGS. 12A-12B are schematic block diagrams of another embodiment of a computing system illustrating an embodiment of a method for providing a timely response to a query request. The computing system includes the content ingestion module 300 of FIG. 5E, the element identification module 302 of FIG. 5E, the interpretation module 304 of FIG. 5E, the answer resolution module 306 of FIG. 5E, a knowledge database 740, and a data source 742. In an embodiment, the knowledge database 740 is implemented utilizing the fact base 592 of FIG. 8A. In an embodiment, the data source 742 is implemented utilizing one or more of the content sources 16-1 through 16-N of FIG. 1.

FIG. 12A illustrates an example method of operation for providing the timely response to the query request where a first step includes the content ingestion module 300 receiving a query 744 and parsing the query to produce query words 746 that includes a plurality of words. For example, when the query received Thursday morning includes "XYZ Corp. weekday high stock prices this week?", the content ingestion module 300 produces the query words 746, which may include single words or word groups) to include "XYZ Corp.", "weekday", "high stock price", and "this week."

The first step of the example method of operation further includes the element identification module 302 determining a set of identigens for each query word of the query to produce a plurality of sets of identigens 750. A set of identigens of the plurality of sets of identigens represents one or more different meanings of a query word of the query. Each identigen of the set of identigens includes a meaning identifier, an instance identifier, and a time reference. Each meaning identifier associated with a particular set of identigens represents a different meaning of one or more different meanings of a corresponding query word of the query 744. Each time reference provides time information when a corresponding different meaning of the one or more different meanings is valid.

As an example of producing the plurality of sets of identigens, the element identification module 302 accesses the knowledge database 740 utilizing the query words 746 to recover identigen information 748. The identigen information 748 includes, for each word, the set of associated identigens.

Having produced the plurality of sets of identigens 750, a second step of the example method of operation includes the interpretation module 304 interpreting, based on identigen pairing rules of the knowledge database 740, pairs of sequentially adjacent identigens of adjacent sets of identigens of the plurality of sets of identigens to determine a most likely meaning interpretation of the query and produce a query entigen group 754. The query entigen group represents the most likely meaning interpretation of the query 744.

Each entigen of the query entigen group 754 corresponds to a selected identigen of one of the plurality of sets of identigens having a selected meaning identifier of the one or more different meanings of a corresponding query word of the query words that represents a most likely meaning interpretation of the corresponding query word. Each selected identigen corresponding to the query entigen group favorably pairs with at least one corresponding sequentially adjacent identigen of an adjacent set of identigens in accordance with the identigen pairing rules. Each entigen of the query entigen group represents a single conceivable and perceivable thing in space and time that is independent of language and corresponds to a time reference of a corresponding selected identigen associated with the query entigen group. The knowledge database 740 includes a plurality of records that link entigens having a connected meaning.

Each entigen represents one of an object, a characteristic, and an action. For example, the interpretation module 304 accesses the knowledge database 740 to recover language rules 752 that includes the identigen pairing rules and generates the query entigen group 754 to include an object entigen for the thing XYZ Corp. a characteristic of weekday, and characteristics of the weekdays Monday through Friday and the characteristic of stock prices for each of the weekdays.

The query entigen group 754 further includes relationships between entigens including describes, acts on, is a, belongs to, did, did too, etc. For example, query entigen group 754 further includes a relationship between the XYZ Corp. entigen and the weekday entigen, a relationship between the weekday entigen and each of the Monday through Friday entigens, and a relationship between each of the weekday entigens and a corresponding price entigen.

Having received the query entigen group 754, a third step of the example method of operation includes the answer resolution module 306 identifying a group of entigens of existing entigens of the knowledge database 740 that compare favorably to the query entigen group to produce an initial entigen group 760. A first entigen of the initial entigen group is substantially the same as a first query entigen of the query entigen group 754. A second entigen of the initial entigen group is substantially the same as a second query entigen of the query entigen group. A first entigen relationship between the first and second query entigens of the query entigen group is substantially the same as a second entigen relationship between the first and second entigens of the initial entigen group.

The identifying the group of entigens of the existing entigens of the knowledge database that compare favorably to the query entigen group to produce the initial entigen group includes searching the knowledge database to identify the existing entigens that match the query entigens of the query entigen group to produce candidate entigens. For example, the answer resolution module 306 receives entigen information 758 from the knowledge database 740 that includes existing entigens 756 that substantially match a portion of the entigens of the initial entigen group 760 (e.g., stock prices for Monday through Wednesday since they are known as of Thursday morning).

The producing of the initial entigen group further includes the answer resolution module 306 selecting candidate entigens that have relationships between the candidate entigens that match relationships between like query entigens of the query entigen group to produce the initial entigen group. For example, the answer resolution module 306 interprets the entigen information 758 to identified related entigen such as the Monday entigen and the Monday stock price entigen etc.

In an alternative embodiment, the answer resolution module 306 provides an incomplete response by determining an availability timeframe for the future available entigens based on the initial entigen group (e.g., an unknown Friday stock price is required and an unknown Thursday stock prices required). Having determined the availability timeframe to be Friday afternoon, the answer resolution module 306 outputs the incomplete response when the availability timeframe is greater than a maximum response wait time. The incomplete response includes the initial entigen group. For instance, the answer resolution module 306 prepares the response when the maximum response wait time is 6 hours, it is currently Thursday morning, and the availability timeframe is 24 hours. As an example of pairing the incomplete response, the answer resolution module 306 utilizes the initial entigen group 760 to produce words of a phrase: "XYZ Corp. weekday high stock prices include $50.45 for Monday, $51.25 for Tuesday, and $51.05 for Wednesday."

FIG. 12B further illustrates the example method of operation for providing the timely response to the query request where a fourth step includes the answer resolution module 306 determining whether the initial entigen group 760 requires one or more future available entigens to provide a complete response to the query. The determining whether the initial entigen group requires the one or more future available entigens to provide the complete response to the query includes a series of sub-steps. A first sub-step includes comparing the initial entigen group to the query entigen group to identify one or more required entigen positions of the initial entigen group. The one or more required entigen positions are inferred by the query entigen group but not included in the initial entigen group. For example, the answer resolution module 306 identifies missing stock prices for Thursday and Friday as the one or more required entigen positions.

A second sub-step includes determining a time reference for at least some of the one or more required entigen positions based on the query entigen group. For example, the answer resolution module 306 determines Thursday afternoon for the Thursday stock price required entigen position and determines Friday afternoon for the Friday stock price required entigen position.

A third sub-step includes indicating that the initial entigen group requires the one or more future available entigens to provide the complete response to the query when the time reference is associated with a future timeframe. For example, the answer resolution module 306 indicates that the one or more future available entigens (e.g., for the Thursday and Friday stock prices) to provide the complete response to the query when the Friday time reference is associated with the future timeframe (e.g., tomorrow).

When the initial entigen group requires the one or more future available entigens to provide the complete response to the query, a fifth step of the example method of operation includes creating the one or more future available entigens based on obtained targeted data. The creating the one or more future available entigens based on the obtained targeted data includes a series of sub-steps. A first sub-step includes the answer resolution module 306 generating a data query 764 based on the one or more future available entigens and the initial entigen group. For example, the answer resolution module 306 generates the data query 764 to request Thursday and Friday stock prices.

A second sub-step includes the answer resolution module 306 determining a timeframe for the data query based on the initial entigen group. For example, the answer resolution module 306 determines the time frame for the data query to be Friday afternoon based on the requirement for the Friday stock price entigen.

A third sub-step includes the answer resolution module 306 querying one or more data sources 742 within the timeframe utilizing the data query 764 to obtain the targeted data (e.g., a data response 766). For example, the answer resolution module 306 issues the data query 764 to the data source 742 associated with the stock prices on Friday afternoon to obtain both the Thursday and Friday stock prices.

Having obtained the targeted data, a sixth step of the example method of operation includes generating the one or more future available entigens based on the targeted data. For example, the content ingestion module 300 parses the data response 766 to produce data response words 768 (e.g., the Thursday stock price of $53.75 in the Friday stock price of $54.02). Having produced the data response words 768, the element identification module 302 receives identigen information 748 from the knowledge database 740 based on the data response words 768 to produce sets of data response identigens 770. The interpretation module 304 utilizes the identigen pairing rules of the language rules 752 from the knowledge database 740 to select an identigen from each set of identigens of the sets of data response identigens 770 to produce future available entigens 763. For example, the interpretation module 304 generates the future available entigens 763 to include a $53.75 stock price entigen for Thursday and a $54.02 stock price entigen for Friday.

Having produced the future available entigens 763, a seventh step of the example method of operation includes the answer resolution module 306 adding the one or more future available entigens 763 to the initial entigen group 760 to produce an updated entigen group 774. The adding the one or more future available entigens to the initial entigen group to produce the updated entigen group includes a series of sub-steps. A first sub-step includes comparing the initial entigen group to the query entigen group to identify a first required entigen position of the initial entigen group. The first required entigen position is inferred by the query entigen group but not included in the initial entigen group. For example, the answer resolution module 306 identifies the Thursday stock price entigen as the first required entigen position. As another example, the answer resolution module 306 identifies the Friday stock price entigen as the first required entigen position.

A second sub-step includes identifying a first future available entigen of the one or more future available entigens that corresponds to the first required entigen position. For example, the answer resolution module 306 identifies the Thursday stock price entigen of the future available entigens 763. As another example, the answer resolution module 306 identifies the Friday stock price entigen of the future available entigens 763.

A third sub-step includes linking the first future available entigen to the initial entigen group to produce the updated entigen group. For example, the answer resolution module 306 links the Thursday stock price entigen to the Thursday entigen of the updated entigen group 774. As another example, the answer resolution module 306 links the Friday stock price entigen to the Friday entigen of the updated entigen group 774.

Having produced the updated entigen group 774, the example of operation further includes the answer resolution module 306 outputting the complete response based on the updated entigen group. The outputting includes generating the complete response based on the updated entigen group. For example, the answer resolution module 306 generates a phrase: "XYZ Corp. weekday high stock prices include $50.45 for Monday, $51.25 for Tuesday, $51.05 for Wednesday, $53.75 for Thursday, and $54.02 for Friday." The outputting further includes one or more of sending the complete response to another computing entity and storing the updated entigen group 774 in the knowledge database 740.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of one or more computing devices (e.g., one or more servers, one or more user devices) of the computing system 10, cause the one or more computing devices to perform any or all of the method steps described above.

Figure 13A:
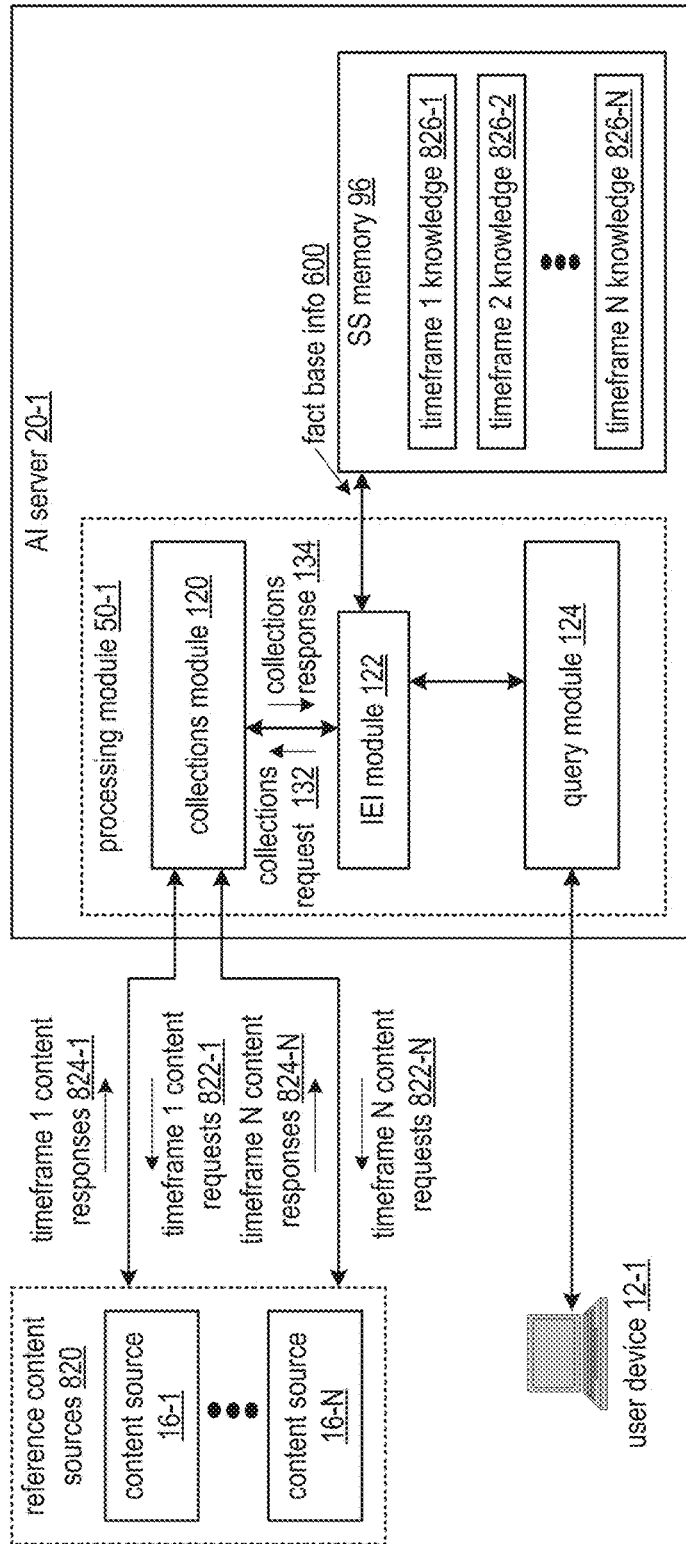
FIG. 13A is a schematic block diagram of another embodiment of a computing system in accordance with the present invention.

FIG. 13A is a schematic block diagram of another embodiment of a computing system that includes reference content sources 820, the AI server 20-1 of FIG. 1, and the user device 12-1 of FIG. 1. The reference content sources 820 include the content sources 16-1 through 16-N of FIG. 1 and provides content generated, or retrieved, in response to one or more time frame content requests 822 of time frame 1-N content requests 822-1 through 822-N in accordance with a time frame content response generating approach. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of the invention presents solutions where the computing system supports updating knowledge analysis rules.

In an example of operation of the updating of the knowledge analysis rules, the IEI module 122, for each of a plurality of time frames, facilitates capturing reference content associated with the timeframe. The reference content includes content that may represent similar knowledge over time but in a different way (e.g., including a natural evolution of the human use of same words). Example sources include rolling change of descriptive words found in any of the newsfeeds, emails, and a real-time data, financial records, travel records, asset utilization records, etc.

The facilitating includes determining (e.g., retrieve, generate, update, a reference content collection plan (e.g., to include: type of content, content sources, timing aspects, etc.), causing issuing of a timeframe content request 822 of time frames 1-N content requests the 822-1 through 822-N to a selected content source of the reference content sources 820. The causing includes issuing a collections request 132 to the collections module 120, where the collections module 120 includes at least a portion of the reference content collection plan.

The collections module 120 issues the timeframe content request, and where the collections module 120 issues a collections response 134 to the IEI module 122, where the collections response 134 includes the captured reference content. The collections module 120 generates the collections response 134 based on at least one received timeframe content response 824 of timeframes 1-N content responses 824-1 through 824-N.

Having captured the reference content, for each of the plurality of time frames, the IEI module 122 analyzes the reference content utilizing content analysis rules to produce timeframe knowledge. The content analysis rules include rules associated with matching ingested words of the phrase of the content to groups of identigens, identifying a plurality of permutations of the groups of identigens, reducing the number of permutations to produce at least one potentially valid set of entigens for the phrase, and representing the knowledge based on the at least one potentially valid set of entigens. The analyzing includes IEI processing the reference content utilizing the content analysis rules to produce the timeframe knowledge, storing the timeframe knowledge of timeframe knowledge 826-1 through 826-N as fact base information 600 and the SS memory 96. The IEI module 122 may further store the reference content and affiliate the reference content with a timeframe knowledge to enable subsequent analysis of the reference content utilizing the updated content analysis rules to produce updated time frame knowledge (e.g., improved knowledge).

For at least one of the plurality of time frames, the IEI module 122 determines to modify the content analysis rules to produce updated content analysis rules based on timeframe knowledge for two or more time frames. The determining includes, for the two or more time frames, generating a knowledge interpretation trending vector and indicating to modify the content analysis rules when the knowledge interpretation trending vector compares unfavorably (e.g., greater than) with a maximum knowledge interpretation trending threshold level. The generating includes comparing the knowledge of each of the two or more time frames to each other to produce a knowledge consistency indicator, converting each of the consistency indicators into the knowledge interpretation trending vector to indicate a scaler magnitude rate of change over the time frames.

When modifying the content analysis rules, the IEI module 122 updates the content analysis rules to produce the updated content analysis rules in accordance with a favorable knowledge aspect. The favorable knowledge aspect includes one or more of improved factuality, easier to understand, based on newer norms of utilization of the language of the content, etc. The updating includes one or more of modifying connections between permutations of groups of identigens to better corresponding entigens, adding new identigens for new forms of words as language morphs over time, and generating a new entigen to avoid misconceptions. The process may further include reverting back to re-analyze content associated with one or more previous time frames to generate updated time frame knowledge (e.g., that has a more favorable true knowledge aspect).

Figure 13B:
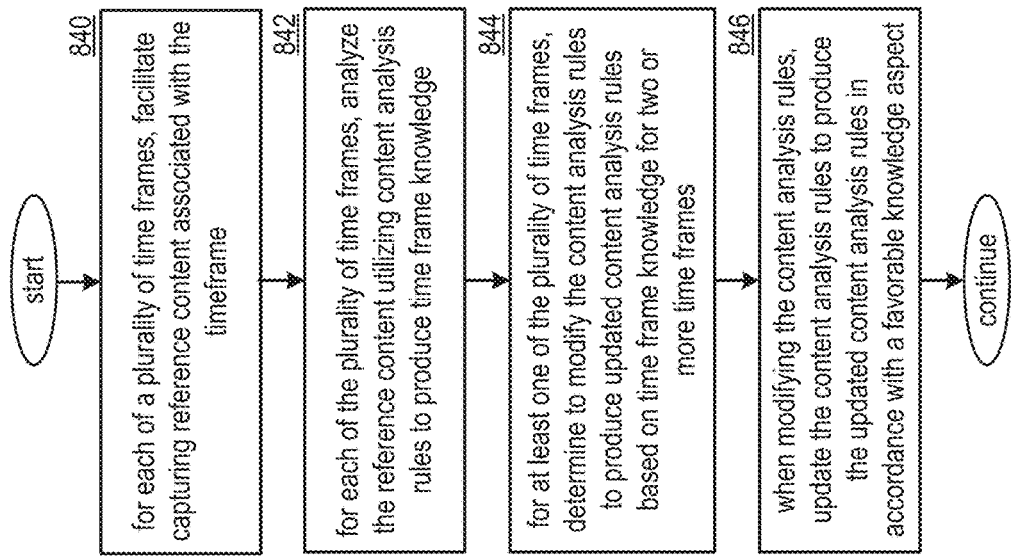
FIG. 13B is a logic diagram of an embodiment of a method for updating knowledge analysis rules within a computing system in accordance with the present invention.

FIG. 13B is a logic diagram of an embodiment of a method for updating knowledge analysis rules within a computing system. In particular, a method is presented for use in conjunction with one or more functions and features described in conjunction with FIGS. 1-8D, 13A, and also FIG. 13B. The method includes step 840 where a processing module of one or more processing modules of one or more computing devices of the computing system, for each of a plurality of time frames, facilitates capturing reference content associated with the timeframe. The facilitating includes determining (e.g., retrieve, generate, update), a reference content collection plan and causing issuing of a timeframe content request to a selected content source of reference content sources, where the causing includes receiving the reference content associated with the timeframe.

For each of the plurality of time frames, the method continues at step 842 where the processing module analyzes the reference content utilizing content analysis rules to produce time frame knowledge. The analyzing includes IEI processing the reference content utilizing the content analysis rules to produce the timeframe knowledge and storing the timeframe knowledge of timeframe knowledge as fact base information in a memory. The analyzing may also include storing the reference content and affiliating the reference content with the timeframe knowledge to enable subsequent re-analysis of the reference content utilizing the updated content analysis rules to produce updated time frame knowledge (e.g., improved knowledge).

For at least one of the plurality of time frames, the method continues at step 844 where the processing module determines to modify the content analysis rules to produce updated content analysis rules based on timeframe knowledge for two or more time frames. The determining includes, for the two or more time frames, generating a knowledge interpretation trending vector and indicating to modify the content analysis rules when the knowledge interpretation trending vector compares unfavorably (e.g., greater than) with a maximum knowledge interpretation trending vector threshold level. The generating includes comparing the knowledge of each of the two or more time frames to each other to produce a knowledge consistency indicator and converting each of the consistency indicators into the knowledge interpretation trending vector to indicate a scaler magnitude rate of change over the time frames.

When modifying the content analysis rules, the method continues at step 846 where the processing module updates the content analysis rules to produce the updated content analysis rules in accordance with the favorable knowledge aspect. The updating includes one or more of modifying connections between permutations of groups of identigens to better corresponding entigens, adding new identigens for new forms of words as a language changes over time, and generating a new entigen to avoid misconceptions. The processing may further include reverting back to re-analyze content associated with one or more previous time frames to generate updated time frame knowledge (e.g., a better interpretation utilizing the updated content analysis rules).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth memory element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 14A:
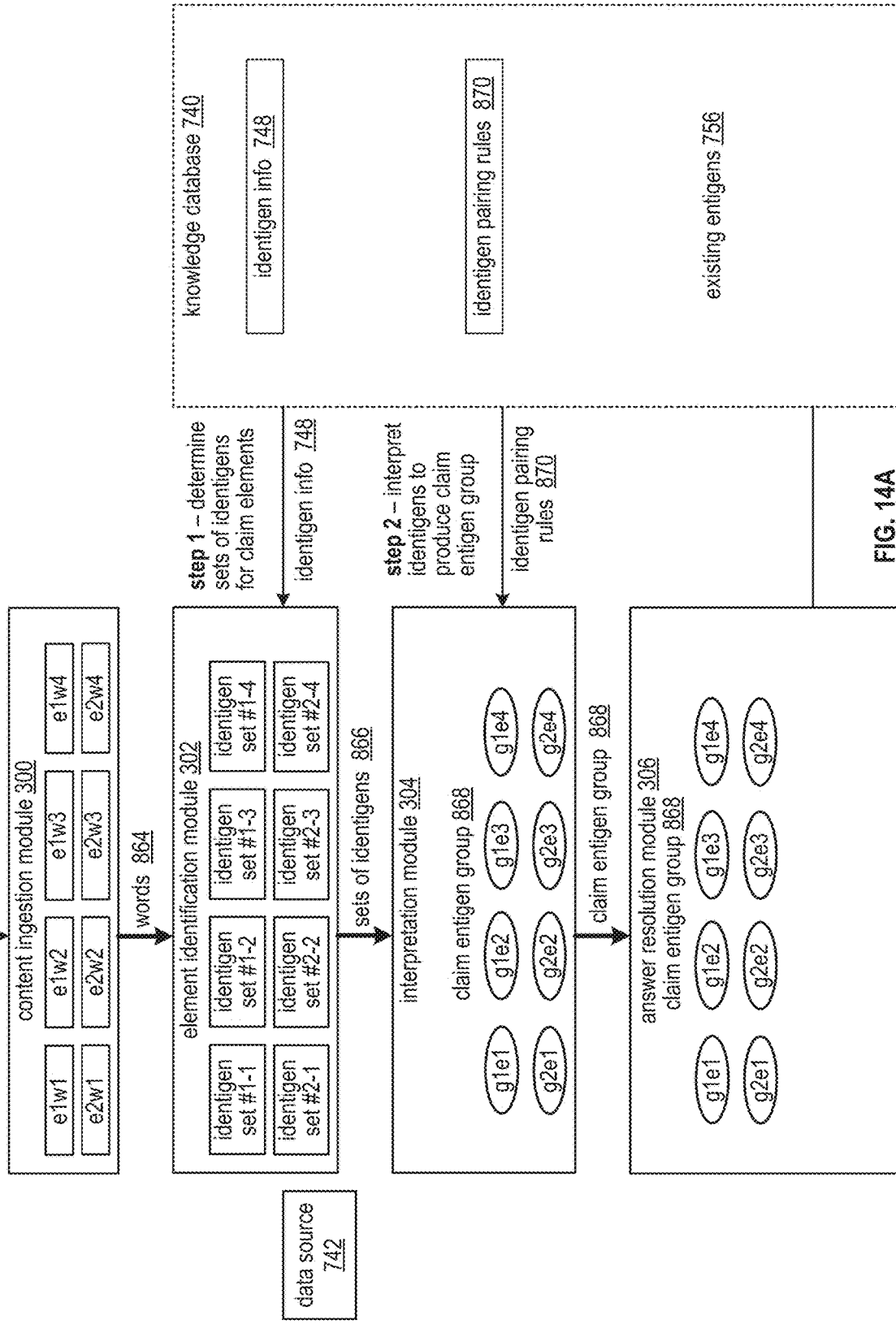
FIGS. 14A-14C are schematic block diagrams of an embodiment of a computing system illustrating an embodiment of a method for identifying utilization of intellectual property in accordance with the present invention.
Figure 14B:
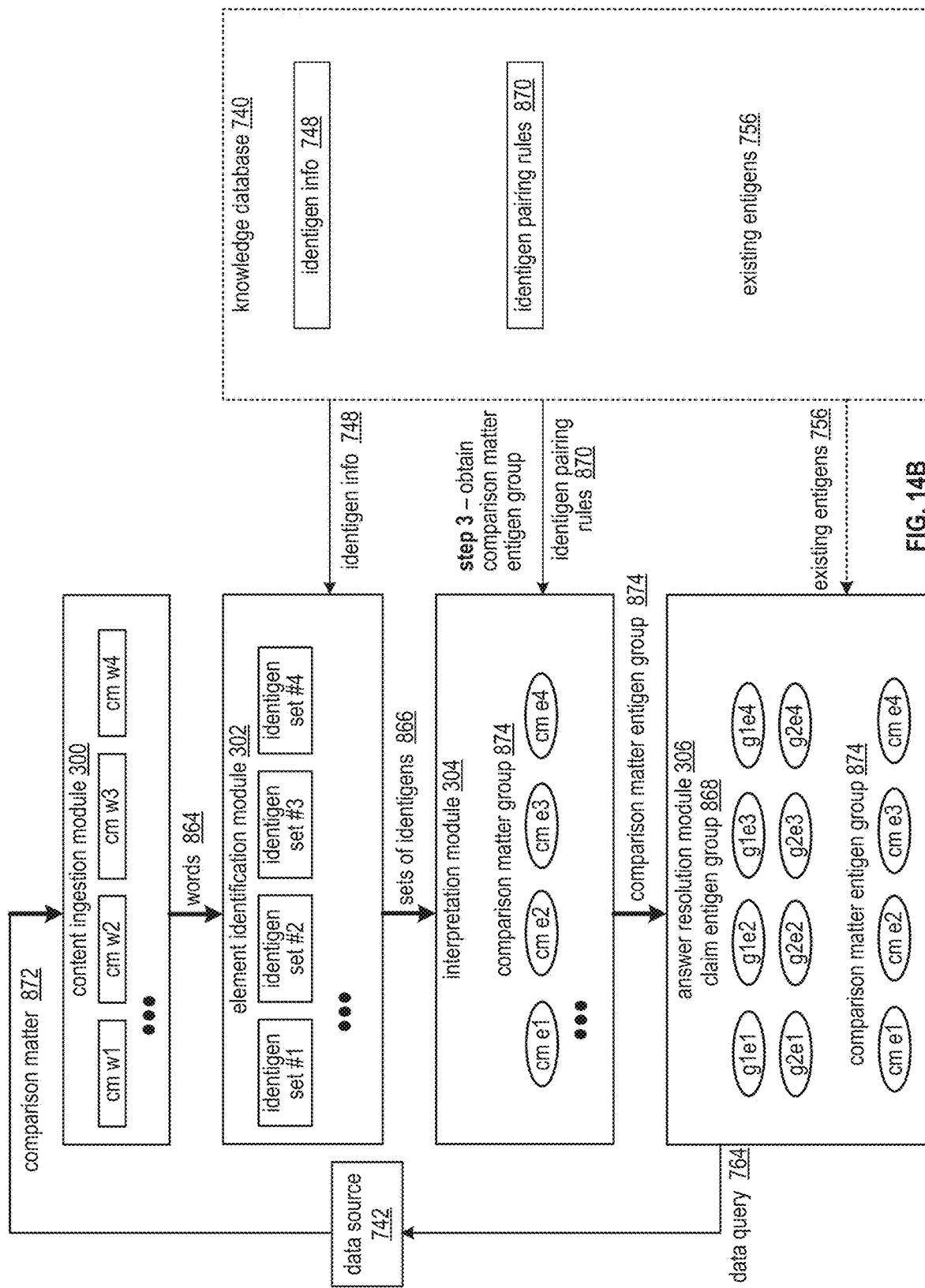
Figure 14C:
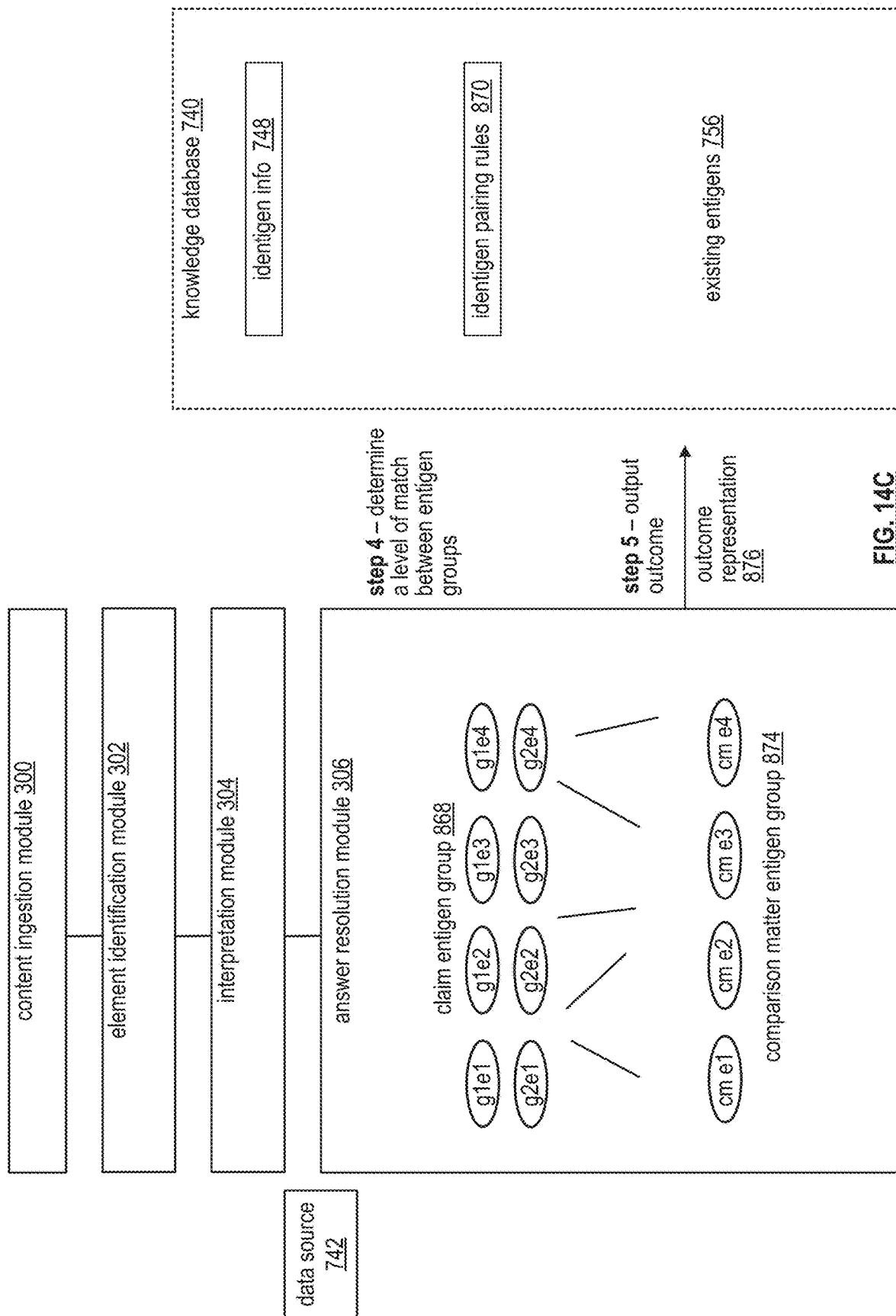

FIGS. 14A-14C are schematic block diagrams of an embodiment of a computing system illustrating an embodiment of a method for identifying utilization of intellectual property. The computing system includes the content ingestion module 300 of FIG. 5E, the element identification module 302 of FIG. 5E, the interpretation module 304 of FIG. 5E, the answer resolution module 306 of FIG. 5E, a knowledge database 740, and a data source 742. In an embodiment, the knowledge database 740 is implemented utilizing the fact base 592 of FIG. 8A. In an embodiment, the data source 742 is implemented utilizing one or more of the content sources 16-1 through 16-N of FIG. 1.

FIG. 14A illustrates an example method of operation for providing the timely response to the query request where the content ingestion module 300 receives a comparison request 862. The comparison request includes one or more of at least one claim (e.g., text and/or multimedia of an issued patent, a pending patent, a draft claim, etc.), comparison matter (e.g., a document, a sentence, a paragraph, an audio file, a video file, any multimedia, etc.), and a comparison matter entigen group (e.g., a group of entigens previously produced that represents a most likely meaning of the comparison matter). The claim typically includes 2 or more claim elements (e.g., limitations). In an embodiment, the comparison request further includes links for any of the claim, comparison matter, and comparison matter entigen group. In an embodiment, the claim, the comparison matter, and the comparison matter entigen group are represented in a common language. In another embodiment, the claim, the comparison matter, and the comparison matter entigen group are represented in two or more languages.

Having received the comparison request, the content ingestion module 300 parses the request to produce words 864. For example, when the claim includes two claim elements of four words each, the words 864 includes element 1 word 1, element 1 word 2, element 1 word 3, element 1 word 4, element 2 word 1, etc.

In a first step of the example method of operation, the element identification module 302 determines sets of identigens 866 for the claim elements. In particular, the step includes the element identification module 302 determining a set of identigens for each word of the first claim element of the claim to produce a plurality of first sets of identigens. A set of identigens of the plurality of first sets of identigens represents one or more different meanings of a word of the first claim element. Each identigen of the set of identigens includes a meaning identifier, an instance identifier, and a time reference. Each meaning identifier associated with a particular set of identigens represents a different meaning of one or more different meanings of a corresponding word of the first claim element. Each time reference provides time information when a corresponding different meaning of the one or more different meanings is valid.

The first step further includes the element identification module 302 determining a set of identigens for each word of a second claim element of the claim to produce a plurality of second sets of identigens. A set of identigens of the plurality of second sets of identigens represents one or more different meanings of a word of the second claim element. Each meaning identifier associated with a particular set of identigens represents a different meaning of one or more different meanings of a corresponding word of the second claim element.

As an example of producing the plurality of sets of identigens, the element identification module 302 accesses the knowledge database 740 utilizing the words 864 to recover identigen information 748. The identigen information 748 includes, for each word, the set of associated identigens. For instance, identigen set 1 for word 1 of claim element 1, identigen set 2 for word 2 of claim element 1, identigen set 3 for word 3 of claim element 1, identigen set 4 for word 4 of claim element 1, identigen set 1 for word 1 of claim element 2, etc.

Having produced the sets of identigens 866, a second step of the example method of operation includes the interpretation module 304 interpreting identigens to produce a claim entigen group 868 to include at least one entigen group. The interpreting of identigens includes interpreting the plurality of sets of identigens for each claim element. In particular, for the two claim element example, the second step includes the interpretation module 304 interpreting, based on identigen pairing rules 870 of the knowledge database 740, pairs of sequentially adjacent identigens of adjacent sets of identigens of the plurality of first sets of identigens to determine a most likely meaning interpretation of the first claim element and produce a first claim element entigen group.

The first claim element entigen group represents the most likely meaning interpretation of the first claim element. Each entigen of the first claim element entigen group corresponds to a selected identigen of one of the plurality of first sets of identigens having a selected meaning identifier of the one or more different meanings of a corresponding word of the first claim element words that represents a most likely meaning interpretation of the corresponding word. Each selected identigen corresponding to the first claim element entigen group favorably pairs with at least one corresponding sequentially adjacent identigen of an adjacent set of identigens in accordance with the identigen pairing rules 870. In an instance, the first claim element entigen group includes entigens 1-4 corresponding to words 1-4.

Each entigen of the first claim element entigen group represents a single conceivable and perceivable thing in space and time that is independent of language and corresponds to a time reference of a corresponding selected identigen associated with the first claim element entigen group. The knowledge database 740 includes a plurality of records that link entigens having a connected meaning.

In another embodiment, the second step further includes the interpretation module 304 interpreting, based on the identigen pairing rules 870 of the knowledge database 740 and the first claim element entigen group (e.g., different claim elements often utilize a common word that must mean the same thing), pairs of sequentially adjacent identigens of adjacent sets of identigens of the plurality of second sets of identigens to determine a most likely meaning interpretation of the second claim element and produce a second claim element entigen group. The second claim element entigen group represents the most likely meaning interpretation of the second claim element.

Each entigen of the second claim element entigen group corresponds to a selected identigen of one of the plurality of second sets of identigens having a selected meaning identifier of the one or more different meanings of a corresponding word of the second claim element words that represents a most likely meaning interpretation of the corresponding word. In an instance, the second claim element entigen group includes entigens 1-4 corresponding to words 1-4.

Each selected identigen corresponding to the second claim element entigen group favorably pairs with at least one corresponding sequentially adjacent identigen of an adjacent set of identigens in accordance with the identigen pairing rules. Each entigen of the second claim element entigen group represents a single conceivable and perceivable thing in space and time that is independent of language and corresponds to a time reference of a corresponding selected identigen associated with the second claim element entigen group.

FIG. 14B further illustrates the example method of operation where, having produced the claim entigen group 868 (e.g., which henceforth may only include the first claim element entigen group), a third step includes the answer resolution module 306 facilitating obtaining of the comparison matter entigen group 874. The comparison matter entigen group represents a most likely meaning interpretation of the corresponding comparison matter. The obtaining of the comparison matter entigen group includes a variety of approaches.

A first approach includes recovering the comparison matter entigen group from the knowledge database utilizing the claim entigen group. For instance, the answer resolution module 306 identifies existing entigens 756 from the knowledge database 740 by comparing entigens of the claim entigen group 868 to the existing entigen 756 produce the comparison matter entigen group 874 when the comparison is favorable (e.g., a substantial number of the entigens of the claim entigen group 868 match one for one the entigens of the comparison matter entigen group 874.

A second approach of the obtaining of the comparison matter entigen group includes a series of sub-steps. A first sub-step of the second approach includes obtaining the comparison matter from the data source 742, where the answer resolution module 306 issues a data query 764 to the data source 742. The data query 764 identifies a type of comparison matter desired based on the claim entigen group 868. The content ingestion module receives comparison matter 872 from the data source 742 in response to the data query 764.

A second sub-step of the second approach includes determining a set of identigens for each word of the comparison matter to produce a plurality of comparison matter sets of identigens. For example, the element identification module 302 utilizes comparison matter words 864 from the content ingestion module 300 to access identigen information 748 from the knowledge database 740 to produce the plurality of comparison matter sets of identigens 866.

A third sub-step of the second approach to the third step of the example method of operation includes the interpretation module 304 interpreting, based on the identigen pairing rules 870 of the knowledge database 740 and the claim entigen group 868, pairs of sequentially adjacent identigens of adjacent sets of identigens of the plurality of comparison matter sets of identigens to determine a most likely meaning interpretation of the comparison matter and produce the comparison matter entigen group 874.

FIG. 14C further illustrates the example method of operation where a fourth step includes the answer resolution module 306 determining a level of match between the claim entigen group 868 (e.g., the first claim element entigen group alone) and the comparison matter entigen group 874. The claim entigen group 868 includes the first claim element entigen group and may include the second claim element entigen group. The determining the level of match between the claim entigen group and the comparison matter entigen group includes a variety of approaches.

A first approach includes the answer resolution module 306 indicating that the level of match between the claim entigen group and the comparison matter entigen group is greater than the threshold level when each entigen of the first claim element entigen group matches a corresponding entigen of the comparison matter entigen group and, when utilized, each entigen of the second claim element entigen group matches a corresponding entigen of the comparison matter entigen group. A second approach includes the answer resolution module 306 indicating that the level of match between the claim entigen group and the comparison matter entigen group is greater than the threshold level when each entigen of the first claim element entigen group matches a corresponding entigen of the comparison matter entigen group.

A third approach includes the answer resolution module 306 indicating that the level of match between the claim entigen group and the comparison matter entigen group is less than the threshold level when at least one entigen of the first claim element entigen group or, when utilized, at least one entigen of the second claim element entigen group does not match at least one corresponding entigen of the comparison matter entigen group. A fourth approach includes the answer resolution module 306 indicating that the level of match between the claim entigen group and the comparison matter entigen group is less than the threshold level when at least one entigen of the first claim element entigen group does not match at least one corresponding entigen of the comparison matter entigen group.

When the level of match between the claim entigen group and the comparison matter entigen group is greater than a threshold level, a fifth step of the example method of operation includes the answer resolution module 306 performing at least one value-added function to output and outcome. A first value-added function includes the answer resolution module 306 indicating, via a user interface, potential utilization of the claim by the comparison matter when a priority level of the claim is greater than a priority level of the comparison matter. A second value-added function includes the answer resolution module 306 indicating, via the user interface, potential prior art status of the comparison matter when the priority level of the claim is less than the priority level of the comparison matter.

The fifth step further includes the answer resolution module 306 indicating that the priority level of the claim is greater than the priority level of the comparison matter when a priority date of the claim is chronologically before a date associated with the comparison matter. Alternatively, the fifth step further includes the answer resolution module 306 indicating that the priority level of the claim is less than the priority level of the comparison matter when the date associated with the comparison matter is chronologically before the priority date of the claim. The answer resolution module 306 outputs, via the user interface, an outcome representation 876 that includes a representation of one or more of the first claim element entigen group, the comparison matter entigen group, and the level of match between the claim entigen group and the comparison matter entigen group.

Alternatively, or in addition to, the answer resolution module 306, when the level of match between the claim entigen group and the comparison matter entigen group is greater than the threshold level, determines a modification to the claim to affect the level of match when the priority level of the claim is less than the priority level of the comparison matter. For example, the answer resolution module 306 suggests an additional and/or alternative claim word that corresponds to a hypothetical claim entigen group that is not a match to the comparison matter entigen group.

Further alternatively, or in addition to, the answer resolution module 306, when the level of match between the first claim element entigen group and the comparison matter entigen group is less than the threshold level, indicates, via the user interface, that the comparison matter is unlikely to utilize the claim when the priority level of the claim is greater than the priority level of the comparison matter. In yet another alternative, the answer resolution module 306 indicates, via the user interface, that the comparison matter is unlikely to be considered as prior art to the claim when the priority level of the claim is less than the priority level of the comparison matter.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, a seventh memory element, an eighth memory element, etc.) that stores operational instructions can, when executed by one or more processing modules of one or more computing devices (e.g., one or more servers, one or more user devices) of the computing system 10, cause the one or more computing devices to perform any or all of the method steps described above.

Figure 15A:
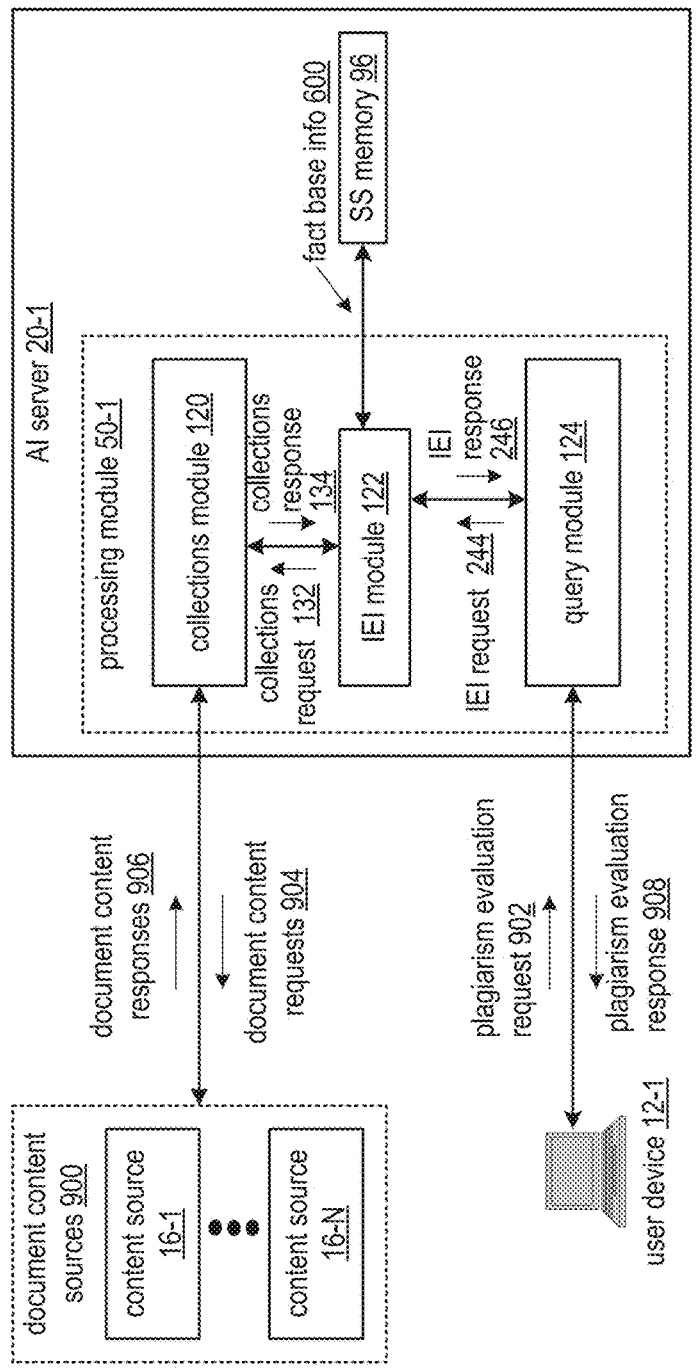
FIG. 15A is a schematic block diagram of another embodiment of a computing system in accordance with the present invention.

FIG. 15A is a schematic block diagram of another embodiment of a computing system that includes document sources 900, the AI server 20-1 of FIG. 1, and the user device 12-1 of FIG. 1. The document sources 900 include the content sources 16-1 through 16-N of FIG. 1 and provides content generated, or retrieved, in response to one or more document content request 904 in accordance with a document content response generating approach. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of the invention presents solutions where the computing system 10 supports analyzing authorship.

In an example of operation of the analyzing of the authorship, the IEI module 122 determines to analyze a subject document to enable a plagiarism assessment. The determining includes interpreting an IEI request 244 from the query module 124, where the query module 124 receives a plagiarism evaluation request 902 from the user device 12-1 and generates the IEI request 244 based on the plagiarism evaluation request 902. The plagiarism evaluation request 902 includes subject document information (e.g., draft document, topic area, one or more subtopics, potential sources for similar documents, etc.).

Having determined to analyze the subject document, the IEI module 122 IEI processes at least a portion of the subject document to produce a subject document interpretation (e.g., a true meaning of a portion of the document) based on a document knowledge base. The IEI processing includes matching ingested words of each phrase of the portion of the document to groups of identigens, identifying a plurality of permutations of the groups of identigens, and reducing the number of permutations to produce at least one potentially valid set of entigens for the phrase based on rules. The IEI processing further incudes representing a true meaning of each phrase based on the at least one potentially valid set of entigens and repeating the process for each phrase of the document to produce the subject document interpretation.

Having produced the subject document interpretation, the IEI module 122 facilitates collection of document content (e.g., content of documents for similar topics, including examples such as papers, books, online articles, blogs, software, any content that may be copyrighted, etc.) associated with the subject document. The facilitating includes causing a plurality of document content collection cycles, where each cycle includes the IEI module 122 issuing a collections request 132 to the collections module 120. The request is based on the subject document interpretation and the subject document information.

The collections module 120 facilitates one or more document content collection cycles, where each cycle includes issuing one or more document content requests 904 to one or more corresponding content sources 16-1 through 16-N of the document content sources 900 to cause receiving of document content responses 906. One or more of the content sources generates content of the document content responses 906 based on locally prestored content and/or a document content response generating approach. The collections module 120 issues a collections response 134 to the IEI module 122 when document content has been collected in accordance with one or more of a sufficient number of subtopics of the subject document have been explored, a number of content sources have been queried, a sufficient volume of incremental content has been collected, one or more mandatory content sources have provided incremental content, etc.

Having selected the document content, the IEI module 122 IEI processes the document content to produce a composite document interpretation. For example, the IEI module 122 IEI processes the document content of the collections response 134 to produce incremental knowledge (e.g., truest meaning of the documents) for storage as fact base information 600 and the SS memory 96.

Having produced the composite document interpretation, the IEI module 122 generates the plagiarism assessment based on the subject document interpretation and the composite document interpretation. The issuing includes comparing the incremental knowledge of the composite document interpretation to knowledge of the subject document interpretation to produce a valid comparison, generating the plagiarism assessment based on the knowledge comparison (e.g., percentage same, percentage different, official number of portions of the subject document compare favorably to portions of one or more of the documents,) and sending, in accordance with the plagiarism evaluation request 902, an IEI response 246 to the query module 124.

The IEI module 122 generates the IEI response 246 to include a response to the plagiarism evaluation request 902 based on the plagiarism assessment. The query module 124 issues a plagiarism evaluation response 908 to the user device 12-1. The query module 124 generates the plagiarism evaluation response 908 to include at least some of the IEI response 246.

Figure 15B:
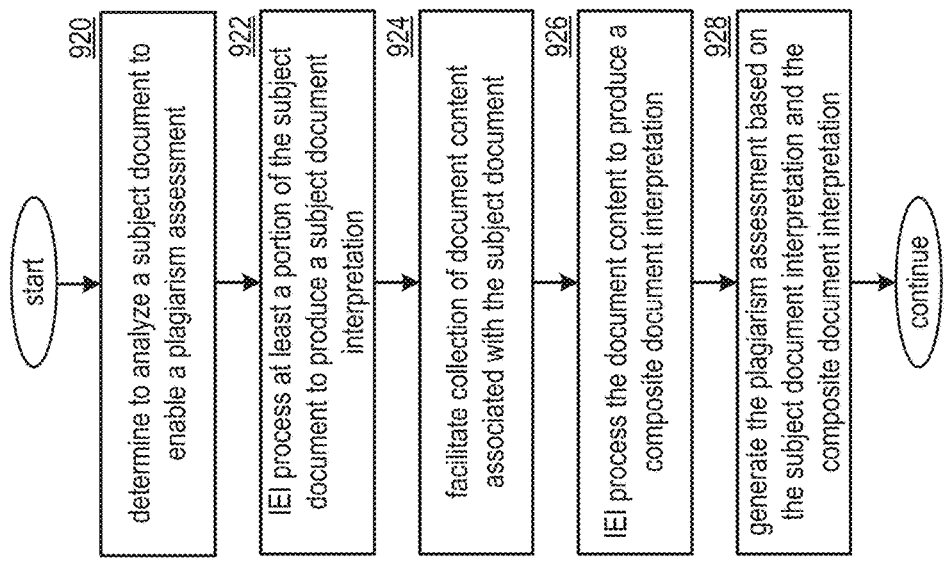
FIG. 15B is a logic diagram of an embodiment of a method for analyzing authorship within a computing system in accordance with the present invention.

FIG. 15B is a logic diagram of an embodiment of a method for analyzing authorship within a computing system. In particular, a method is presented for use in conjunction with one or more functions and features described in conjunction with FIGS. 1-8D, 15, and also FIG. 15. The method includes step 920 where a processing module of one or more processing modules of one or more computing devices of the computing system determines to analyze a subject document to enable a plagiarism assessment. The determining includes interpreting a plagiarism evaluation request from a requesting entity and obtaining subject document information (e.g., from the requesting entity).

The method continues at step 922 where the processing module IEI processes at least a portion of the subject document to produce a subject document interpretation. For example, the processing module, based on a document, matches ingested words of each phrase of a portion of the document to groups of identigens, identifies a plurality of permutations of the groups of identigens, reduces the number of permutations to produce at least one potentially valid set of entigens for the phrase in accordance with rules, and represents a truest meaning of each phrase based on the at least one potentially valid set of entigens, and aggregates representations of truest meanings of a plurality of phrases of the document to produce the subject document interpretation.

The method continues at step 924 where the processing module facilitates collection of document content associated with the subject document. The facilitating includes causing a plurality of document content collection cycles, where each cycle includes issuing one or more document content requests to one or more content sources to cause receiving of document content responses. Each document content request is based on the subject document interpretation and the subject document information, where one or more of the content sources generates content of the document content responses based on locally prestored content and/or a document content response generating approach.

The collection cycles end when favorable document content has been collected. Favorable collection includes a goal of a document content collection cycle has been met, a goal of a document content collection plan has been met, document content has been collected in accordance with any subtopics of the subject document, a number of content sources have been query, a sufficient volume of incremental content has been collected, one or more mandatory content sources have provided incremental content, etc.). The facilitating may further include storage of the document content within affiliated document identifier.

The method continues at step 926 where the processing module IEI processes the document content to produce a composite document interpretation. For example, the processing module utilizes a word-to-identigen-to-entigen approach in accordance with rules, processes the document content to produce incremental knowledge (e.g., a truest meaning of the documents) and stores the incremental knowledge along with an affiliated set of document identifiers.

The method continues at step 928 where the processing module generates the plagiarism assessment based on the subject document interpretation and the composite document interpretation. For example, the processing module compares the incremental knowledge of the composite document interpretation to knowledge of the subject document interpretation to produce a knowledge comparison, generates the plagiarism assessment based on the knowledge comparison (e.g., percentage same, percentage different, a threshold number of portions of the subject document compare favorably to portions of one or more of the documents), and sends, in accordance with the plagiarism evaluation request, a plagiarism evaluation response to the requesting entity. The plagiarism evaluation response includes at least a portion of the plagiarism assessment.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 16A:
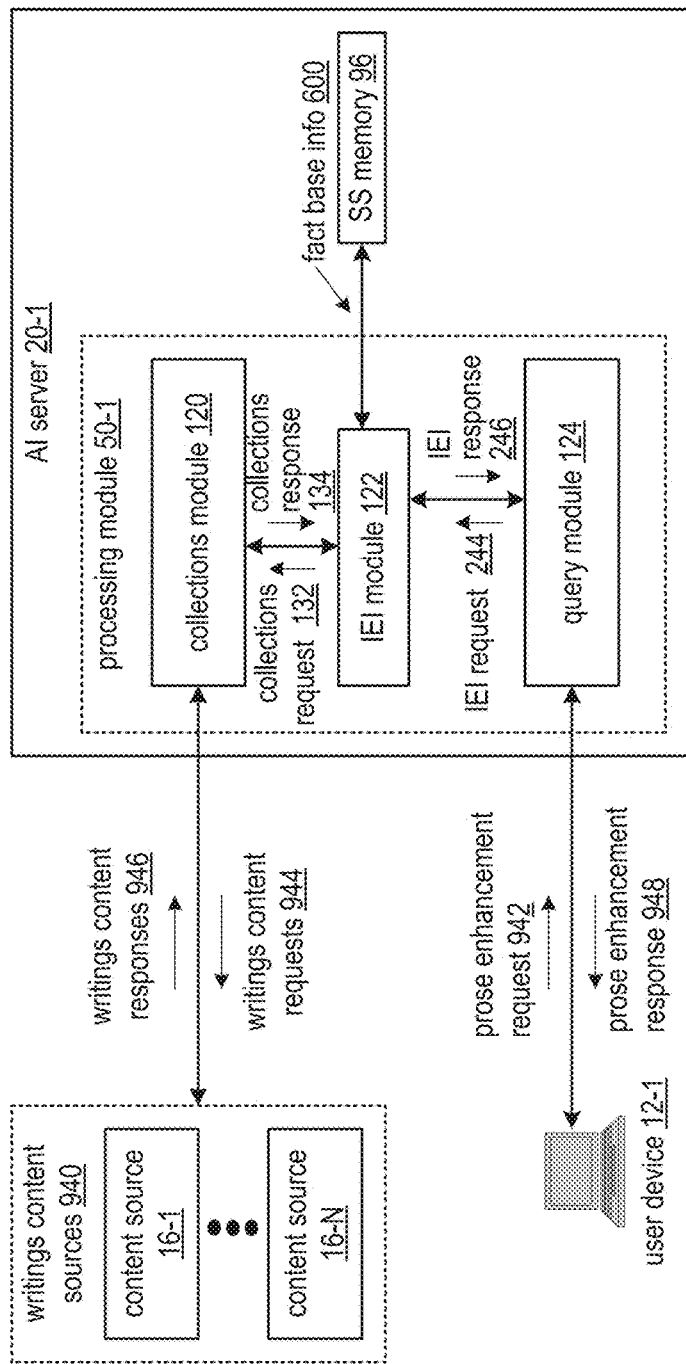
FIG. 16A is a schematic block diagram of another embodiment of a computing system in accordance with the present invention.

FIG. 16A is a schematic block diagram of another embodiment of a computing system that includes writings content sources 940, the AI server 20-1 of FIG. 1, and the user device 12-1 of FIG. 1. The writings content sources 940 include the content sources 16-1 through 16-N of FIG. 1 and provides content generated, or retrieved, in response to one or more writings content requests 944 in accordance with a writings content response generating approach. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of the invention presents solutions where the computing system 10 supports enhancing representation of knowledge.

In an example of operation of the enhancing of the representation of the knowledge, the IEI module 122 determines to analyze prose to enable subsequent generation of enhanced prose, where the enhanced prose facilitates a desired meaning communication. The determining includes interpreting an IEI request 244 from the query module 124, where the query module 124 receives a prose enhancement request 942 from the user device 12-1 and generates the IEI request 244 based on the prose enhancement request 942, where the prose enhancement requests 942 includes one or more of prose for enhancement, a source ID, recipient identifiers, recipient rules, a desired maximum word count, a context space identifier, etc.

Having determined to analyze the prose, the IEI module 122 determines whether a meaning ambiguity level associated with the prose is unfavorable. The determining includes IEI processing at least a portion of the prose based on a writings knowledge base to produce at least one meaning, and indicating that the meaning ambiguity level is unfavorable when producing two or more meanings. In particular, the IEI processing includes matching the ingested words of each phrase of the portion of the prose to groups of identigens of the fact base information 600 from the SS memory 96, identifying a plurality of permutations of groups of identigens in accordance with rules, reducing the number of permutations to produce at least one potentially valid set of entigens for the phrase, representing the potential meaning of each phrase based on the at least one potentially valid set of entigens, and repeating for each phrase to roll up potential meaning of the prose.

When the meaning ambiguity level associated with the prose is unfavorable, the IEI module 122 facilitates collection of writings content associated with the prose. The writings content includes one or more of writings produced by one or more prose recipients, papers, books, online articles, blogs, multimedia transcripts, writings rules and writings guidance from the writings recipients, etc. The facilitating includes causing a plurality of writings content collection cycles, where each cycle includes the IEI module 122 issuing a collections request 132 to the collections module 120. The request is based on the potential meaning of the prose and the prose enhancement request. The collections module 120 facilitates one or more writings content collection cycles, where each cycle includes issuing one or more writings content requests 944 to one or more corresponding content sources 16-1 through 16-N of the writings content sources 940 to cause receiving of writings content responses 946. One or more of the content sources generates content of the writings content responses 946 based on locally prestored content and/or a writings content response generating approach.

The collections module 120 issues a collections response 134 to the IEI module 122 when favorable writings content has been collected. Favorable collections includes a goal of a writings content collection cycle has been met, a goal of a writings content collection plan has been met, writings content has been collected in accordance with any subtopics of the prose, a minimum number of content sources have been queried, a sufficient volume of incremental content has been collected, and one or more mandatory content sources have been queried.

Having selected the writings content, the IEI module 122 IEI processes the writings content to update the writings knowledge base. For example, the IEI a module 122 IEI processes the writings content of the collections response 134 to produce incremental knowledge (e.g., truest meaning of the example documents) that when combined with the writings knowledge base produces an updated writings knowledge base for storage as fact base information 600 and the SS memory 96. The processing may be in accordance with the rules and/or the guidance associated with the writings content.

Having updated the writings knowledge base, the IEI module 122 issues the enhanced prose based on the prose and the updated writings knowledge base. The issuing includes re-IEI processing the prose utilizing the updated writings knowledge base, including any rules from guidance of the writings content, to produce the desired meaning. The issuing further includes modifying the prose in accordance with the modification rules and based on the desired meaning to produce the enhanced prose and sending the enhanced prose to the user device 12-1.

The producing of the desired meaning they further include facilitating issuing a prose enhancement response 948 that includes a meaning selection request (e.g., to ask a user to select between two or more potential meetings when ambiguity still exist) and receiving of a prose enhancement request 942 that further includes a meaning selection. The sending of the enhanced prose includes sending an IEI response 246 to the query module 124, where the IEI module 122 generates the IEI response 246 to include the enhanced prose. The query module 124 issues a corresponding prose enhancement response 948 to the user device 12-1 where the query module 124 generates the prose enhancement response 948 to include at least some of the IEI response 246.

Figure 16B:
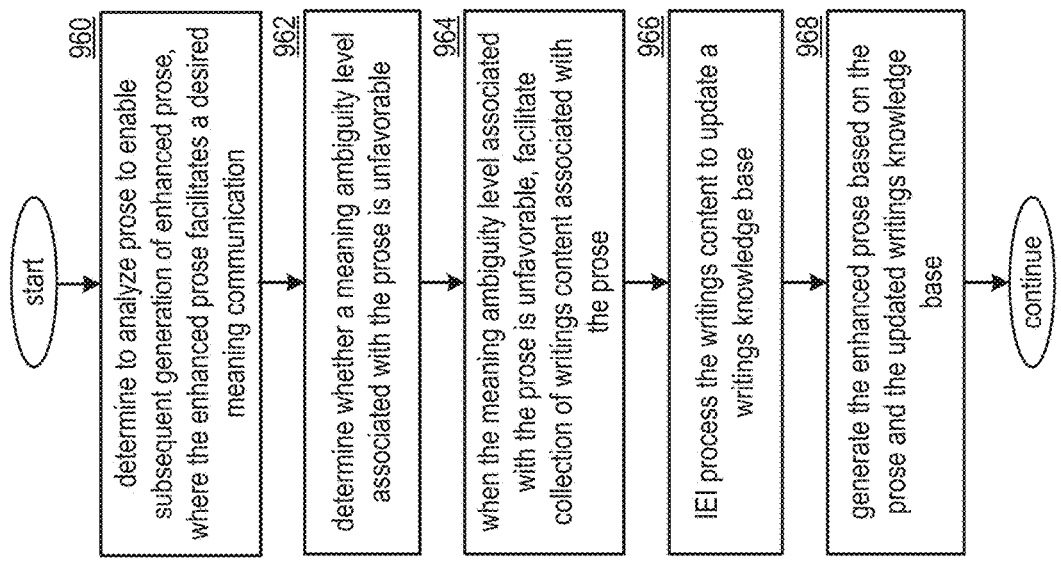
FIG. 16B is a logic diagram of an embodiment of a method for enhancing representation of knowledge within a computing system in accordance with the present invention.

FIG. 16B is a logic diagram of an embodiment of a method for enhancing representation of knowledge within a computing system. In particular, a method is presented for use in conjunction with one or more functions and features described in conjunction with FIGS. 1-8D, 16, and also FIG. 16. The method includes step 960 where a processing module of one or more processing modules of one or more computing devices of the computing system determines to analyze prose to enable subsequent generation of enhanced prose, where the enhanced prose facilitates a desired meaning communication. The determining includes interpreting the prose enhancement request from the user device.

The method continues at step 962 where the processing module determines whether a meaning ambiguity level associated with the prose is unfavorable. The determining includes IEI processing at least a portion of the prose based on a writings knowledge base to produce at least one meaning and indicating that the meaning ambiguity level is unfavorable when producing two or more meanings. In particular, the IEI processing includes matching ingested words of each phrase of the portion of the prose two groups of identigens of the writings knowledge base in accordance with rules, identifying a plurality of permutations of the groups of identigens in accordance with the rules, and reducing the number of permutations to produce at least one potentially valid set of entigens for the phrase in accordance with the rules, representing a potential meaning of each phrase based on the at least one potentially valid set of entigens, and aggregating meanings of each of the phrase to produce the potential meaning of the prose.

When the meaning ambiguity level associated with the prose is unfavorable, the method continues at step 964 where the processing module facilitates collection of writings content associated with the prose. The facilitating includes causing a plurality of writings content collection cycles, where each cycle includes issuing one or more writings content requests to one or more corresponding content sources of writings content sources to cause receiving of writings content responses. Each request is based on the potential meaning of the prose and the prose enhancement request, where one or more of the content sources generates content of the writings content responses based on locally prestored content and/or a writings content response generating approach.

The collection cycle ends when favorable writings content has been collected. Favorable collections includes a goal of a writings content collection cycle has been met, a goal of a writings content collection plan has been met, writings content has been collected in accordance with any subtopics of the prose, a sufficient number of content sources have been query, a sufficient volume of incremental content has been collected, and one or more mandatory content sources have been queried.

The method continues at step 966 where the processing module IEI processes the writings content to update a writings knowledge base. For example, the processing module IEI processes the writings content to produce incremental knowledge (e.g., a truest meaning of the example documents) that, when combined with the writings knowledge base produces an updated writings knowledge base for storage, where the processing may be in accordance with guidance (e.g., rules favored by intended prose recipients) associated with the writings content.

The method continues at step 968 where the processing module generates the enhanced prose based on the prose and the updated writings knowledge base. For example, the processing module re-IEI processes the prose utilizing the updated writings knowledge base including any rules from guidance of the writings content to produce the desired meaning and modifies the prose in accordance with modification rules and based on the desired meaning to produce the enhanced prose. The producing of the desired meaning further includes facilitating of issuing a prose enhancement response that includes a meaning selection request (e.g., to ask a user to select between two or more potential meetings when ambiguity still exist) and receiving a prose enhancement request. The request includes a meaning selection that is utilized to produce the enhanced prose in accordance with the selected meaning.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 17A:
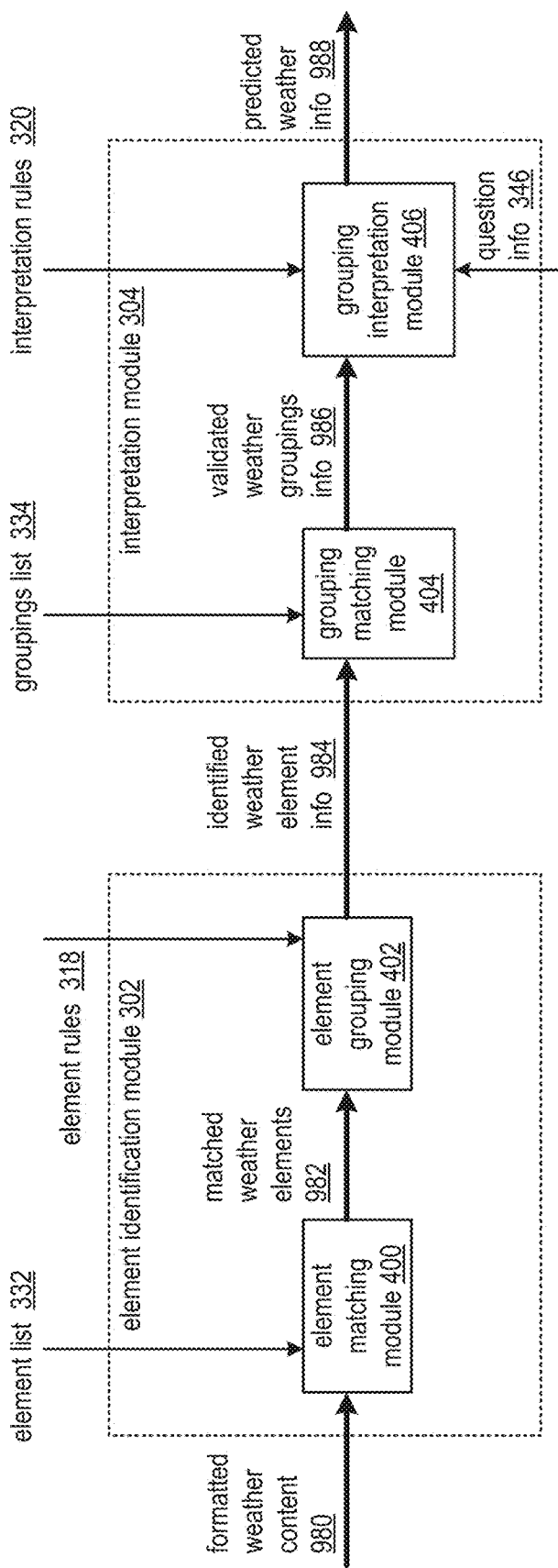
FIG. 17A is a schematic block diagram of another embodiment of an IEI module within a computing system in accordance with the present invention.

FIG. 17A is a schematic block diagram of another embodiment of the IEI module 122 of FIG. 5E that includes the element identification module 302 of FIG. 5E and the interpretation module 304 of FIG. 5E. The element identification module 302 includes the element matching module 400 of FIG. 6A and the element grouping module 402 of FIG. 6A. The interpretation module 304 includes the grouping matching module 404 of FIG. 6A and the grouping interpretation module 406 of FIG. 6A. Generally, an embodiment of the invention presents solutions where the computing system 10 supports generating an enhanced weather forecast.

In an example of operation of the generating of the enhanced weather forecast, the element matching module 400 interprets formatted weather content 980 (e.g., words that describe observed weather phenomena such as when vectors, temperature trends, pressure trends, etc.) to produce matched weather elements 982, where the matched weather elements 982 includes a word group of a group of known words. The generating includes matching a received element to a weather element of an element list 332, where the element list 332 further includes identification of known weather words and one or more identigens per weather word, and associating an identifier with each matched weather element.

The element grouping module 402 analyzes the matched weather elements 982 in accordance with element rules 318, that further include weather element word group rules, to produce identified weather element information 984 when favorable word grouping is associated with the matched weather elements in accordance with the element rules 318. The analyzing includes comparing matched weather elements 982 with weather element word group rules of the element rules 318, extracting possible weather word group meanings from the element rules 318, and identifying the words of the group and identigens for each word.

The grouping matching module 404 analyzes the identified weather element information 984 in accordance with a groupings list 334 to produce validated weather groupings information 986, where the groupings list 334 includes a short list of identigens of predicted weather, and where the validated weather groupings information 986 includes the short list of possible entigens of future weather patterns. The producing includes comparing a groupings aspect of the identified weather elements information 984 (e.g., for each permutation of groups of elements of possible interpretations) and generating the validated weather groupings information 986 to include an identification of potentially valid permutations that align with the groupings list 334 (e.g., eliminate invalid permutations right away that are inconsistent with possible future weather patterns, inconsistent with the present weather patterns, etc.).

The grouping interpretation module 406 interprets the validated weather groupings information 986 based on one or more of question information 346 (e.g., what is the 48 hour forecast) and interpretation rules 320 (e.g., antigen selection rules based on the weather knowledge base that links identigen permutations to most likely future weather patterns) to produce predicted weather information 988 (e.g., most likely future weather pattern, next likely weather pattern, etc.). The producing includes generating a plurality of possible future weather patterns based on the validated weather groupings information 986, pruning the plurality of possible future weather patterns based on the interpretation rules 320 in light of other words of the validated weather groupings information 986 to produce a most likely weather pattern (e.g., consistent with similar previous weather patterns and subsequent weather patterns), and generating a new entigen when the most likely weather pattern is associated with characteristics of a valid deterministic future weather pattern.

Figure 17B:
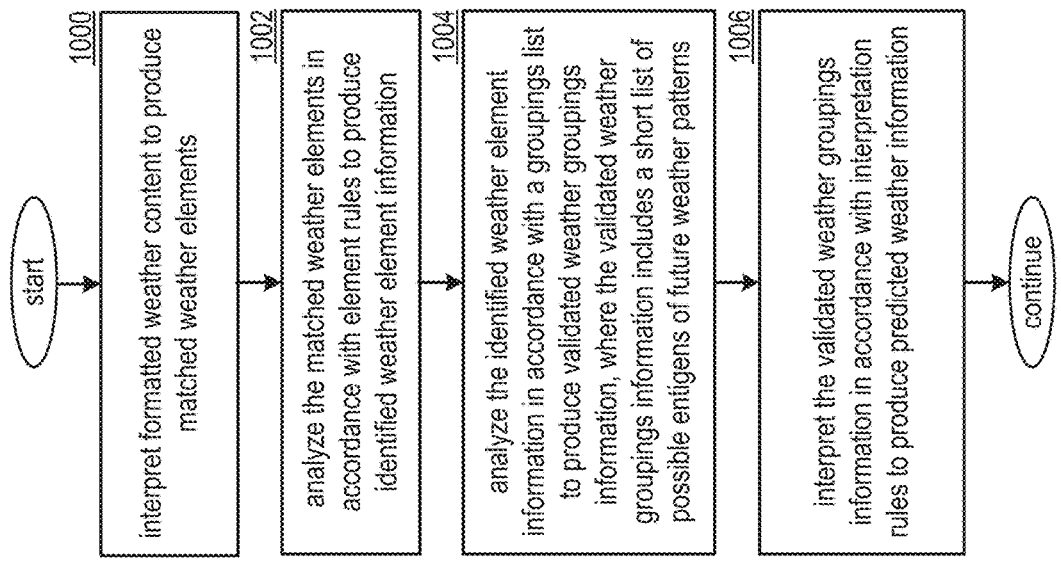
FIG. 17B is a logic diagram of an embodiment of a method for generating an enhanced weather forecast within a computing system in accordance with the present invention.

FIG. 17B is a logic diagram of an embodiment of a method for generating an enhanced weather forecast within a computing system. In particular, a method is presented for use in conjunction with one or more functions and features described in conjunction with FIGS. 1-8D, 17A, and also FIG. 17B. The method includes step 1000 where a processing module of one or more processing modules of one or more computing devices of the computing system interprets formatted weather content to produce matched weather elements. The interpreting includes matching a received element to a weather element of an element list and associating an identifier with each matched weather element, where the matched weather elements includes a word group of a group of known words, and where the element list further includes identification of known weather words and one or more identigens per weather word.

The method continues at step 1002 where the processing module analyzes the matched weather elements in accordance with element rules to produce identified weather element information. The analyzing includes producing of the identified weather element information when favorable word grouping is associated with the matched weather elements in accordance with the element rules, where the element rules includes weather element word group rules. For example, compare matched weather elements with weather element word group rules of the element rules, extract possible weather word group meanings from the element rules, and identify the words of the group and identigens for each word.

The method continues at step 1004 where the processing module analyzes the identified weather element information in accordance with a groupings list to produce validated weather groupings information, where the validated weather groupings information includes a short list of possible entigens of future weather patterns. The analyzing includes comparing a groupings aspect of the identified weather elements (e.g., for each permutation of groups of elements of possible interpretations) and generating the validated weather groupings information to include an identification of potentially valid permutations that align with the groupings list (e.g., eliminate invalid permutations right away that are inconsistent with possible future weather patterns and that may also be inconsistent with the present weather patterns, etc.).

The method continues at step 1006 where the processing module interprets the validated weather groupings information in accordance with interpretation rules to produce predicted weather information. For example, the processing module produces the predicted weather information based on question information (e.g., a desired forecast). The interpretation rules includes entigen selection rules based on weather knowledge that links identigen permutations to most likely future weather patterns. For example, based on the plurality of possible future weather patterns, the processing module prunes a plurality of possible future weather patterns based on the interpretation rules in light of other rules of the validated weather groupings information of a word group to produce a most likely future weather pattern (e.g., that is consistent with similar previous weather patterns and subsequent weather patterns), and generates a new entigen when the word group as a valid deterministic future weather pattern.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 18A:
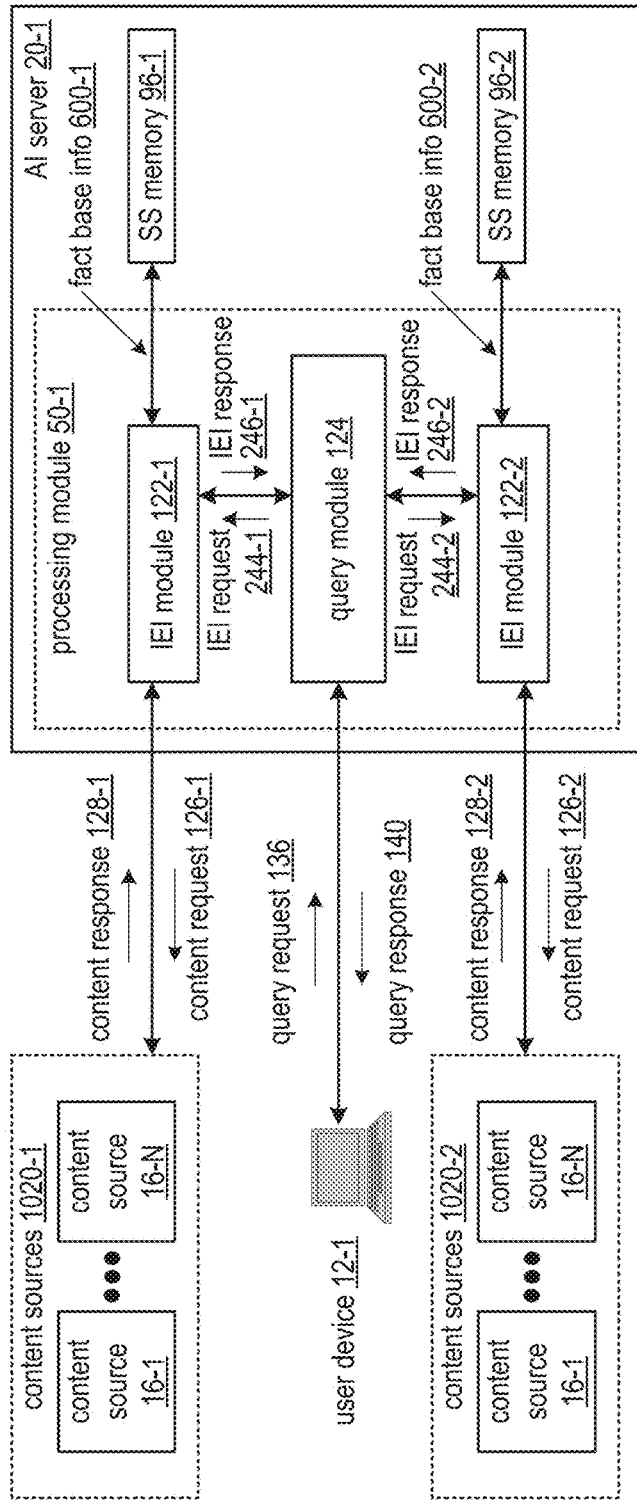
FIG. 18A is a schematic block diagram of another embodiment of a computing system in accordance with the present invention.

FIG. 18A is a schematic block diagram of another embodiment of a computing system that includes content sources 1020-1 and 1020-2, the AI server 20-1 of FIG. 1, and the user device 12-1 of FIG. 1. The each of the content sources 1020-1 and 1020-2 include the content sources 16-1 through 16-N of FIG. 1. The AI server 20-1 includes the processing module 50-1 of FIG. 2 and SS memories 96-1 and 96-2, where each of the SS memories 96-1 and 96-2 may be implemented utilizing the SS memory 96 of FIG. 2. The processing module 50-1 includes the collections module 120 of FIG. 4A, the query module 124 of FIG. 4A, and IEI modules 122-1 and 122-2, where the IEI modules 122-1 and 122-2 may be implemented utilizing the IEI module 122 of FIG. 4A. Alternatively, other embodiments include utilizing separate processing modules 50, separate AI servers 20, common IEI modules 122, common SS memories 96, and common content sources 1020. Generally, an embodiment of the invention presents solutions where the computing system 10 supports obtaining optimize curated knowledge.

In an example of operation of the obtaining of the optimize curated knowledge, each of the IEI modules 122-1 and 122-2 update two or more knowledge databases, where additional knowledge is associated with curation metadata (e.g., a timestamp associated with content, a content source identifier, the content quality level, a quality level of additional knowledge, etc.). The updating includes the IEI modules 122-1 and 122-2 issuing respective content requests 126-1 and 126-22 content sources and 20-1 in 1020-2 and receiving content responses 128-1 and 128-2. The updating further includes IEI processing content of the content responses to produce the additional knowledge, generating the curation metadata based on the content responses, and storing the additional knowledge as fact base information 600-1 in the SS memory 96-1 and as fact base information 600-2 in the SS memory 96-2.

Having updated the two or more knowledge databases, in response to a query request from a requesting entity, the query module 124 facilitates generation of two or more candidate query responses utilizing the two or more knowledge databases. The facilitating includes receiving a query request 136 from the user device 12-1, and issuing IEI requests 244-1 and 244-2 to the IEI modules 122-1 and 122-2 based on the query request 136. Each of the IEI modules 122-1 and 122-2 IEI process the corresponding IEI requests 244-1 and 244-2 utilizing corresponding fact base information 600-1 in 600-2 from the SS memories 96-1 and 96-2 to produce IEI responses 246-1 and 246-2 that includes the candidate query responses and associated curation metadata.

Having generated the two or more candidate query responses, the query module 124 generates a final query response based on the two or more candidate query responses. The generating includes the query module 124 determining query response desired attributes (e.g., based on most recent knowledge, based on most trusted content, based on highest quality content, based on broadest amount of content, etc.), and selecting a query response generation approach (selecting one of the two or more candidate query responses based on the query response desired attributes, aggregating at least two of the two or more candidate query responses, etc.) based on one or more of a predetermination, an interpretation of the query request 136, and available resources, etc., (e.g. indicating which query response desired attributes are important).

The generating further includes applying the selected query response generation approach in accordance with the query response desired attributes and the curation metadata to the two or more candidate query responses of the IEI responses 246-1 and 246-2 to produce the final query response. Having generated the final query response, the query module 124 issues a query response to the requesting entity, where the query response includes the final query response. For example, the query module 124 generates a query response 140 to include the final query response and sends the query response 140 to the user device 12-1.

Figure 18B:
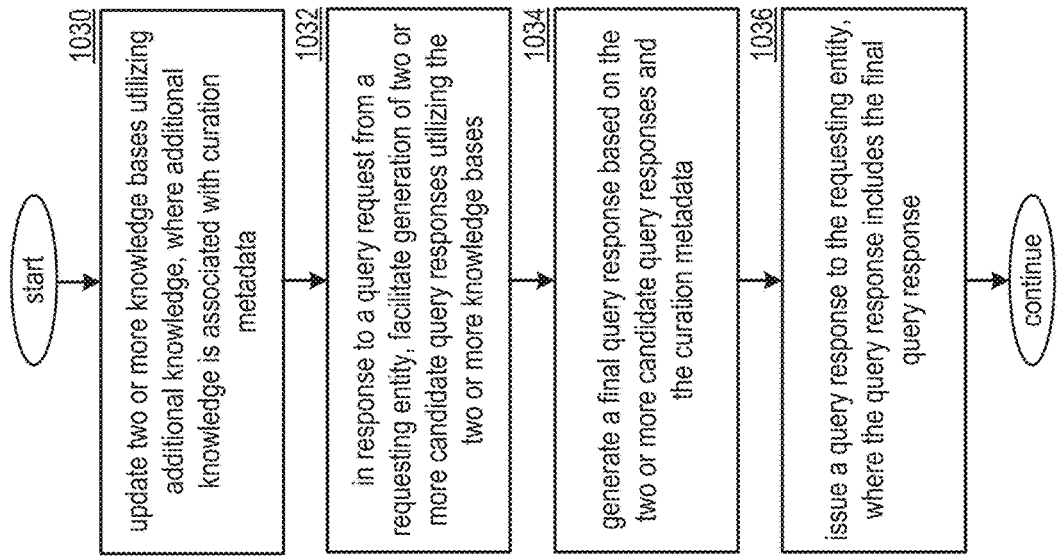
FIG. 18B is a logic diagram of an embodiment of a method for obtaining optimized curated knowledge within a computing system in accordance with the present invention.

FIG. 18B is a logic diagram of an embodiment of a method for obtaining optimized curated knowledge within a computing system. In particular, a method is presented for use in conjunction with one or more functions and features described in conjunction with FIGS. 1-8D, 18A, and also FIG. 18B. The method includes step 1030 where a processing module of one or more processing modules of one or more computing devices of the computing system updates two or more knowledge bases utilizing additional knowledge, where additional knowledge is associated with curation metadata. The updating includes, for each knowledge base of the two or more knowledge bases, causing issuing of content requests to content sources, receiving content responses, IEI processing content of the content responses to produce the additional knowledge, generating the duration metadata based on the content responses, and storing the additional knowledge in the knowledge bases, where the additional knowledge stored in a first knowledge base versus a second knowledge base may not be substantially equivalent.

In response to a query request from a requesting entity, the method continues at step 1032 where the processing module facilitates generation of two or more candidate query responses utilizing the two or more knowledge bases. For example, the processing module receives the query request from the requesting entity (e.g., a user device) and facilitates IEI processing of the query request utilizing corresponding updated knowledge bases to produce the candidate query responses and associated curation metadata.

The method continues at step 1034 where the processing module generates a final query response based on the two or more candidate query responses and the curation metadata. For example, the processing module determines query response desired attributes and selects a query response generation approach, based on one or more of a predetermination, an interpretation of the query request, available resources etc., and applies the selected query response generation approach in accordance with the query response desired attributes and the curation metadata to the two or more candidate query responses to produce the final query response.

The method continues at step 1036 for the processing module issues a query response to the requesting entity, where the query response includes the final query response. For example, the processing module generates the query response to include the final query response and sends the query response to the requesting entity.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:

determining a set of identigens for each word of a first claim element of a claim to produce a plurality of first sets of identigens, wherein a set of identigens of the plurality of first sets of identigens represents one or more different meanings of a word of the first claim element, wherein each identigen of the set of identigens includes a meaning identifier, an instance identifier, and a time reference, wherein each meaning identifier associated with a particular set of identigens represents a different meaning of one or more different meanings of a corresponding word of the first claim element, wherein each time reference provides time information when a corresponding different meaning of the one or more different meanings is valid;

interpreting, based on identigen pairing rules of a knowledge database, pairs of sequentially adjacent identigens of adjacent sets of identigens of the plurality of first sets of identigens to determine a most likely meaning interpretation of the first claim element and produce a first claim element entigen group, wherein the first claim element entigen group represents the most likely meaning interpretation of the first claim element, wherein each entigen of the first claim element entigen group corresponds to a selected identigen of one of the plurality of first sets of identigens having a selected meaning identifier of the one or more different meanings of a corresponding word of the first claim element words that represents a most likely meaning interpretation of the corresponding word, wherein each selected identigen corresponding to the first claim element entigen group favorably pairs with at least one corresponding sequentially adjacent identigen of an adjacent set of identigens in accordance with the identigen pairing rules, wherein each entigen of the first claim element entigen group represents a single conceivable and perceivable thing in space and time that is independent of language and corresponds to a time reference of a corresponding selected identigen associated with the first claim element entigen group, wherein the knowledge database includes a plurality of records that link entigens having a connected meaning;

obtaining a comparison matter entigen group, wherein the comparison matter entigen group represents a most likely meaning interpretation of corresponding comparison matter;

determining a level of match between the first claim element entigen group and the comparison matter entigen group; and when the level of match between the first claim element entigen group and the comparison matter entigen group is greater than a threshold level, performing a value-added function including one of:
  indicating potential utilization of the claim by the comparison matter when a priority level of the claim is greater than a priority level of the comparison matter, and
  indicating potential prior art status of the comparison matter when the priority level of the claim is less than the priority level of the comparison matter.

2. The method of claim 1 further comprises:
obtaining a comparison request that includes one or more of the claim, the corresponding comparison matter, and the comparison matter entigen group; and
outputting a representation of one or more of the first claim element entigen group, the comparison matter entigen group, and the level of match between the first claim element entigen group and the comparison matter entigen group.

3. The method of claim 1 further comprises:
indicating that the priority level of the claim is greater than the priority level of the comparison matter when a priority date of the claim is chronologically before a date associated with the comparison matter; and
indicating that the priority level of the claim is less than the priority level of the comparison matter when the date associated with the comparison matter is chronologically before the priority date of the claim.

4. The method of claim 1 further comprises:
when the level of match between the first claim element entigen group and the comparison matter entigen group is greater than the threshold level:
  determining a modification to the claim to affect the level of match when the priority level of the claim is less than the priority level of the comparison matter; and
when the level of match between the first claim element entigen group and the comparison matter entigen group is less than the threshold level:
  indicating that the comparison matter is unlikely to utilize the claim when the priority level of the claim is greater than the priority level of the comparison matter, and
  indicating that the comparison matter is unlikely to be considered as prior art to the claim when the priority level of the claim is less than the priority level of the comparison matter.

5. The method of claim 1, wherein the obtaining the comparison matter entigen group comprises one or more of:
obtaining the comparison matter from a data source based on the first claim element entigen group;
determining a set of identigens for each word of the comparison matter to produce a plurality of comparison matter sets of identigens;
interpreting, based on the identigen pairing rules of the knowledge database and the first claim element entigen group, pairs of sequentially adjacent identigens of adjacent sets of identigens of the plurality of comparison matter sets of identigens to determine a most likely meaning interpretation of the comparison matter and produce the comparison matter entigen group; and
recovering the comparison matter entigen group from the knowledge database utilizing the first claim element entigen group.

6. The method of claim 1, wherein the determining the level of match between the first claim element entigen group and the comparison matter entigen group comprises:
indicating that the level of match between the first claim element entigen group and the comparison matter entigen group is greater than the threshold level when each entigen of the first claim element entigen group matches a corresponding entigen of the comparison matter entigen group;
indicating that the level of match between the first claim element entigen group and the comparison matter entigen group is less than the threshold level when at least one entigen of the first claim element entigen group does not match at least one corresponding entigen of the comparison matter entigen group.

7. A computing device of a computing system, the computing device comprises:
an interface;
a local memory; and a processing module operably coupled to the interface and the local memory, wherein the processing module performs functions to:
determine a set of identigens for each word of a first claim element of a claim to produce a plurality of first sets of identigens, wherein a set of identigens of the plurality of first sets of identigens represents one or more different meanings of a word of the first claim element, wherein each identigen of the set of identigens includes a meaning identifier, an instance identifier, and a time reference, wherein each meaning identifier associated with a particular set of identigens represents a different meaning of one or more different meanings of a corresponding word of the first claim element, wherein each time reference provides time information when a corresponding different meaning of the one or more different meanings is valid;
interpret, based on identigen pairing rules of a knowledge database, pairs of sequentially adjacent identigens of adjacent sets of identigens of the plurality of first sets of identigens to determine a most likely meaning interpretation of the first claim element and produce a first claim element entigen group, wherein the first claim element entigen group represents the most likely meaning interpretation of the first claim element, wherein each entigen of the first claim element entigen group corresponds to a selected identigen of one of the plurality of first sets of identigens having a selected meaning identifier of the one or more different meanings of a corresponding word of the first claim element words that represents a most likely meaning interpretation of the corresponding word, wherein each selected identigen corresponding to the first claim element entigen group favorably pairs with at least one corresponding sequentially adjacent identigen of an adjacent set of identigens in accordance with the identigen pairing rules, wherein each entigen of the first claim element entigen group represents a single conceivable and perceivable thing in space and time that is independent of language and corresponds to a time reference of a corresponding selected identigen associated with the first claim element entigen group, wherein the knowledge database includes a plurality of records that link entigens having a connected meaning;
obtain a comparison matter entigen group, wherein the comparison matter entigen group represents a most likely meaning interpretation of corresponding comparison matter;
determine a level of match between the first claim element entigen group and the comparison matter entigen group; and
when the level of match between the first claim element entigen group and the comparison matter entigen group is greater than a threshold level, performing a value-added function including one of:
indicate, via the interface, potential utilization of the claim by the comparison matter when a priority level of the claim is greater than a priority level of the comparison matter, and
indicate, via the interface, potential prior art status of the comparison matter when the priority level of the claim is less than the priority level of the comparison matter.

8. The computing device of claim 7, wherein the processing module further performs functions to:
obtain, via the interface, a comparison request that includes one or more of the claim, the corresponding comparison matter, and the comparison matter entigen group; and
output, via the interface, a representation of one or more of the first claim element entigen group, the comparison matter entigen group, and the level of match between the first claim element entigen group and the comparison matter entigen group.

9. The computing device of claim 7, wherein the processing module further performs functions to:
indicate that the priority level of the claim is greater than the priority level of the comparison matter when a priority date of the claim is chronologically before a date associated with the comparison matter; and
indicate that the priority level of the claim is less than the priority level of the comparison matter when the date associated with the comparison matter is chronologically before the priority date of the claim.

10. The computing device of claim 7, wherein the processing module further performs functions to:
when the level of match between the first claim element entigen group and the comparison matter entigen group is greater than the threshold level:
determine a modification to the claim to affect the level of match when the priority level of the claim is less than the priority level of the comparison matter; and
when the level of match between the first claim element entigen group and the comparison matter entigen group is less than the threshold level:
indicate, via the interface, that the comparison matter is unlikely to utilize the claim when the priority level of the claim is greater than the priority level of the comparison matter, and
indicate, via the interface, that the comparison matter is unlikely to be considered as prior art to the claim when the priority level of the claim is less than the priority level of the comparison matter.

11. The computing device of claim 7, wherein the processing module performs functions to obtain the comparison matter entigen group by one or more of:
obtaining, via the interface, the comparison matter from a data source based on the first claim element entigen group;
determining a set of identigens for each word of the comparison matter to produce a plurality of comparison matter sets of identigens;
interpreting, based on the identigen pairing rules of the knowledge database and the first claim element entigen group, pairs of sequentially adjacent identigens of adjacent sets of identigens of the plurality of comparison matter sets of identigens to determine a most likely meaning interpretation of the comparison matter and produce the comparison matter entigen group; and
recovering, via the interface, the comparison matter entigen group from the knowledge database utilizing the first claim element entigen group.

12. The computing device of claim 7, wherein the processing module performs functions to determine the level of match between the first claim element entigen group and the comparison matter entigen group by:
indicating that the level of match between the first claim element entigen group and the comparison matter entigen group is greater than the threshold level when each entigen of the first claim element entigen group matches a corresponding entigen of the comparison matter entigen group; and indicating that the level of match between the first claim element entigen group and the comparison matter entigen group is less than the threshold level when at least one entigen of the first claim element entigen group does not match at least one corresponding entigen of the comparison matter entigen group.

13. A non-transitory computer readable memory comprises:

a first memory element that stores operational instructions that, when executed by a processing module, causes the processing module to:

determine a set of identigens for each word of a first claim element of a claim to produce a plurality of first sets of identigens, wherein a set of identigens of the plurality of first sets of identigens represents one or more different meanings of a word of the first claim element, wherein each identigen of the set of identigens includes a meaning identifier, an instance identifier, and a time reference, wherein each meaning identifier associated with a particular set of identigens represents a different meaning of one or more different meanings of a corresponding word of the first claim element, wherein each time reference provides time information when a corresponding different meaning of the one or more different meanings is valid;

a second memory element that stores operational instructions that, when executed by the processing module, causes the processing module to:

interpret, based on identigen pairing rules of a knowledge database, pairs of sequentially adjacent identigens of adjacent sets of identigens of the plurality of first sets of identigens to determine a most likely meaning interpretation of the first claim element and produce a first claim element entigen group, wherein the first claim element entigen group represents the most likely meaning interpretation of the first claim element, wherein each entigen of the first claim element entigen group corresponds to a selected identigen of one of the plurality of first sets of identigens having a selected meaning identifier of the one or more different meanings of a corresponding word of the first claim element words that represents a most likely meaning interpretation of the corresponding word, wherein each selected identigen corresponding to the first claim element entigen group favorably pairs with at least one corresponding sequentially adjacent identigen of an adjacent set of identigens in accordance with the identigen pairing rules, wherein each entigen of the first claim element entigen group represents a single conceivable and perceivable thing in space and time that is independent of language and corresponds to a time reference of a corresponding selected identigen associated with the first claim element entigen group, wherein the knowledge database includes a plurality of records that link entigens having a connected meaning;

a third memory element that stores operational instructions that, when executed by the processing module, causes the processing module to:

obtain a comparison matter entigen group, wherein the comparison matter entigen group represents a most likely meaning interpretation of corresponding comparison matter;

a fourth memory element that stores operational instructions that, when executed by the processing module, causes the processing module to:

determine a level of match between the first claim element entigen group and the comparison matter entigen group; and a fifth memory element that stores operational instructions that, when executed by the processing module, causes the processing module to:

when the level of match between the first claim element entigen group and the comparison matter entigen group is greater than a threshold level, performing a value-added function including one of:

indicate potential utilization of the claim by the comparison matter when a priority level of the claim is greater than a priority level of the comparison matter, and indicate potential prior art status of the comparison matter when the priority level of the claim is less than the priority level of the comparison matter.

14. The non-transitory computer readable memory of claim 13 further comprises:

a sixth memory element stores operational instructions that, when executed by the processing module causes the processing module to:

obtain a comparison request that includes one or more of the claim, the corresponding comparison matter, and the comparison matter entigen group; and output a representation of one or more of the first claim element entigen group, the comparison matter entigen group, and the level of match between the first claim element entigen group and the comparison matter entigen group.

15. The non-transitory computer readable memory of claim 13 further comprises:

a seventh memory element stores operational instructions that, when executed by the processing module causes the processing module to:

indicate that the priority level of the claim is greater than the priority level of the comparison matter when a priority date of the claim is chronologically before a date associated with the comparison matter; and indicate that the priority level of the claim is less than the priority level of the comparison matter when the date associated with the comparison matter is chronologically before the priority date of the claim.

16. The non-transitory computer readable memory of claim 13 further comprises:

an eighth memory element stores operational instructions that, when executed by the processing module causes the processing module to:

when the level of match between the first claim element entigen group and the comparison matter entigen group is greater than the threshold level:

determine a modification to the claim to affect the level of match when the priority level of the claim is less than the priority level of the comparison matter; and when the level of match between the first claim element entigen group and the comparison matter entigen group is less than the threshold level:

indicate that the comparison matter is unlikely to utilize the claim when the priority level of the claim is greater than the priority level of the comparison matter, and indicate that the comparison matter is unlikely to be considered as prior art to the claim when the priority level of the claim is less than the priority level of the comparison matter.

17. The non-transitory computer readable memory of claim 13, wherein the processing module functions to execute the operational instructions stored by the third memory element to cause the processing module to obtain the comparison matter entigen group by one or more of:
  obtaining the comparison matter from a data source based on the first claim element entigen group;
  determining a set of identigens for each word of the comparison matter to produce a plurality of comparison matter sets of identigens;
  interpreting, based on the identigen pairing rules of the knowledge database and the first claim element entigen group, pairs of sequentially adjacent identigens of adjacent sets of identigens of the plurality of comparison matter sets of identigens to determine a most likely meaning interpretation of the comparison matter and produce the comparison matter entigen group; and
  recovering the comparison matter entigen group from the knowledge database utilizing the first claim element entigen group.

18. The non-transitory computer readable memory of claim 13, wherein the processing module functions to execute the operational instructions stored by the fourth memory element to cause the processing module to determine the level of match between the first claim element entigen group and the comparison matter entigen group by:
  indicating that the level of match between the first claim element entigen group and the comparison matter entigen group is greater than the threshold level when each entigen of the first claim element entigen group matches a corresponding entigen of the comparison matter entigen group; and
  indicating that the level of match between the first claim element entigen group and the comparison matter entigen group is less than the threshold level when at least one entigen of the first claim element entigen group does not match at least one corresponding entigen of the comparison matter entigen group.

* * * * *